United States Patent
Park

(10) Patent No.: US 12,471,080 B2
(45) Date of Patent: Nov. 11, 2025

(54) SCHEDULING POSITIONING REFERENCE SIGNAL TRANSMISSIONS ACROSS DIFFERENT SUBCARRIER SPACINGS

(71) Applicant: SHARP KABUSHIKI KAISHA, Sakai (JP)

(72) Inventor: Kenneth James Park, Cathlamet, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 68 days.

(21) Appl. No.: 17/698,994

(22) Filed: Mar. 18, 2022

(65) Prior Publication Data

US 2023/0300822 A1    Sep. 21, 2023

(51) Int. Cl.
| | |
|---|---|
| H04W 72/1263 | (2023.01) |
| G01S 5/02 | (2010.01) |
| H04L 5/00 | (2006.01) |
| H04W 64/00 | (2009.01) |

(52) U.S. Cl.
CPC ....... *H04W 72/1263* (2013.01); *G01S 5/0249* (2020.05); *H04L 5/0051* (2013.01); *H04W 64/00* (2013.01)

(58) Field of Classification Search
None
See application file for complete search history.

(56) References Cited

U.S. PATENT DOCUMENTS

| | | |
|---|---|---|
| 2021/0112522 A1 | 4/2021 | Kim et al. |
| 2021/0185632 A1 | 6/2021 | Manolakos et al. |
| 2023/0066384 A1* | 3/2023 | Fakoorian ............. G01S 5/0072 |
| 2023/0127945 A1* | 4/2023 | Ko ....................... G01S 5/0236 455/456.1 |
| 2023/0276399 A1* | 8/2023 | Ko ......................... H04W 72/40 |
| 2023/0284202 A1* | 9/2023 | Bao ....................... H04W 64/00 455/434 |
| 2023/0309066 A1* | 9/2023 | Ganesan ............... H04L 5/0051 |
| 2023/0362874 A1* | 11/2023 | Wang .................... H04W 64/00 |
| 2023/0370221 A1* | 11/2023 | Schaepperle ........ H04L 5/0048 |
| 2024/0031975 A1* | 1/2024 | Baek ..................... G01S 5/0236 |
| 2024/0056997 A1* | 2/2024 | Hoang ............. H04W 56/0015 |
| 2024/0064688 A1* | 2/2024 | You ...................... H04L 5/0051 |

OTHER PUBLICATIONS

Author Unknown, Discussion on SL-PRS resource allocation schemes, pp. 1-3, Nov. 18, 2022.*
Qualcomm Inc., "Pre-Configured gap case—4 discussion", 3GPP TSG RAN WG2 Meeting #118-e, E-Conference, Feb. 21-Mar. 3, 2021, R2-2203504; Section 2.1.

* cited by examiner

*Primary Examiner* — Christopher M Crutchfield
(74) *Attorney, Agent, or Firm* — ScienBiziP, P.C.

(57) ABSTRACT

A method for a UE is provided. The method transmits to a second UE a first PRS in a first set of symbols of a first slot of a first BWP and determines that a second PRS is to be transmitted in a second BWP that overlaps the first BWP in the time domain. The method receives information to determine whether the second UE is capable of successfully decoding the first and second PRSs. When the method determines that the second UE is not capable of such, the method modifies a scheduling of transmission of the second PRS by identifying a second set of symbols of a second slot of the second BWP for carrying the second PRS, such that a start of a first symbol of the second set of symbols follows an end of a second symbol of the first set of symbols in the time domain.

15 Claims, 29 Drawing Sheets

SCHEDULING POSITIONING REFERENCE SIGNAL TRANSMISSIONS ACROSS DIFFERENT SUBCARRIER SPACINGS

FIELD

The present disclosure generally relates to wireless communications and more specifically relates to aligning a positioning reference signal (PRS) across different bandwidth parts (BWPs) or different subcarrier spacings (SCSs) in a wireless network (e.g., a fifth generation (5G) (e.g., New Radio (NR)) network).

BACKGROUND

In a more recent study conducted by the 3rd Generation Partnership Project (3GPP) (e.g., as indicated in release 17 (Rel-17) of 3GPP) two types of NR positionings have been discussed. The first type relates to "NR positioning enhancements" and the second type relates to "scenarios and requirements of in-coverage, partial coverage, and out-of-coverage NR positioning use cases."

The study on "NR positioning enhancements" investigates higher accuracy and lower latency locations, as well as high integrity and reliability requirements resulting from new applications and industry verticals for 5G. Some of the enhancements identified during this work have been specified in the 3GPP Rel-17 Work Item relating to "NR positioning enhancements," but there remain a number of opportunities for enhancement that have not yet been studied and/or released in any of the 3GPP specifications.

The study on "scenarios and requirements of in-coverage, partial coverage, and out-of-coverage NR positioning use cases" focuses on vehicle to everything (V2X) features and public safety use cases (e.g., where the outcome has been captured in TR38.845). Additionally, requirements for "ranging based services" has been discussed in TS22.261 and has developed positioning accuracy requirements in TS22.104 for Internet of things (IIoT) use cases (e.g., in out-of-coverage scenarios). There is a need for 3GPP to study and develop sidelink positioning solutions that can support the use cases, scenarios, and requirements identified during such activities.

Regarding higher accuracy, promising techniques identified in earlier studies may be considered in the 3GPP Rel-18 study (e.g., the study on expanded and improved NR positioning (Acronym: FS_NR_pos_enh2), as discussed in RP-213588). One aspect of the study looks to take advantage of the rich 5G spectrum to increase the bandwidth for the transmission and reception of the positioning reference signals (PRSs). That is, the enchantments in positioning techniques can be achieved by taking advantage of the wider bandwidths provided by NR, for example, via frequency range 1 (FR1) and FR2, such that different PRSs may be allocated to resources that may be transmitted and/or received by both a base stations (e.g., gNBs) and a user equipment (UE). Additionally, it is desirable that such positioning reference signals be with a high resource element (RE) density in the time domain.

Additionally, while the NR 3GPP specifications provide that NR V2X capable UEs may use multiple carrier bandwidths, where the carrier bandwidths may occupy FR1 band or FR2 band, or both FR1 and FR2 bands, the configuration of a sidelink (SL) bandwidth part (BWP) to a carrier bandwidth requires that all the SL BWPs configured in a carrier bandwidth use the same numerology. As such, an SL BWP of a carrier bandwidth of FR1 cannot have the same numerology as an SL BWP of a carrier bandwidth of FR2 (except for a subcarrier spacing (SCS) of 60 kHz which is valid in both FR1 and FR2).

Additionally, a transmission of a PRS in a first SL BWP may collide with the transmission of a PRS in a second SL BWP. Such a collision may occur when the different PRSs may be scheduled in such a manner that they are always aligned in time (or the time domain), or in such a manner that they overlap (e.g., in the time domain) due to, for example, different periodicity settings. As such, two PRSs may be aligned while the two PRSs may be on different carrier bandwidths and may have different periodicities and number of slots.

The lack of a consistent numerology across the different frequency ranges, and across different carrier bandwidths (or BWPs) of the same frequency range, may cause a UE difficulty in allocating sufficient resources for a recipient UE (or Rx UE) to receive a PRS of an SL BWP of a first carrier bandwidth and a PRS of an SL BWP of another carrier bandwidth, particularly when the two PRSs may be transmitted at, or nearly at, the same time. For example, some UEs may not have a sufficiently wide receiver chain to receive multiple carrier bandwidths simultaneously, or some UEs may not have sufficient processor resources (or strength) to simultaneously decode PRSs received from FR1 and other PRSs received from FR2 in a timely manner. Conversely, some UEs may have neither a sufficiently wide receiver chain or sufficient processing power to receive and decode the PRSs that are transmitted simultaneously from different carrier bandwidths.

BRIEF DESCRIPTION OF THE DRAWINGS

Implementations of the present technology will now be described, by way of example only, with reference to the attached figures.

DESCRIPTION

Figure 1A:
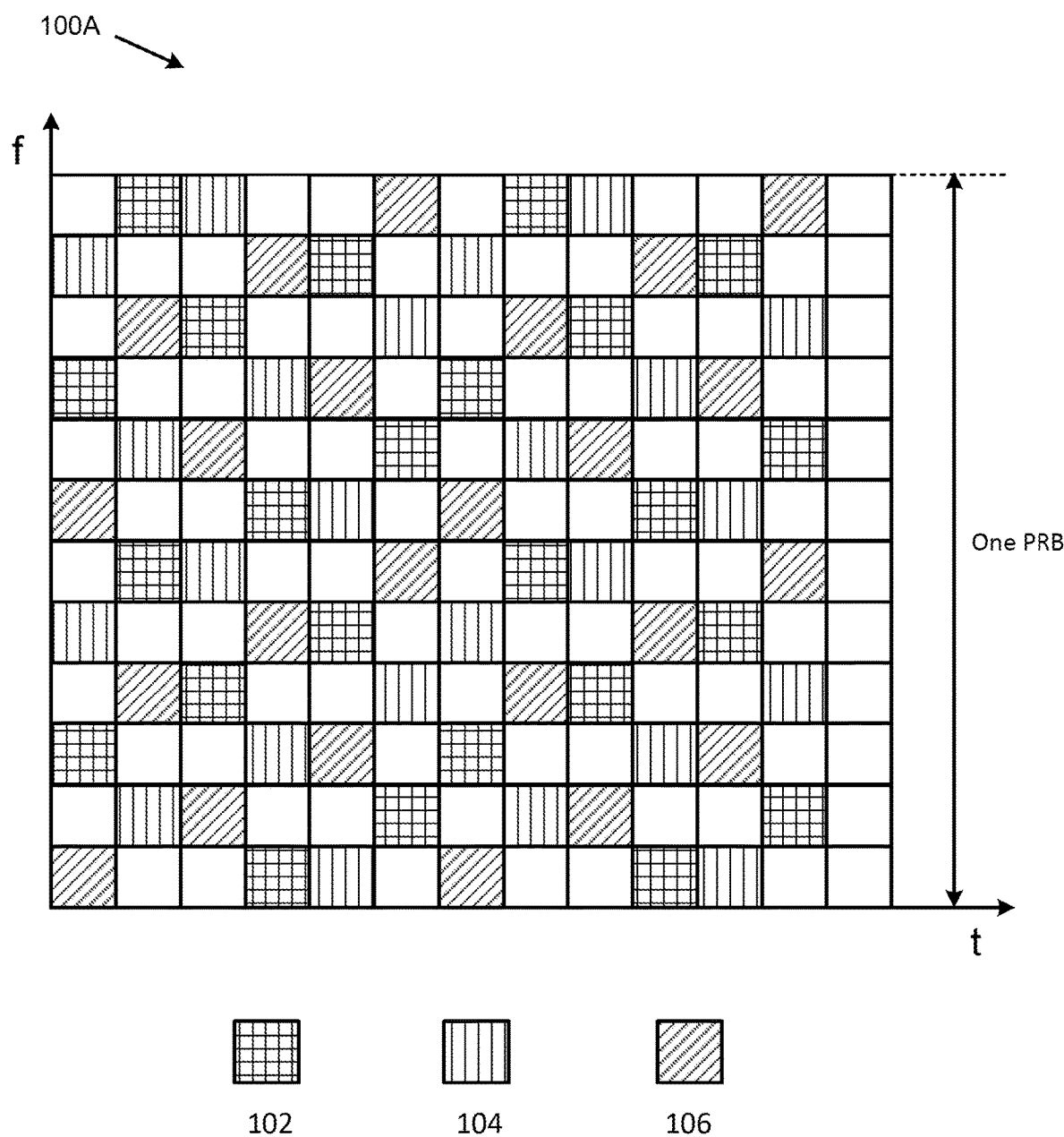
FIGS. 1A and 1B are two block diagrams illustrating, respectively, a transmission pattern of a PRS and a transmission pattern of an SRS, according to an example implementation of the present disclosure.

The 3GPP is a collaboration agreement that aims to define globally applicable technical specifications and technical reports for third and fourth generation wireless communication systems. The 3GPP may also define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, and so on) including New Radio (NR), which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (B S), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices may include cellular phones, smart phones, personal digital assistants (PDAs), laptop computers, netbooks, e-readers, wireless modems, etc.

In the 3GPP specifications, a wireless communication device may typically be referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a NodeB, an evolved NodeB (eNB), a home enhanced or evolved NodeB (HeNB), a Next Generation NodeB (gNB), or some other similar terminology. As the scope of the disclosure should not be limited to 3GPP standards, the terms "base station," "NodeB," "eNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in the E-UTRA and E-UTRAN overall description, as used herein, a "cell" may be defined as a "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB and/or gNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and, in the case of a downlink transmission, those cells for which the UE decodes a physical downlink shared channel (PDSCH). "Deactivated cells" are those configured cells for which the UE is not monitoring the transmission of PDCCH. It should be noted that a "cell" may be described in terms of differing dimensions. For example, a "cell" may have temporal, spatial (e.g., geographical), and frequency characteristics.

The 5G communication systems, dubbed NR technologies by the 3GPP, envision the use of time/frequency/space resources to allow for services, such as Enhanced Mobile Broadband (eMBB) transmission, Ultra-Reliable Low-Latency Communications (URLLC) transmission, and massive Machine Type Communication (mMTC) transmission. Also, in NR, single-beam and/or multi-beam operations are considered for downlink and/or uplink transmissions.

Various examples of the systems and methods disclosed herein are now described with reference to the figures, where like reference numbers may indicate functionally similar elements. The systems and methods as generally described and illustrated in the figures herein could be arranged and designed in a wide variety of different implementations. Therefore, the detailed description of the present disclosure as illustrated in the figures is not intended to limit the scope of the present disclosure but is merely representative of the systems and methods.

As described, while NR V2X capable UEs may use multiple carrier bandwidths, where the carrier bandwidths may occupy FR1 or FR2, or both FR1 and FR2 bands, the configuration of an SL BWP to a carrier bandwidth requires that all the SL BWPs configured in a carrier bandwidth use the same numerology. As such, an SL BWP of a Carrier Bandwidth of FR1 cannot have the same numerology as an SL BWP of a Carrier Bandwidth of FR2 (except for an SCS of 60 kHz which is valid in both FR1 and FR2). Additionally, a transmission of a PRS by a first SL BWP may collide with the transmission of a PRS by a second SL BWP. Such a collision may happen if the PRSs are scheduled in such a manner that they are always aligned in time, or in such a manner that they overlap (e.g., partially) in time due to different periodicity settings.

The lack of a consistent numerology across the different frequency ranges, and across the different carrier bandwidths of the same frequency range, may cause a UE difficulty in allocating sufficient resources to receive the PRSs of an SL BWP of a first carrier bandwidth and the PRSs of an SL BWP of another carrier bandwidth when the PRSs of the SL BWP of the first carrier bandwidth and the PRSs of the SL BWP of the other carrier bandwidth are transmitted at, or nearly at, the same time. For example, some (low-cost) UEs may not have a sufficiently wide receiver chain to receive multiple carrier bandwidths simultaneously, or some (low-cost) UEs may not have sufficient processor resources to simultaneously decode PRSs of FR1 and decode PRSs of FR2 in a timely manner. Conversely, some (low-cost) UEs may have neither a sufficiently wide receiver chain nor sufficient processor resources to receive and decode the PRSs transmitted simultaneously from different carrier bandwidths.

Even if the PRSs from different FRs are scheduled such that they do not align in time (e.g., the PRSs do not overlap in the time domain), a (low-cost) UE's receiver may not be able to switch from a first carrier bandwidth to a second carrier bandwidth in time to receive the PRSs on the second carrier bandwidth if the PRSs on the second carrier bandwidth are transmitted immediately (e.g., sequentially in time) after the transmission of the PRSs of the first carrier bandwidth. Thus, the PRSs scheduled for reception by such a (low-cost) UE may be spread in time to allow the (low-cost) UE the opportunity to receive and decode a first PRS of a first SL BWP (e.g., on a first carrier bandwidth at time $T_0$), and then retune to receive and decode a first PRS of a second SL BWP (e.g., on a second carrier bandwidth at time $T_1$). Thus, the delta between the times $T_0$ and $T_1$ may have to include some amount of time, such as $T_n$ and $T_m$, where $T_n$ accounts for the time needed by the Rx UE to retune from one carrier bandwidth to another carrier bandwidth, and $T_m$ accounts for the amount of time needed by the Rx UE to complete the decoding (or processing) of the PRSs from the first carrier bandwidth.

Thus, when scheduling the PRS transmissions of an SL BWP of a first carrier bandwidth and the PRS transmissions of an SL BWP of a second carrier bandwidth, where the transmissions may begin to occur at, or nearly at, the same time (e.g., at the start of the same subframe), the scheduling process needs to consider the capabilities of the Rx UE (e.g., the UE that receives the PRSs) with respect to the time required by the UE to retune from an SL BWP of a first carrier bandwidth to an SL BWP of another carrier bandwidth. When making such a consideration, the transmitting UE may provide some "gap" in time between the end of a PRS of an SL BWP on a first carrier bandwidth and the start of the next PRS of an SL BWP on a second carrier bandwidth. It should be noted though, that the density of the PRSs in time is a desirable attribute. Thus, the gap in time between the transmissions of a PRS of an SL BWP on the first carrier bandwidth and the transmissions of a PRS of an SL BWP on the second carrier bandwidth has to be configurable to be minimal and to meet the needs of different devices (e.g., UEs) that have different capabilities.

According to various implementations of the present disclosure, a mechanism is discussed by which a UE may schedule the PRS transmissions of different carrier bandwidths (e.g., of different frequency references, such as FR1 and FR2, or of different SCSs of the same FR), such that no collision between the PRS transmissions of one carrier bandwidth and PRS transmissions of another carrier bandwidth occurs. For example, the PRS transmissions of two different BWPs may be scheduled, such that a recipient UE (or Rx UE), that is otherwise incapable of receiving and decoding the different PRSs of the two different BWPs, is enabled to successfully receive and decode both of the PRSs. Some implementations may provide a staggered pattern of PRS transmissions per SL BWP to ensure the non-alignment of the PRSs under all potential overlapping of PRS scenarios.

NR Frame Structure

The 5G NR Frame structure is described in NR 3GPP standard (e.g., Technical Specification (TS) 38.211). The 5G NR frame structure includes subframes, slots, and symbol configurations. As described above, the 5G NR Supports two frequency ranges FR1 (which is under 6 gigahertz (GHz)) and FR2 (also known as millimeter wave range, which is between 24.25 GHz to 52.6 GHz). NR uses flexible subcarrier spacing derived from basic 15 kilohertz (kHz) subcarrier spacing that is also used in the LTE. A frame may have a duration of 10 millisecond (ms) which may consist of 10 subframes each having 1 ms duration, which is similar to the LTE networks. Each subframe may have $2^\mu$ slots ($\mu$ being a member of the set of [0 . . . 4]). Each slot may typically consist of 14 orthogonal frequency division multiplexing (OFDM) symbols. The number of symbols, however, may dependent upon the start and length indicator value (SLIV). The radio frames of 10 ms may be transmitted continuously one after the other as per Time Division Duplex (TDD) topology. A subframe may be of a fixed duration (e.g., 1 ms) whereas a slot's length may vary based on a subcarrier spacing (SCS) and the number of slots per subframe. A slot is 1 ms for 15 kHz, 500 μs for 30 kHz and so on. The subcarrier spacing of 15 kHz may occupy 1 slot per subframe, whereas the subcarrier spacing of 30 kHz may occupy 2 slots per subframe and so on. Each slot may occupy either 14 OFDM symbols or 12 OFDM symbols depending on the normal cyclic prefix (CP) or extended CP, respectively.

It should be noted that even though for the remainder of this disclosure, a 14-symbol configuration that is based on a normal CP is discussed, a 12-symbol configuration that is based on an extended CP may not be precluded from the solution space.

In 5G, a resource element (RE) is the smallest physical resource in NR which may include one subcarrier during one OFDM symbol. Also, in 5G, one NR Resource Block (RB) may contain 12 sub-carriers in the frequency domain, irrespective of the numerology, and is defined only in the frequency domain (e.g., the bandwidth may not be fixed and may be dependent upon the configured sub-carrier spacing). Additionally, in 5G, Physical Resource Blocks (PRBs) are the RBs that are used for actual/physical transmission/reception.

NR Numerology

Numerology is a term used in the 3GPP specification to describe the different subcarrier spacing types, as there are several different types of subcarrier spacing as summarized in the following table 1 (which is similar to the table 4.2-1 (in 38.211) that defines the supported transmission numerologies).

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |

TABLE 1-continued

| μ | $\Delta f = 2^\mu \cdot 15$ [kHz] | Cyclic prefix |
|---|---|---|
| 3 | 120 | Normal |
| 4 | 240 | Normal |

It should be noted that for the remainder of this disclosure, the terms numerology and subcarrier spacing (SCS) may be used interchangeably. It should also be noted that the term "SCS configuration factor n" may be used to refer to a subcarrier spacing type, where n may belong to the set [0,1,2,3,4], as noted in the table above and is referred to as μ.

Physical Layer Design for NR V2X Sidelink

The physical layer structure for the NR V2X sidelink is based on the Rel. 15 NR interface (Uu) design. In addition, the physical layer procedures for the NR V2X sidelink (SL) may reuse some of the concepts of Rel. 14 LTE V2X, with the introduction of additional procedures for providing physical layer support for unicast and groupcast transmissions.

Positioning Reference Signals

To enable more accurate positioning measurements than LTE, new dedicated reference signals are added to the NR Rel-16 specifications with a high Resource Element (RE) density and with the correlation properties that are better than existing reference signals due to the diagonal or staggered reference signal patterns. In the downlink, the new signal is known as the "NR Positioning Reference Signal" (may also be known as NR PRS, or only PRS) and in the uplink, the new signal is known as the "Sounding Reference Signal (SRS) for positioning (e.g., determining the location of a UE).

It should be noted that in releases prior to the 3GPP Rel-16 an SRS may also be defined and used by the base station to estimate the quality of the uplink channel for the large bandwidths outside the assigned span to a specific UE. However, the prior release's SRS may have limitations on its density of use in the time domain that do not apply to the Rel-16 SRS for positioning. As such, the SRS for positioning and the SRS for channel quality estimation are configured separately and with different properties specific to their usage. Thus, for the remainder of this disclosure, any reference to an SRS may apply to the SRS for positioning.

Downlink PRS Signal

In the downlink (DL) transmissions, a dedicated Positioning Reference Signal (PRS) for positioning (e.g., determining the location of a UE) purposes is specified in the 3GPP Rel-16. The PRS may include a pseudo-random sequence that is modulated by Quadrature Phase Shift Keying (QPSK). The pseudo-random sequence may include a Gold sequence of length 31. The PRS is described in more detail in the 5G standard in TS 38.211. The generation of PRS may include two steps: generation of PRS sequences based on Gold sequences and the PRS mapping.

Uplink SRS Signal

In the uplink (UL) transmissions, there is not any dedicated pilot for positioning, so the Sounding Reference Signal (SRS) may be selected for this purpose. In the 5G NR, the SRS generation is implemented according to the 3GPP TS 38.211. The uplink 5G NR sounding reference signal (NR-SRS) sent by the UE may be an OFDM modulated Zadoff-Chu sequence that is feasible for time delay estimation. Similar to the generation of the PRS, the generation of the SRS may also include two steps: Zadoff-Chu sequence generation and the SRS mapping.

Mapping a Positioning Reference Signal

A UE may be configured with one or more downlink PRS positioning frequency layer configurations. A PRS positioning frequency layer may be defined as a collection of PRS resource sets with each PRS resource set defining a collection of PRS resources. All the PRS resource sets defined in the PRS positioning frequency layer may be configured with a Subcarrier Spacing parameter and a Cyclic Prefix parameter, as described below.

The subcarrier spacing for all PRS resource sets in a PRS positioning frequency layer may be specified as 15, 30, 60, or 120 kHz. The SubcarrierSpacing parameter property in the nrCarrierConfig object may be used to set the subcarrier spacing of a PRS resource set. The cyclic prefix for all PRS resource sets in a PRS positioning frequency layer may be specified as normal or extended. The CyclicPrefix parameter property of the nrCarrierConfig object may be used to set the cyclic prefix of a PRS resource set. To transmit the SRS in the 5G NR frames, the generated Zadoff-Chu sequence may be mapped to the given physical resources (e.g., which may include subcarriers and time slots). The mapping description may be fined in chapter 6.4.1.4.3 of the 3GPP TS 38.211 specification.

The downlink positioning reference signal (PRS) is the main reference signal supporting downlink-based positioning methods. Although other signals may be used, the PRS is specifically designed to deliver the highest possible level of accuracy, coverage, and interference avoidance and suppression. The PRS signal provides a large delay spread range, since it must be received from potentially distant neighboring base stations for position (e.g., of a UE) estimation. This may be achieved by covering the whole NR bandwidth and transmitting the PRS over multiple symbols which may be aggregated to accumulate power. The duration of a PRS may be associated with the duration of a symbol that is used to transport the PRS, and the duration of such a symbol may be associated with the Subcarrier Spacing (SCS) configuration (aka the Numerology) that is used to define the carrier configuration parameters for a specific OFDM numerology, where such a Numerology may describe the time and frequency of waveforms used by the Resource Blocks (RB) of an NR carrier.

In NR, the density of subcarriers occupied in a given PRS symbol may be referred to as a comb size. There are several configurable comb-based PRS patterns (e.g., comb-2,4,6 and 12) that are suitable for different scenarios serving different use cases. For a comb-N PRS, N symbols may be combined to cover all the subcarriers in the frequency domain. By assigning a different comb set to different base stations, each base station (BS) may transmit in a different set of subcarriers to avoid interference. Since several base stations may transmit at the same time without interfering with each other, such a solution may also be latency efficient. For use cases with higher transmission loss, the PRS may also be configured to be repeated to improve the potential for a two-level reception: within a single slot and across multiple slots. Some implementations may configure the starting resource element (e.g., in the time and frequency domains) from a transmission-reception point (TRP) for a reception within a single slot. Some implementations may configure the gaps between the PRS slots, their periodicity and density (e.g., within a period) for a reception across multiple slots.

Multiplexing Prs in a Slot

As described above, the density of a subcarrier occupied in a given PRS symbol may be referred to as the comb size. There are several configurable comb-based PRS patterns for comb-2,4,6 and 12 that are suitable for different scenarios serving different use cases. The pattern shown in FIG. 1A corresponds to a comb-6 with 3 base stations multiplexed over one slot duration.

Figure 1B:
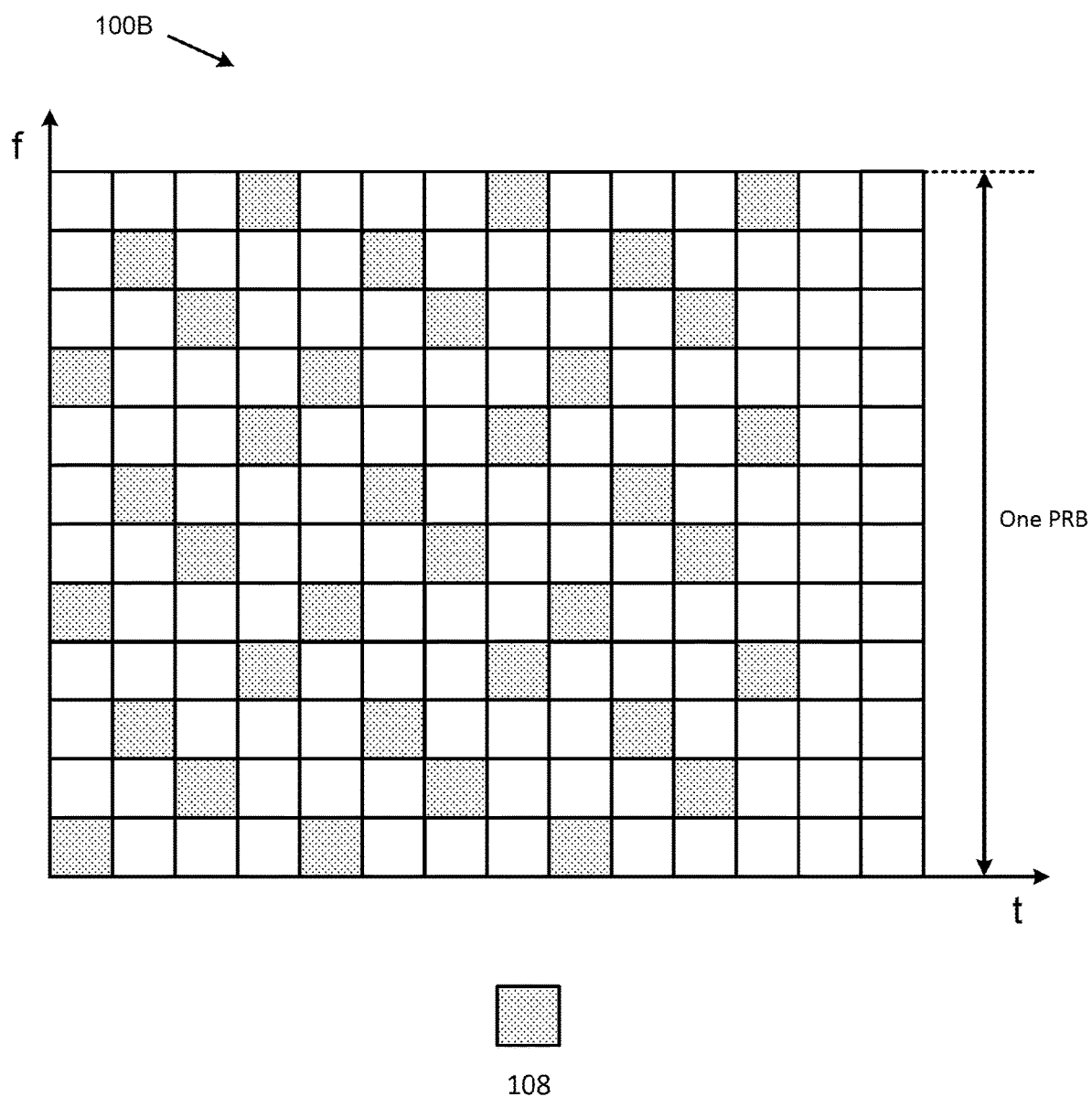

FIGS. 1A and 1B are two block diagrams illustrating, respectively, a transmission pattern of a PRS and a transmission pattern of an SRS, according to an example implementation of the present disclosure. Specifically, FIG. 1A illustrates a time-frequency resource grid 100A in which a PRS transmission pattern (e.g., transmitted from three different base stations) in a physical resource block is shown. FIG. 1B, on the other hand, illustrates a time-frequency resource grid 100B in which a single SRS pattern (e.g., transmitted by a UE) in a physical resource block is shown. Specifically, FIG. 1B illustrates SRS 108 which is transmitted by a UE (not shown in the figure) in a set of symbols of the resource block.

For a comb-3 PRS, which is the case shown in FIG. 1A, 3 different symbols may be combined to cover all the subcarriers in the frequency domain. Each base station may then transmit, as shown in the figure, in different sets of subcarriers (or different sets of symbols of each subcarrier) to avoid interference with the PRS signals belonging to the other two base stations. For example, as shown in FIG. 1A, the first base station (not shown in the figure) may transmit PRS 102 in a first set of symbols, while the second base station (not shown in the figure) may transmit PRS 104 in a second set of symbols, and the third base station (not shown in the figure) may transmit PRS 106 in a third set of symbols. In some implementations, in general, for a comb-N PRS (N being a positive number), N symbols may be combined to cover all the subcarriers in the frequency domain.

In some implementations, the following parameters/properties of a configured object (e.g., the nrPRSConfig object) may control the PRS slot configuration. One property may be the PRSResourceSetPeriod property which may indicate the slot periodicity and offset (0-based) of a PRS resource set. Another property may be the PRSResourceOffset property which may indicate the slot offset (0-based) of each PRS resource defined relative to the slot offset of the PRS resource set. Another property may be the PRSResourceRepetition property which may indicate the repetition factor of all PRS resources in a PRS resource set. Another property may be the PRSResourceTimeGap property which may indicate the slot offset between two consecutive repetition indices of all PRS resources in a PRS resource set.

For UL transmission, an SRS configuration object, such as the nrSRSConfig object may set the SRS configuration parameters (e.g., similar to what is defined in the 3GPP TS 38.211). The default nrSRSConfig object may specify a single-port, single-symbol, narrowband configuration without frequency hopping and may place the SRS at the end of the slot.

In the uplink, the SRS for positioning may resolve two aspects specific to positioning. Since positioning involves measurements (e.g., from multiple receiving base stations), the SRS may have enough range to reach not only the serving base station (e.g., to which the UE is connected), but also the neighboring base stations that are involved in the positioning process. The SRS may also be designed to cover the full bandwidth, where the resource elements are spread across different symbols, such as to cover all subcarriers. Therefore, the SRS may also be designed with a comb-based pattern similar to the PRS. The different UEs signals may be multiplexed over the same transmitting symbol by assigning different comb patterns. To minimize the interference, a UE may be configured with different SRS instances, each having independent power control loops. This allows the SRS pointed at neighboring cells to have better hearability (or reception) and keeps the interference low in the serving cell. As discussed above, an example SRS 108 transmitted by a UE is shown in FIG. 1B.

Maximum Bandwidth

The PRS footprint on the NR time-frequency grid may be configurable with a starting physical resource block (PRB) and a PRS bandwidth. The PRS may start at any PRB in the system bandwidth and may be configured with a bandwidth ranging from 24 to 276 PRBs in steps of 4 PRBs. This amounts to a maximum bandwidth of about 100 MHz for a 30 kHz subcarrier spacing (30 kHz/subcarrier×12 subcarrier/PRB×276 PRB=99,360 MHz) and to about 400 MHz for a 120 kHz subcarrier spacing. The large bandwidth in 5G NR provides for a significant improvement in the time-of-arrival (TOA) accuracy compared to LTE. The maximum bandwidth in the NR V2X SL may depend on the SCS. Additionally, only one numerology (e.g., one combination of SCS and CP) may be used in a carrier at a time in the NR V2X SL. To support UEs that cannot handle large bandwidths (e.g., due to processing limitations or high-power consumption), the concept of bandwidth part (BWP) has been introduced. A BWP may be a subset of the 100 MHz maximum bandwidth that may be configured for a 30 kHz SCS, such as in FR1, or a subset of the 400 MHz maximum bandwidth configured for a 120 kHz SCS, such as in FR2.

Bandwidth Part

In 5G, Bandwidth Part (BWP) may be a subset of contiguous common resource blocks for a given numerology. A UE may be configured with up to four DL BWPs and up to four UL BWPs for each serving cell. Per serving cell, only one BWP in the DL and one BWP in the UL may be activated at a given time (e.g., one SL BWP may be active for all the UEs in a serving cell). For the downlink, the UE may not be expected to receive outside an active BWP (e.g., except for Radio Resource Management purposes). For the uplink, the UE may not transmit outside an active BWP and for an active cell, the UE may not transmit SRSs outside an active BWP. As the sidelink transmissions and receptions of a UE are contained within the SL BWP and employ the same numerology, all physical channels, reference signals, and synchronization signals in NR V2X sidelink are transmitted within the SL BWP. This also means that the sidelink UE may not be expected to receive or transmit in a carrier with more than one numerology. In 5G, Physical Resource Blocks (PRBs) are the RBs which are used for actual transmission/reception. A set of PRBs may belong to a single BWP. PRBs of a BWP may be numbered from 0 to a threshold size (e.g., the size of a BWP minus 1). Each BWP may have its own set of PRBs.

Sidelink Bandwidth Part (SL BWP)

A SL BWP may occupy a contiguous portion of the bandwidth within a carrier. In a carrier, only one SL BWP may be configured for all the UEs. Sidelink transmissions and receptions of a UE may be contained within the SL BWP and may employ the same numerology. Thus, all physical channels, reference signals, and synchronization signals in NR V2X sidelink are transmitted within the SL BWP. This also means that in the sidelink, a UE is not expected to receive or transmit in a carrier with more than one numerology. The SL BWP may be divided into common RBs. A common RB may consist of 12 consecutive subcarriers with the same SCS, where the SCS may be given by the numerology of the SL BWP.

Resource Pools

In NR V2X, only certain slots are configured to accommodate SL transmissions. Thus, the available sidelink resources may consist of slots that are allocated for sidelink (time resources) and common RBs within an SL BWP (frequency resources). In NR V2X, a subset of the available SL resources may be configured to be used by several UEs for their SL transmissions. This subset of available SL resources may be referred to as a resource pool. The common resource blocks within a resource pool are referred to as physical resource blocks (PRBs). A resource pool consists of contiguous PRBs and contiguous or non-contiguous slots that have been configured for SL transmissions. A resource pool may be defined within the SL BWP. Therefore, a single numerology may be used within a resource pool. If a UE has an active UL BWP, the SL BWP may use the same numerology as the UL BWP (e.g., if they are both included in the same carrier).

Resource Pools in the Frequency Domain

A resource pool may be divided into a configured number of contiguous sub-channels, where a sub-channel consists of a group of consecutive PRBs in a slot. The number of PRBs in a sub-channel may correspond to the sub-channel size, which may be configured within a resource pool. In NR V2X SL, the sub-channel size may be equal to 10, 12, 15, 20, 25, 50, 75, or 100 PRBs. A sub-channel may represent the smallest unit for a sidelink data transmission or reception. A sidelink transmission may use one or multiple sub-channels.

Resource Pools in the Time Domain

The slots that are part of a resource pool may be configured and occur with a periodicity of 10240 ms. In the time domain, the resources (e.g., slots) available for sidelink may be determined by repeating the sidelink bitmaps. The length of a bitmap may be equal to 10 bits, 11 bits, 12 bits, . . . , 160 bits. In the case of TDD communications, the resources available for sidelink may be given by a combination of the TDD pattern and the sidelink bitmap. At each slot of a resource pool, only a subset of consecutive symbols may be configured for the sidelink out of the 14 symbols per slot for a normal CP. The number of consecutive SL symbols may vary between 7 to 14 symbols depending on the physical channels that is carried within a slot.

Resource Pool Allocations: Mode1 and Mode2

In 5G, two different modes (i.e., MODE1 and MODE2) are used for the selection of sub-channels in NR V2X SL communications (e.g., when using the NR V2X PC5 interface). MODE1 and MODE2 may be equivalent to MODE3 and MODE4 in LTE V2X, but may be extended to include functionality in support of groupcast and unicast communications over NR V2X SL. MODE1 refers to a centralized resource allocation via a base station (e.g., a gNB). The BS may schedule MODE1 type sidelink resources to be used by the UE for sidelink transmissions. MODE1 may apply to scenarios in which the various UEs may be inside the coverage of the BS. MODE2 may refer to autonomous allocations determined via the UE. With MODE2, the UE may autonomously determine the sidelink transmission resources within the sidelink resources configured by the BS (e.g., a gNB) or preconfigured by the network. MODE2 may apply to scenarios in which the various UEs maybe inside the coverage of the gNB, or outside the coverage of the gNB, or both.

The SL radio resources may be configured such that MODE1 and MODE2 use separate resource pools. The alternative may be that MODE1 and MODE2 share the same resource pool. In this alternative scenario, MODE1 UEs may notify MODE2 UEs of the resources allocated for their future transmissions to avoid collision of shared resources.

Mode1 Resource Scheduling

MODE1 may use either a dynamic grant (DG) type of scheduling or a configured grant (CG) type of scheduling. With DG, MODE1 UEs may request the gNB to allocate resources for the transmission of every single Transport Block (TB), for example, via a Scheduling Request (SR) sent to the gNB (e.g., using the PUCCH). The gNB may respond (e.g., with downlink control information (DCI) over the PDCCH) to indicate to the UE the SL resources (e.g., the slot(s) and sub-channel(s)) allocated for the transmission of a TB (and up to 2 possible retransmissions of this TB).

With CG, MODE1 UEs may request the gNB to allocate resources for the transmission of several TBs by first sending to the gNB a message with UE assistance information that includes information about the expected SL traffic such as: periodicity of TBs, TB maximum size and quality of service (QoS) information. This information may be used by the gNB to create, configure, and allocate a CG to the UE that may satisfy the requirements of the SL traffic. The CG may be configured using a set of parameters that may include the CG index, the time-frequency allocation, and the periodicity of the allocated SL resources. A UE may be assigned a maximum number of 3 SL resources during each period of the CG.

For CG, there may be two types of allocations schemes for SL: CG type 1 and CG type 2. CG type 1 allocations may be utilized by the UE immediately and until it is released by the base station. CG type 2 allocations may be used only after it is activated by the gNB and until it is deactivated. The gNB notifies the UE of the activation and deactivation of a type 2 CG allocations (e.g., using DCI signaling). The DCI may also include the CG index and the time-frequency allocation of a type 2 CG. A type 2 CG may configure multiple CGs for a UE and may only activate a subset of the CGs based on the UE's needs.

Mode2 Resource Scheduling

NR V2X UEs may autonomously select their SL resources (e.g., one or several sub-channels) from a resource pool when using MODE2. MODE2 UEs may operate without a network coverage. A MODE2 resource pool may be configured by the gNB when the UE is in network coverage. A MODE2 UE may operate using a dynamic or a semi-persistent scheduling scheme. The dynamic scheme only selects resources for a TB while the semi-persistent scheme selects resources for a number of consecutive Reselection Counter TBs.

The dynamic scheme selects new resources for each TB and may only reserve resources for the retransmissions of that TB. A reserved resource, in some implementations, may be a selected resource that a UE reserves for a future transmission (e.g., by notifying the neighboring UEs using the 1st-stage SL control information (SCI)).

The semi-persistent scheme selects and reserves resources for the transmission of several TBs (and their retransmissions). The time period between the resources selected for the transmission of consecutive TBs in the semi-persistent scheme may be defined by the Resource Reservation Interval (RRI). The selected RRI may also determine the Reselection Counter that may be randomly set within an interval that depends on the selected RRI.

To select new SL resources for both dynamic and semi-persistent schemes, a UE first defines the selection window where it looks for candidate resources to transmit a TB. Once the selection window is defined, the UE may identify the candidate resources within the selection window. A candidate resource may be defined by a slot in the time domain and $L_{PSSCH}$ contiguous sub-channels in the frequency domain ($L_{PSSCH}$ is the number of contiguous Physical Sidelink Shared Channels (PSSCH) in the frequency domain).

NR V2X Sidelink Numerology

The frequencies in which NR V2X sidelink may operate are within the two following frequency ranges: (i) Frequency range 1 (FR1): 410 MHz to 7.125 GHz, and (ii) Frequency range 2 (FR2): 24.25 GHz to 52.6 GHz. To support diverse requirements and different operating frequencies in FR1 and FR2, a scalable OFDM numerology may be provided for NR V2X (e.g., based on Rel. 15 NR Uu). Each OFDM numerology may be defined by a Sub-carrier Spacing (SCS) and a Cyclic Prefix (CP). NR V2X supports multiples of 15 kHz for the SCS of the OFDM waveform. Different OFDM numerologies may be obtained with a scalable SCS given by $2^\mu \times 15$ kHz, where $\mu$ is an SCS configuration factor. For NR V2X, the SCS configuration factor may be $\mu=0, 1, 2, 3$, such that the SCS may be equal to 15 kHz, 30 kHz, 60 kHz, or 120 KHz. In FR1, 15 kHz, 30 kHz and 60 kHz may be supported for the SCS, while 60 kHz and 120 kHz may be supported for the SCS in FR2. It should be noted that only the 60 kHz SCS configuration may be supported in both FR1 and FR2.

NR V2X Sidelink Physical Layer Structure

Transmissions in NR V2X SL use the orthogonal frequency division multiplexing (OFDM) waveform with a CP. The sidelink frame structure may be organized in radio frames (also may be referred as frames), each with a duration of 10 ms. A radio frame may be divided into 10 subframes, each with a duration of 1 ms. The number of slots per subframe and the SCS for the OFDM waveform may be flexible for NR V2X (e.g., a subframe may have 1, 2, 4, or 8 slots per subframe, based on the SCS, resulting in a variable slot duration of 1 ms, 0.5 ms, 0.25 ms, or 0.0125 ms for an SCS of 15 kHz, 30 kHz, 60 kHz, or 120 kHz, respectively).

As discussed above, enchantments to positioning techniques may be achieved by taking advantage of the wider bandwidths provided by NR via FR1 and FR2, such that Positioning Reference Signals (PRS) may be allocated to resources that are transmitted and/or received by both gNB and UEs. In some implementations, such positioning reference signals may be with a high RE density in the time domain.

While the NR specification provides that NR V2X capable UEs may use multiple carrier bandwidths, where the carrier bandwidths may occupy FR1, or FR2, or both FR1 and FR2 bands, the configuration of an SL BWP to a carrier bandwidth requires that all the SL BWPs configured in a carrier bandwidth use the same numerology. As such, an SL BWP of a Carrier Bandwidth of FR1 may not have the same numerology as an SL BWP of a Carrier Bandwidth of FR2 (e.g., except for an SCS of 60 kHz, which may be valid in both FR1 and FR2).

Additionally, a transmission of a PRS by a first SL BWP may collide with the transmission of a PRS by a second SL BWP. Such a collision may happen if the PRSs are scheduled to be always aligned in time, or they overlap in time due to different periodicity settings. As such, some implementations may define the aligned case as a condition instead of a have-to restriction, where two PRSs on different carrier bandwidths may have different periodicities and number of slots for each PRS. As such, some implementations may provide stagger PRS transmission patterns per SL BWP, as discussed in greater detail below, to ensure non-alignment of the PRSs under all potential overlapping conditions.

The lack of a consistent numerology across the different frequency ranges, and across different carrier bandwidths of the same frequency range, may cause a UE difficulty in allocating sufficient resources to receive the PRSs of an SL BWP of a first carrier bandwidth and the PRSs of an SL BWP of another carrier bandwidth when the PRS of an SL BWP of a first carrier bandwidth and the PRS of an SL BWP of another carrier bandwidth are transmitted at, or nearly at, the same time. For example, some (low-cost) UEs may not have a sufficiently wide receiver chain to receive multiple carrier bandwidths simultaneously, or some (low-cost) UEs may not have sufficient processing resources (e.g., processors that are not fast enough) to simultaneously decode PRSs received in different BWPs (e.g., belonging to FR1 and FR2) in a timely manner. Conversely, some (low-cost) UEs may have neither a sufficiently wide receiver chain or sufficient processing resources to receive and decode the PRSs that are transmitted simultaneously in different carrier bandwidth.

Additionally, even if the PRSs received from different BWPs are scheduled such that they are not aligned in time (e.g., do not overlap in the time domain), a (low-cost) UE receiver may not be able to switch from a first carrier bandwidth to another carrier bandwidth in time to receive the PRS on the second carrier bandwidth if the PRS on the first carrier bandwidth is transmitted immediately (e.g., sequentially in time) after (or very soon after) the transmission of the PRS of the first carrier bandwidth. Thus, the PRSs scheduled for reception by such a (low-cost) UE may be spread in time to allow the UE the opportunity to receive and decode a PRS of an SL BWP on a first carrier bandwidth at time $T_0$, and then re-tune to receive and decode a PRS of an SL BWP on a second carrier bandwidth at time $T_1$. Thus, the delta between $T_0$ and $T_1$ may include some durations of time, such as $t_n$ and $t_m$, where $t_n$ may account for the time needed by the UE to re-tune from a first carrier bandwidth to another carrier bandwidth, and $t_m$ may account for the amount of time needed by the UE to complete the decoding/processing of the PRSs received from the first carrier bandwidth.

Thus, when scheduling the transmissions of PRS of an SL BWP on a first carrier bandwidth and the transmissions of PRS of an SL BWP on a second carrier bandwidth (e.g., a first SL BWP on FR1 and another SL BWP on FR2), where the transmissions may begin to occur at, or nearly at, the same time (e.g., at the start of the same subframe), the scheduling process may need to consider the capabilities of the UE that will be receiving the PRSs with respect to the time required by the receiving device to re-tune from an SL BWP on the first carrier bandwidth to an SL BWP on the second carrier bandwidth. When making such a consideration, in some implementations, the transmitting devices (or UEs) may provide some gap in time between the end of a PRS of an SL BWP on a first carrier bandwidth and the start of the next PRS of an SL BWP on a second carrier bandwidth. However, as noted above, the density of the PRS in time may also be a desirable attribute. Thus, the gap in time between the transmissions of a PRS of an SL BWP on a first carrier bandwidth and the transmissions of a PRS of an SL BWP on another carrier bandwidth may be minimal, and thus configurable to meet the needs of the different devices with different capabilities.

To optimize the PRS density over the PRBs of different SL BWPs with respect to a distribution in time, a scheduling process may consider the allocation of resources (e.g., symbols of a slot) for the PRSs of each SL BWP when different SCS configurations are used by the different SL BWPs. The resolution of such a resource allocation may be at the level of individual symbols of a slot, and the subframe associated with the slot(s). The goal of such a scheduling may be to provide for a PRS resource allocation that may be distributed in the time domain in a non-overlapping manner for all the SL BWPs, and in a manner that takes into account capabilities supported by the device (e.g., UE) that may be either transmitting the PRSs or receiving the PRSs.

As noted above, the duration of a slot and its associated symbols may be related to the Subcarrier Spacing (SCS) configuration as defined by the NR carrier configuration parameters for a specific OFDM numerology, where such a numerology describes the time and frequency of waveforms used by the Physical Resource Blocks (PRB) to transport data via the NR carrier. Thus, the duration of a PRS transmission in a slot may be associated with the duration of the symbol used to transport the PRS.

For example, if the SL BWP of a carrier bandwidth is configured with an SCS of 15 kHz (e.g., an SCS configuration factor of 0), then the slot length may be 1.0 ms, and a symbol length is 66.67 us, while an SL BWP of a carrier bandwidth that is configured with an SCS of 120 kHz (e.g., an SCS configuration factor of 3) may have a slot length of 0.125 ms and a symbol length of 8.33 us. Thus, PRSs transmitted on an SL BWP of a carrier bandwidth that is configured with an SCS of 15 kHz may have a longer duration than PRSs transmitted on an SL BWP of a carrier bandwidth that is configured with an SCS of 120 kHz.

A scheduling process of some implementations tasked with optimizing PRS density (as noted above) in the time domain may need to align the occurrence of all PRSs across all the slots of all potential SL BWPs, where each SL BWP uses a different SCS configuration, such that each PRS allocation of each SL BWP may not overlap with any other PRS of another SL BWP. An initial step, in some implementations, may be to identify the SL BWP with the longest symbol duration (e.g., the SL BWP with the lowest SCS configuration factor). That identified SL BWP and associated symbol duration may be then used as the baseline for the scheduling of the other PRSs of the other SL BWPs with SCS configurations that have a shorter symbol duration. In some implementations, a PRS with a shorter duration may be scheduled to align wholly within the time period of a symbol of a longer duration, but a PRS with a longer duration may not be scheduled to align completely within the time period of a symbol of a shorter duration.

Thus once the SL BWP with the longest duration symbol may be identified, the scheduling process, in some implementations, may schedule a distribution of the PRS for the SL BWP of the longest duration symbol that may be optimized for density over the symbols, slot(s), and subframe of the PRBs of that SL BWP, while taking into account that other symbols, slot(s), and subframe of the PRBs of that SL BWP may not be scheduled to transport a PRS. Additionally, in some implementations, the time during which the symbols, slot(s), and subframe of the PRBs of the SL BWP that is not scheduled to transport a PRS may be used for the scheduling of one or more PRSs of another SL BWP with a shorter symbol duration.

In some implementations, the PRSs from a specific SCS configuration may be transmitted per a period of time that is equivalent to 1 symbol in duration. The 1 symbol duration, in some such implementations, may be defined by the specific SCS configuration factor. In some implementations, one of the SCS configurations may use a configuration factor of n, where n is the lowest factor value of the configured SCS configurations used (e.g., by the gNB and/or UE to transmit and/or receive data on an NR carrier). The symbol duration provided by an SCS configuration factor of n may be known as $Sym^n_{max}$ in some implementations, and the duration of $Sym^n_{max}$ may be expressed as $2^{-n}$ ms.

In some implementations, a PRS with a duration that is less than $Sym^n_{max}$ may be transmitted one or more times to coincide with the transmission of a symbol of duration $Sym^n_{max}$, where the symbols of a duration $Sym^n_{max}$ may not also carry a PRS. Additionally, the PRS with a duration that is less than $Sym^n_{max}$ may, in some implementations, be transmitted on symbols of a different NR carrier bandwidth and may be configured by a different SCS configuration factor.

In some implementations, a PRS may be transmitted by a transmitting (Tx) sidelink UE for the intended reception by a receiving (Rx) Sidelink UE. In some implementations, a PRS may be transmitted using a symbol of duration $Sym^n_{max}$ when the NR carrier used for transporting the symbol of duration $Sym^n_{max}$ is configured by the SCS configuration factor n. In some implementations, a PRS may be transmitted using a symbol of duration $Sym^m$ when the NR carrier used for transporting the symbol of duration $Sym^m$ is configured by the SCS configuration factor m, where m>n.

The start of a transmission of a symbol of duration $Sym^m$ may align in time with a transmission of a symbol of duration $Sym^n_{max}$, such that the start of the transmission of the symbol of duration $Sym^m$ may be offset in time from the start of the transmission of the symbol of duration $Sym^n_{max}$, where the offset may be expressed as a multiple the fraction $1/(2^{(m-n)})$ of the duration of the $Sym^n_{max}$ symbol period, where the multiple may be a member of the set [0 to $(2^{(m-n)}-1)$].

The transmission of a symbol of duration $Sym^n_{max}$ that may align in time with a transmission of a symbol of duration $Sym^m$ that is carrying a PRS intended for reception by an Rx Sidelink UE, may not transmit a PRS that may be intended for the same Rx Sidelink UE, as transmitted by the symbol of duration $Sym^m$.

Figure 2A:
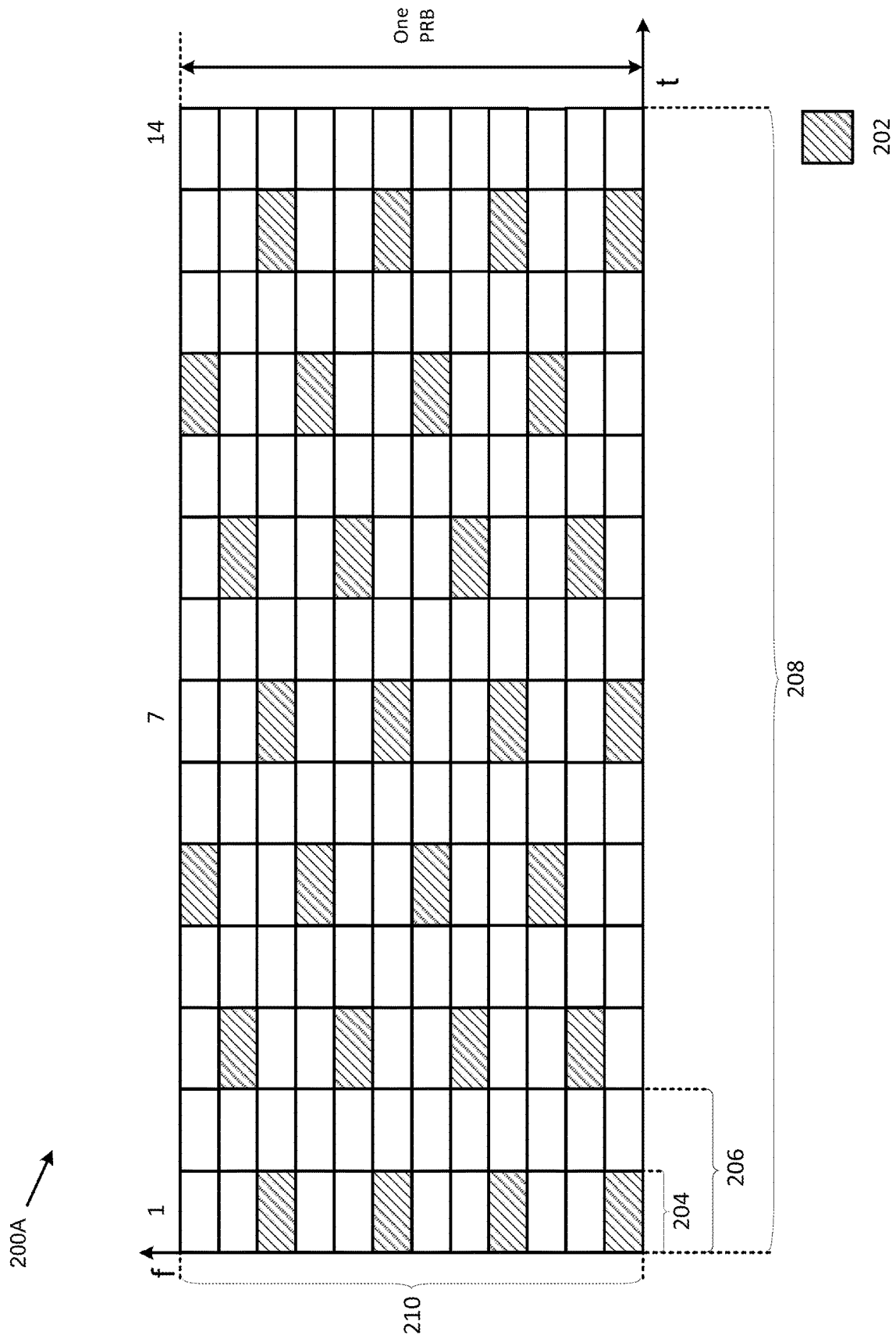
FIGS. 2A-2C are three block diagrams that illustrate example PRS transmissions patterns when the PRSs are scheduled to be spread among two different SCSs, according to an example implementation of the present disclosure.
Figure 2B:
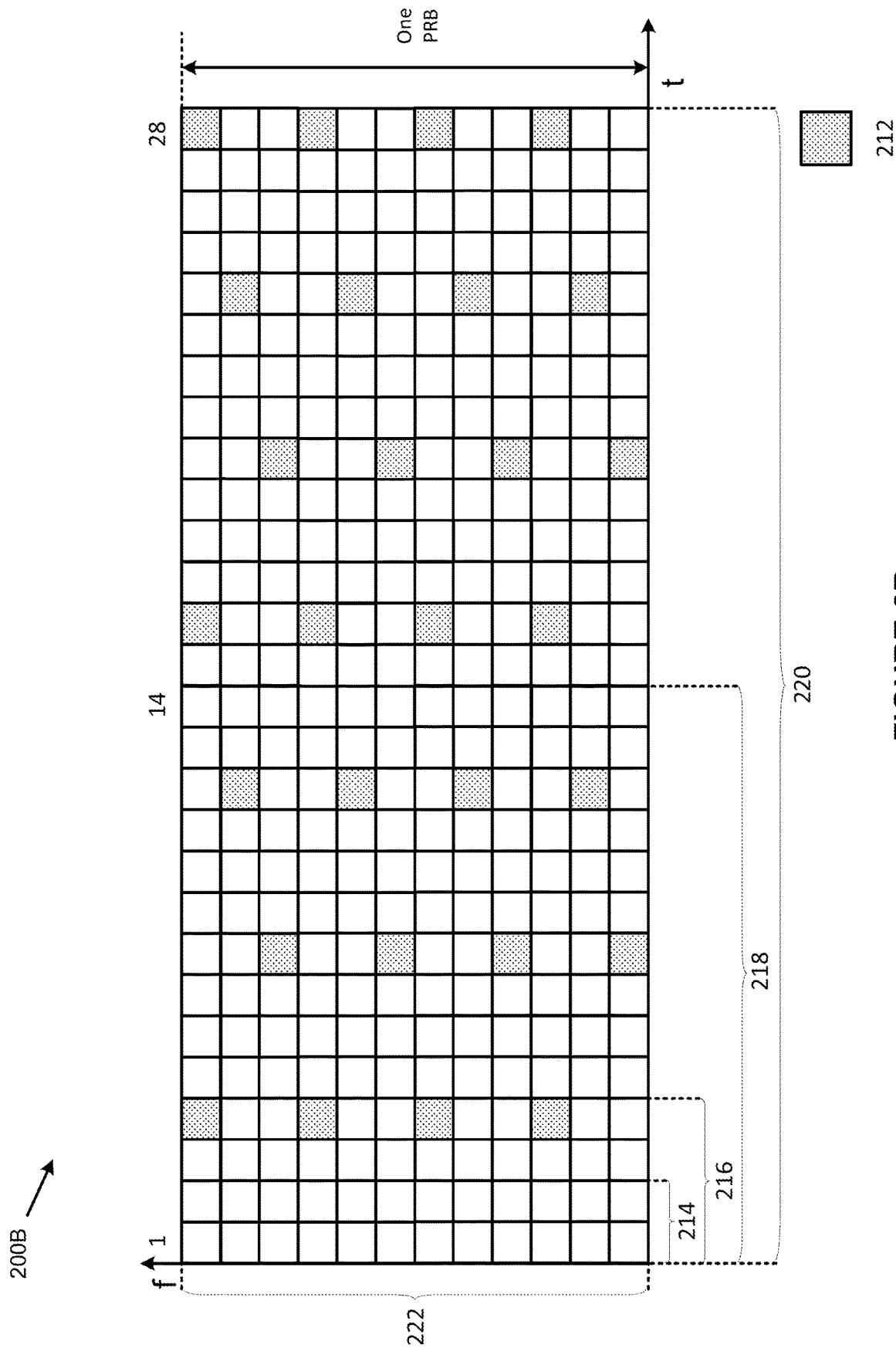
Figure 2C:
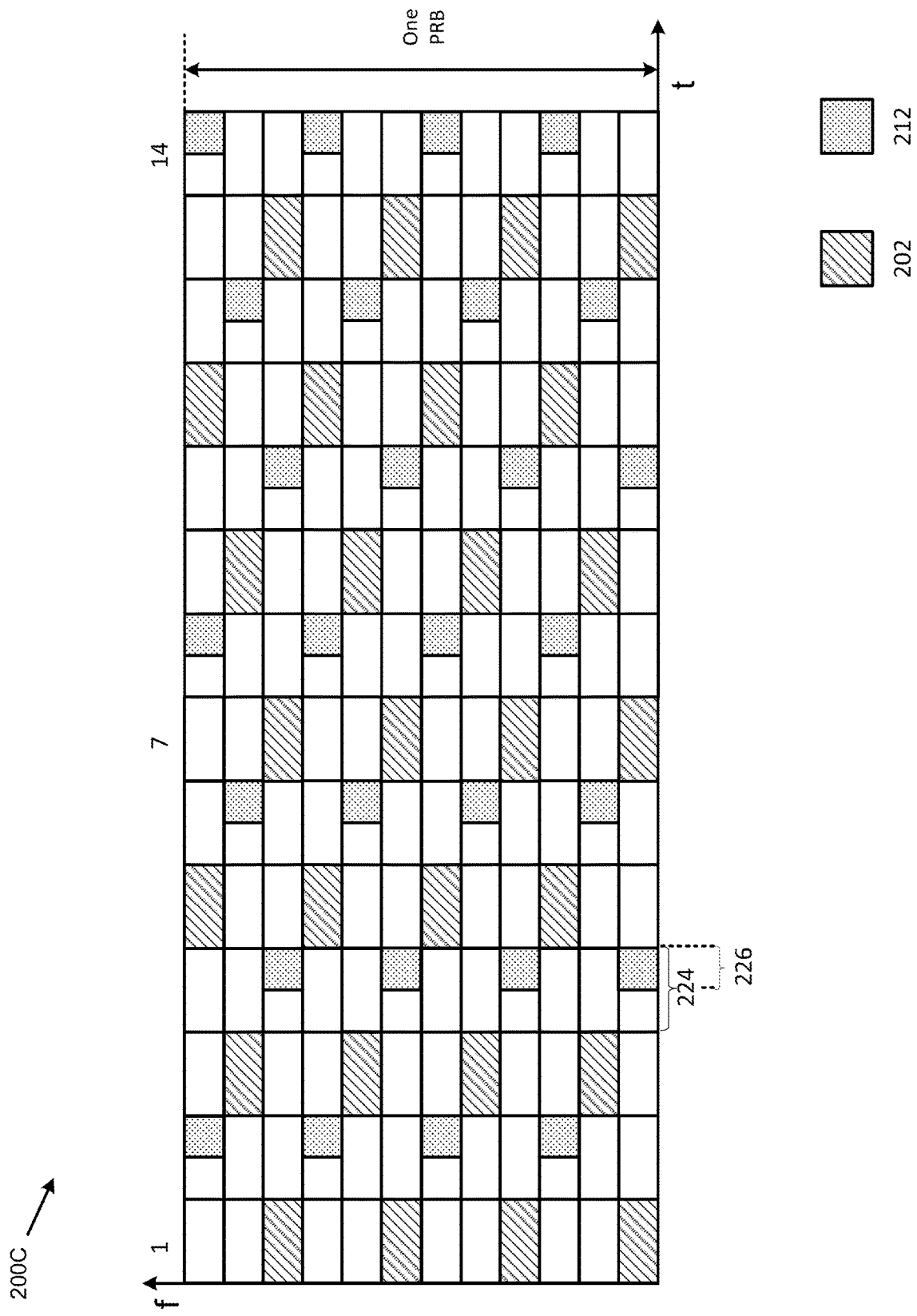

FIGS. 2A-2C are three block diagrams 200A, 200B, and 200C, that illustrate example PRS transmissions patterns when the PRSs are scheduled to be spread among two different SCSs, according to an example implementation of the present disclosure. Specifically, FIG. 2A illustrates a 15 kHz subframe 208 having symbols 204 (at 15 kHz) with a time pattern of two symbols 206. Additionally, as shown in the figure, subframe 208 has 12 subcarriers 210 and has a 15 kHz (e.g., in FR1) SCS. The size of one subframe (at 15 kHz) is equal to one slot including a total of 14 symbols in a time duration of 1.0 ms. Also shown in FIG. 2A are the transmissions of PRS 202 (e.g., SL transmissions by a Tx UE) in a set of symbols in each subcarrier of one PRB with a total of 28 PRS transmissions per subframe.

FIG. 2B illustrates a 30 kHz subframe 220 having two symbols 214 (at 30 kHz) with a time pattern of four symbols 216. Additionally, as shown in the figure, subframe 220 has also 12 subcarriers 222 with a 30 kHz (e.g., in FR1) SCS. The size of one subframe (at 30 kHz) is equal to two slots including a total of 28 symbols in a time duration of 1.0 ms. Consequently, each slot 218 may include 14 symbols in a time duration of 0.5 ms. Also shown in FIG. 2B are the transmissions of PRS 212 (e.g., by the Tx UE) in a fraction of each of a second set of symbols in each sub-carrier of one PRB with a total of 28 PRS transmissions per subframe.

As discussed above, after scheduling the transmission of the first PRS 202 (as shown in FIG. 2A) to an Rx UE, the Tx UE may be required to schedule the transmission of a second PRS 212 (as shown in FIG. 2B) in a second set of symbols to an Rx UE, where the second set of symbols (e.g., of one BWP) may partially or completely coincide (e.g., in the time domain) with the first set of symbols (e.g., of another BWP). As such, the Tx UE may modify the scheduling of the second PRS 212 transmissions, such that there is at least a small gap between the end of each symbol of the first set that carries the first PRS 202 and the beginning of each symbol of the second set that carries the second PRS 212. It should be noted that the gap may not be necessarily between the end of the first symbol carrying PRS 202 and the beginning of the second symbol carrying PRS 212. For example, as shown in FIG. 2C, such a gap may be created by placing PRS 212 in a fraction of (e.g., second half of) each of the second set of symbols that carries PRS 212.

Some implementations may provide a configuration for configuring NR V2X PRS transmission resources when the NR V2X PRS resources are transmitted across multiple frequency layers. In some such implementations, the NR V2X PRS resource transmissions may be optimized across the multiple frequency layers to support the capabilities of a device (e.g., an Rx UE) that receives the PRS transmissions. For example, the NR V2X PRS resource transmissions may be optimized across the multiple frequency layers to support a staggered PRS pattern, such that no symbol level collisions may occur when the PRSs on different frequency layers (or different FRs) are transmitted. Implementing such a pattern for PRS transmissions may avoid the maximum output power that a Tx UE my produce (Pmax) issue, such that the transmitting UE may not need to distribute Tx power on different carrier bandwidths, and the receiving UE may not need to prioritize or drop the reception of PRSs on different carrier bandwidths that would otherwise collide in the time domain. To provide such a configuration (e.g., that optimizes the NR V2X PRS resource transmissions across the multiple frequency layers to support a staggered PRS pattern), some of the present implementations may configuring a particular Information Element (IE) (as described in more detail below) that describes the NR V2X resources used by the Tx UE for the transmissions of the PRSs.

FIG. 2C illustrates the transmissions of both PRS 202 and PRS 212 (e.g., by a Tx UE) in two different sets of symbols of two PRBs (that coincide in the time domain) having a total of 56 PRS transmissions. As shown in the figure, the PRSs (e.g., from different SL BWPs) are multiplexed in time and frequency across a subframe. In such a configuration, each SL BWP may be configured for a different carrier bandwidth and each carrier bandwidth may be configured with a different SCS configuration in some implementations.

As shown in FIG. 2C, the Tx UE has scheduled (or modified the original scheduling of) the transmissions of PRS 212 in a set of symbols 224, such that each PRS 212 is placed in a second half 226 of symbols 224, hence creating a minimal gap between the transmissions of PRS 202 and the transmissions of PRS 212 in the time domain. This way, the Rx UE (e.g., that is otherwise not capable of receiving and decoding the two PRSs in a timely manner) may gain enough time to switch from receiving PRS 202, receive PRS 212, and decode PRS 212 in time (successfully).

In the examples of FIGS. 2A-2C, the duration of a symbol that is used to transmit a PRS, that is less than the duration of $Sym^n_{max}$, may be known as $Sym^m$ and may be defined by the SCS configuration factor m, where m>n, and where the duration of the $Sym^m$ may be expressed as $2^{-m}$ ms. In the example shown in FIGS. 2A-2C, the transmission(s) of the symbol of duration $Sym^m$ that carries a PRS 212 aligns in time (not frequency) with any one of the fractional parts of a symbol of duration $Sym^n_{max}$, where a symbol of duration $Sym^n_{max}$ does not also carry a PRS 202, where the fractional part of a symbol of duration $Sym^n_{max}$ may be expressed as $1/(2^{(m-n)})$. In the illustrated example, the fraction of the symbol of duration $Sym^n_{max}$, which is a symbol of duration $Sym^m$ may be transmitted in the second fractional part of the symbol of duration $Sym^n_{max}$ in the time domain. In other words, as discussed above, duration 204 may indicate a 1 symbol duration (e.g., at 15 kHz) and duration 206 may indicate a time pattern of two symbols. As such, as shown in the figure, only two SCSs may be configured, such that n=0, thus symbols of type $Sym^n_{max}$=1.0 ms, and m=1, thus symbols of type $Sym^m$=0.5 ms.

Figure 3A:
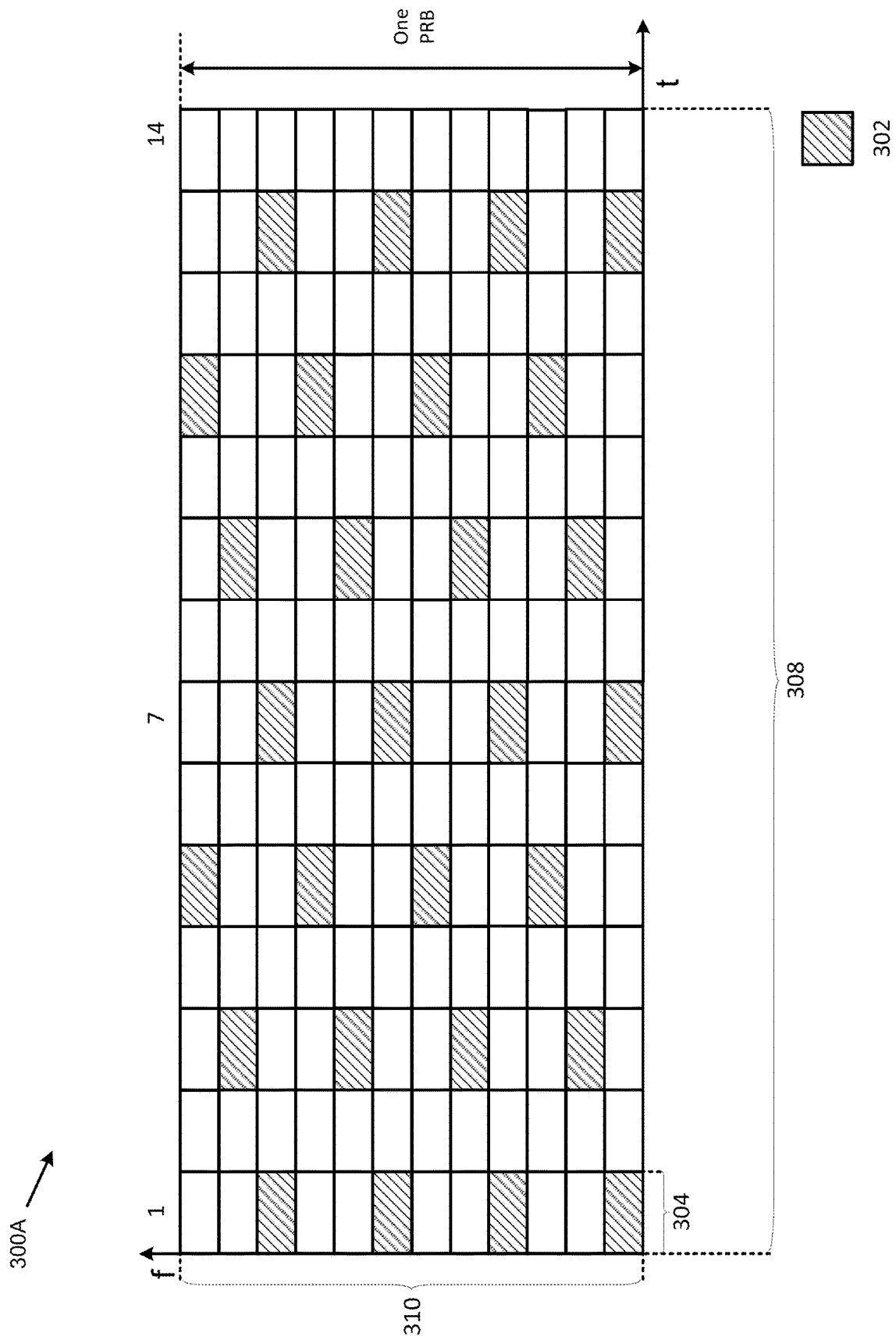
FIGS. 3A-3C are three block diagrams that illustrate another example PRS transmissions patterns, according to an example implementation of the present disclosure.
Figure 3B:
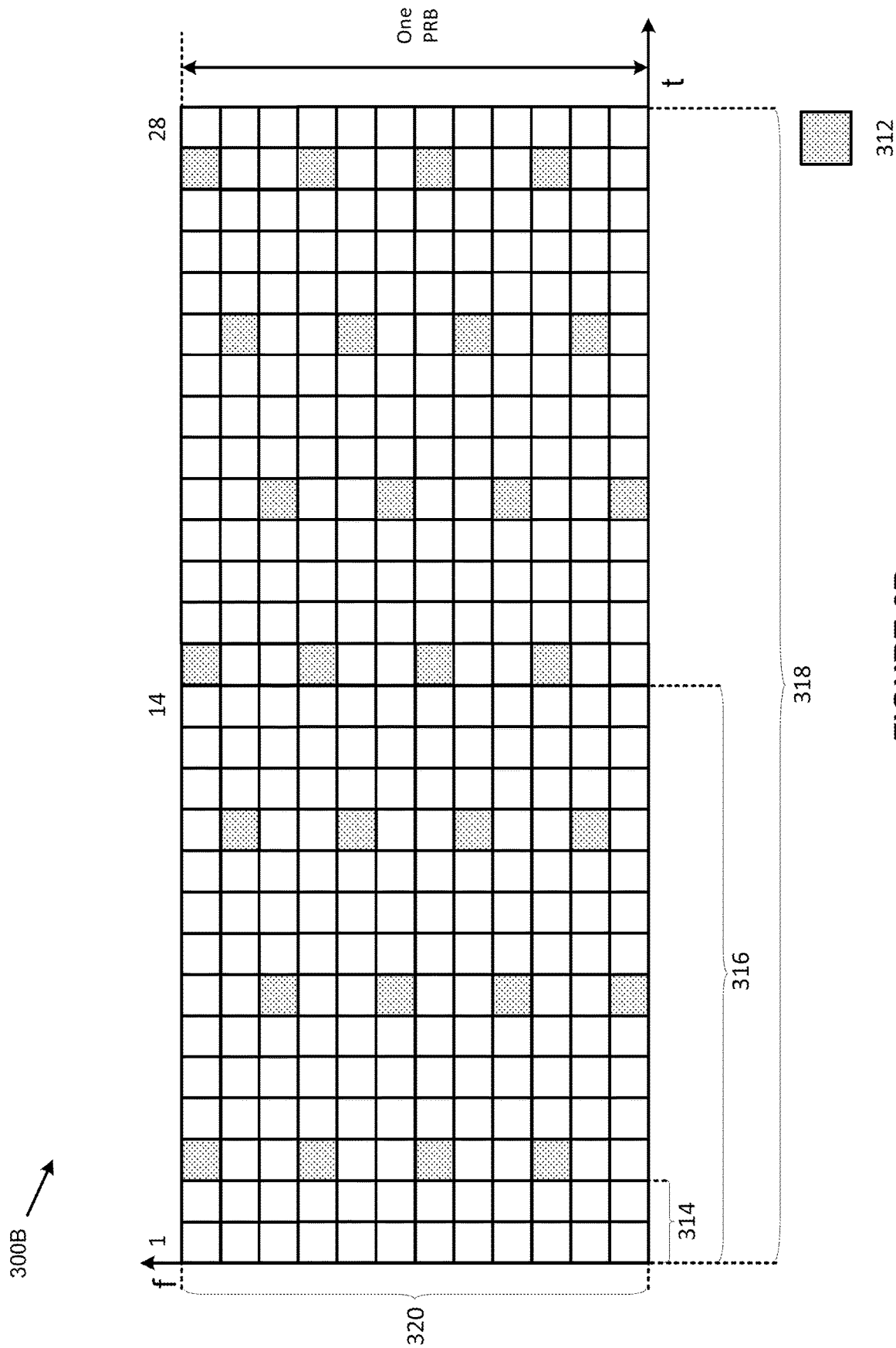
Figure 3C:
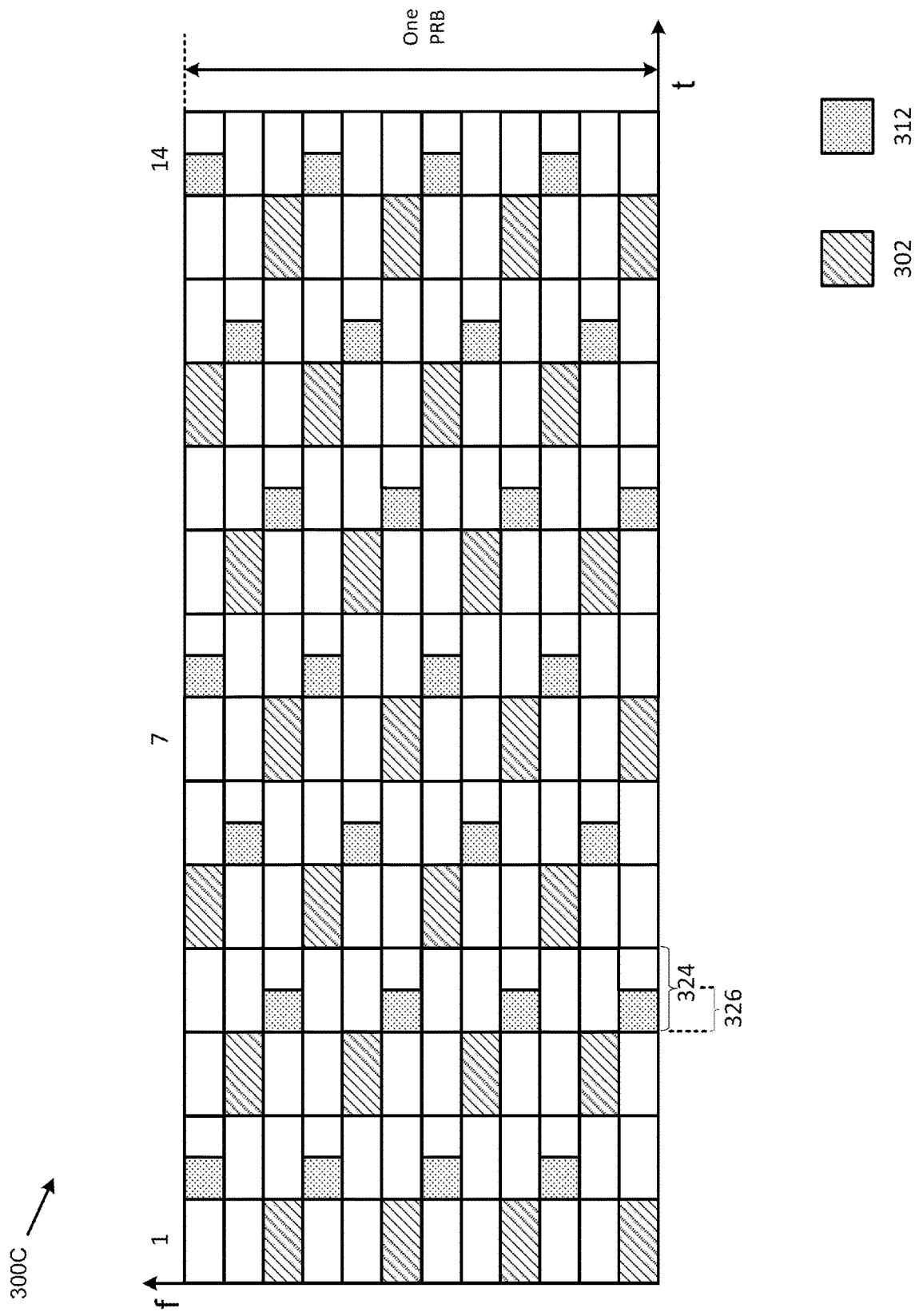

FIGS. 3A-3C are three block diagrams 300A, 300B, and 300C, that illustrate another example PRS transmissions patterns, according to an example implementation of the present disclosure. Specifically, FIG. 3A illustrates a 15 kHz subframe 308 having different symbols 304 (at 15 kHz) at different frequency layers. Additionally, as shown in the figure, subframe 308 has 12 subcarriers 310 and has a 15 kHz (e.g., in FR1) SCS. The size of one subframe (at 15 kHz) is equal to one slot including a total of 14 symbols in a time duration of 1.0 ms. Also shown in FIG. 3A are the transmissions of PRS 302 (e.g., SL transmissions by a Tx UE) in a set of symbols in each subcarrier of one PRB with a total of 28 PRS transmissions per subframe.

FIG. 3B illustrates a 30 kHz subframe 318 having two symbols 314 (at 30 kHz). Additionally, as shown in the figure, subframe 318 has also 12 subcarriers 320 with a 30 kHz (e.g., in FR1) SCS. The size of one subframe (at 30 kHz) is equal to two slots including a total of 28 symbols in a time duration of 1.0 ms. Consequently, each slot 316 may include 14 symbols in a time duration of 0.5 ms. Also shown in FIG. 3B are the transmissions of PRS 312 (e.g., by the Tx UE) in a fraction of each of a second set of symbols in each sub-carrier of one PRB with a total of 28 PRS transmissions per subframe.

FIG. 3C illustrates the transmissions of both PRS 302 and PRS 312 (e.g., by a Tx UE) in two different sets of symbols of two PRBs (that overlap each other in the time domain) having a total of 56 PRS transmissions. As shown in the figure, the PRSs (e.g., from different SL BWPs) are multiplexed in time and frequency across a subframe. In such a configuration, each SL BWP may be configured for a different carrier bandwidth and each carrier bandwidth may be configured with a different SCS configuration in some implementations.

As shown in FIG. 3C, the transmissions of PRS 312 in a set of symbols 324 has been originally scheduled, such that each PRS 312 is placed in a first half 326 of symbols 324. With such a configuration, there may not be an enough gap (e.g., in the time domain) between the transmissions of PRS 302 and the transmissions of PRS 312. In some implementations, a Tx UE may inquire about the Rx UE's capabilities. In some such implementations, if the information received from the Rx UE indicate that the Rx UE is capable enough (e.g., when the processing unit(s) of the Rx UE performs above a threshold and/or the reception unit(s) of the Rx UE performs above a threshold), the Tx UE may not change the transmission pattern (or scheduling) of PRS 312. Therefore, the transmission pattern shown in FIG. 3C may be applied to PRS 302 and PRS 312. That is, each PRS 312 may be carried in a symbol (e.g., first half of the symbol) immediately after the symbol that carries PRS 302.

On the other hand, if the Rx UE is determined to be incapable of receiving and decoding the two PRSs (e.g., that belong to two different BWPs) in a timely manner (e.g., when the processing unit(s) of the Rx UE performs under a threshold and/or the reception unit(s) of the Rx UE performs under a threshold), the Tx UE may modify the scheduling of PRS 312 (and/or PRS 302), such that there is a threshold gap in time between the receptions of each PRS 302 and a following PRS 312, such as the gap shown in FIG. 2C between each PRS 202 and its following PRS 212. This way, the Rx UE may gain enough time after receiving each PRS 302 to switch, receive, and decode each following PRS 312 successfully.

In the examples of FIGS. 3A-3C, the duration of a symbol that is used to transmit a PRS that is less than the duration of $Sym^n_{max}$ may be known as $Sym^m$ and may be defined by the SCS configuration factors m, where m>n, and where the duration of the $Sym^m$ may be expressed as $2^{-m}$ ms. In the examples shown in FIGS. 3A-3C, the transmission(s) of the symbol of duration $Sym^m$ that carries a PRS may align in time (not frequency) with any one of the fractional parts of a symbol of duration $Sym^n_{max}$, where a symbol of duration $Sym^n_{max}$ may not also carry a PRS, where the fractional part of a symbol of duration $Sym^n_{max}$ may be expressed as $1/(2^{(m-n)})$. Additionally, in the example of FIGS. 3A-3C, the fraction of the symbol of duration $Sym^n_{max}$ in which a symbol of duration $Sym^m$ is transmitted is the first fractional part of the symbol of duration $Sym^n_{max}$ in time. In this example, only two SCS are configured such that n=0, thus symbols of type $Sym^n_{max}$=1.0 ms, and m=1, thus symbols of type $Sym^m$=0.5 ms In some implementations, a PRS may be transmitted by the Tx UE for the intended reception by an Rx UE. The PRS may be transmitted using a symbol of duration $Sym^n_{max}$ when the NR carrier used for transporting the symbol of duration $Sym^n_{max}$ is configured by the SCS configuration factor n. The PRS may be transmitted using a symbol of duration $Sym^m$ when the NR carrier used for transporting the symbol of duration $Sym^m$ is configured by the SCS configuration factor m, where m>n.

In some implementations, the start of a transmission of a symbol of duration $Sym^m$ may align in time with a transmission of a symbol of duration $Sym^n_{max}$. In some such implementations, the start of the transmission of the symbol of duration $Sym^m$ may be offset in time from the start of the transmission of the symbol of duration $Sym^n_{max}$, where the offset may be expressed as a multiple of the fraction $1/(2^{(m-n)})$ of the duration of the $Sym^n_{max}$ symbol period, and where the multiple is a member of the set $[0$ to $(2^{(m-n)}-1)]$.

In some implementations, the transmission of a symbol of duration $Sym^n_{max}$ that may align in time with a transmission of a symbol of duration $Sym^m$ that is carrying a PRS intended for reception by an Rx Sidelink UE may not also transmit a PRS that is intended for the same Rx UE, as transmitted by the symbol of duration $Sym^m$.

Figure 4A:
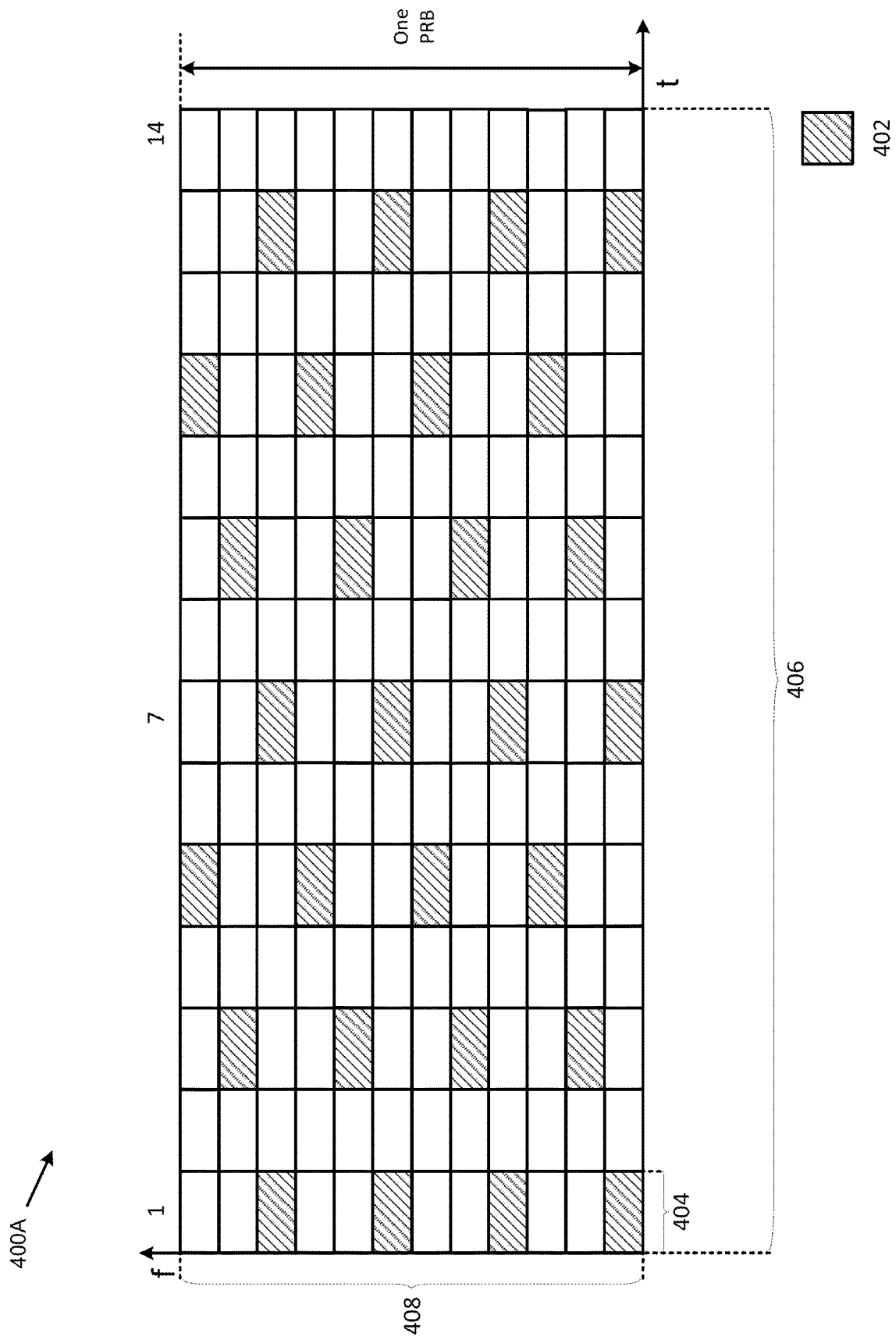
FIGS. 4A-4C are three block diagrams that illustrate another example PRS transmissions patterns, according to an example implementation of the present disclosure.
Figure 4B:
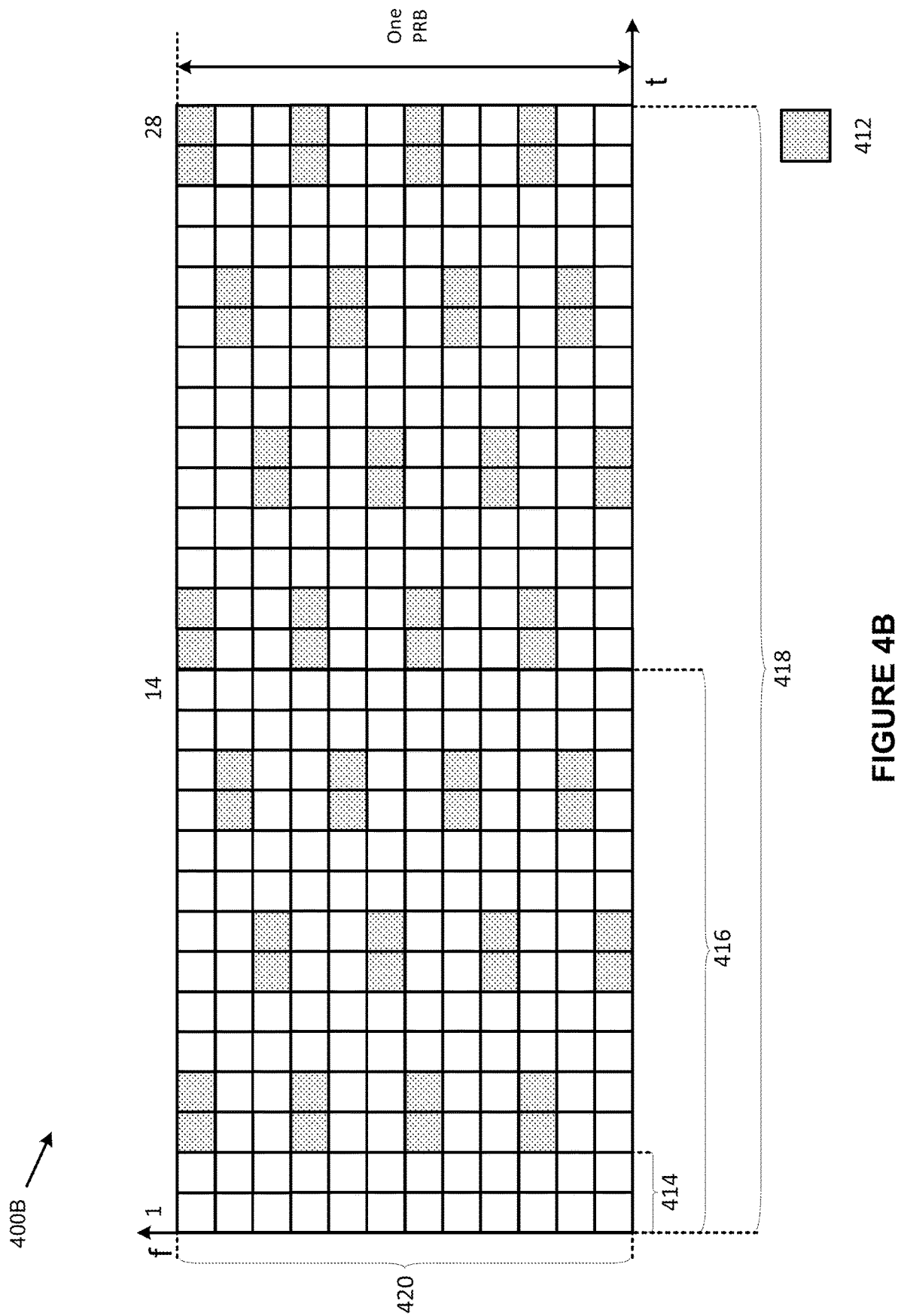
Figure 4C:
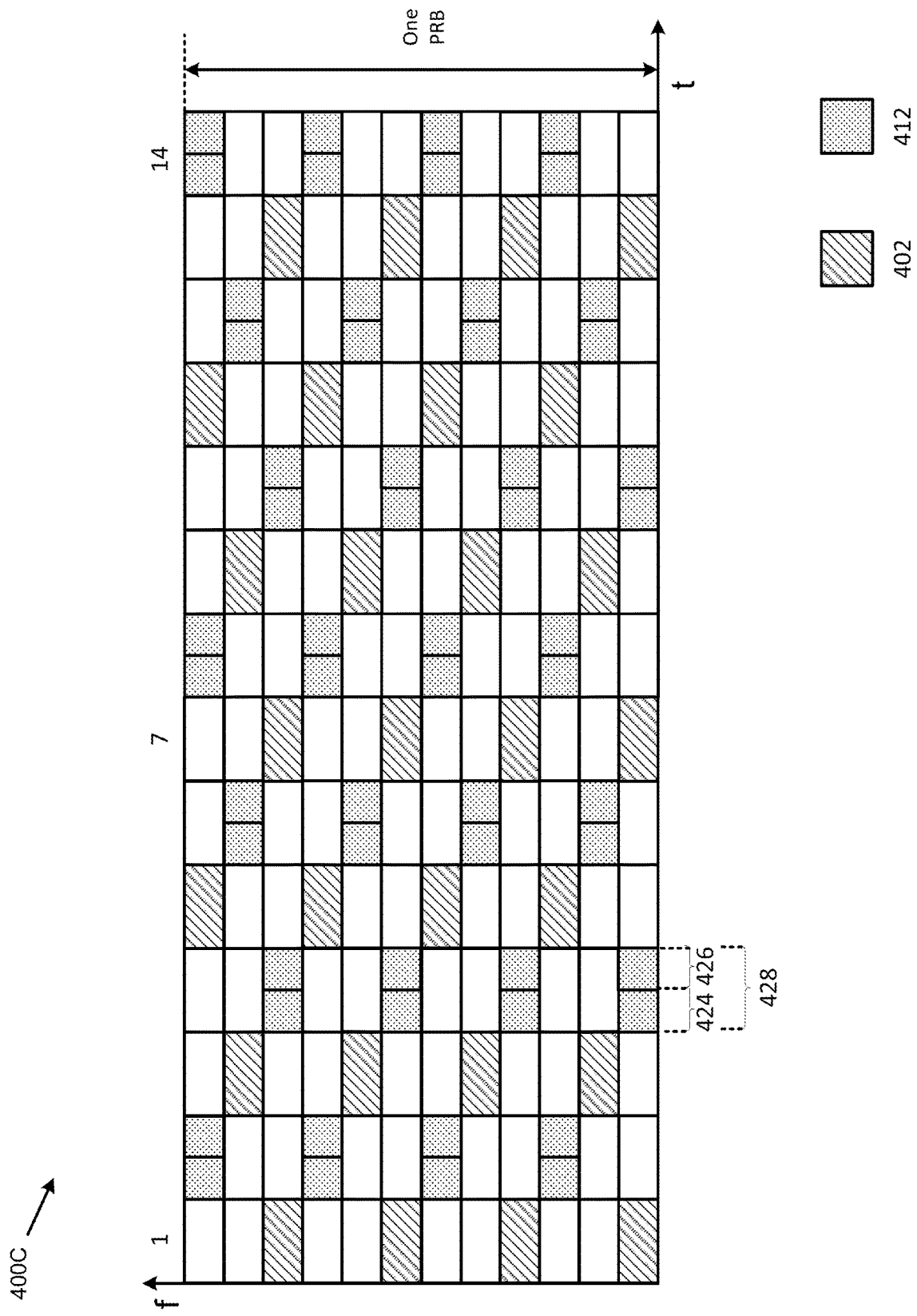

FIGS. 4A-4C are three block diagrams 400A, 400B, and 400C, that illustrate another example PRS transmissions patterns, according to an example implementation of the present disclosure. Specifically, FIG. 4A illustrates a 15 kHz subframe 406 having different symbols 404 (at 15 kHz) at different frequency layers. Additionally, as shown in the figure, subframe 406 has 12 subcarriers 408 and has a 15 kHz (e.g., in FR1) SCS. The size of one subframe (at 15 kHz) is equal to one slot including a total of 14 symbols in a time duration of 1.0 ms. Also shown in FIG. 4A are the transmissions of PRS 402 (e.g., SL transmissions by a Tx UE) in a set of symbols in each subcarrier of one PRB with a total of 28 PRS transmissions per subframe.

FIG. 4B illustrates a 30 kHz subframe 418 having two symbols 414 (at 30 kHz). Additionally, as shown in the figure, subframe 418 has also 12 subcarriers 420 with a 30 kHz (e.g., in FR1) SCS. The size of one subframe (at 30 kHz) is equal to two slots including a total of 28 symbols in a time duration of 1.0 ms. Consequently, each slot 416 may include 14 symbols in a time duration of 0.5 ms. Also shown in FIG. 4B are the transmissions of PRS 412 (e.g., by the Tx UE) in each of both halves of each of a second set of symbols in each sub-carrier of one PRB with a total of 56 PRS transmissions per subframe.

FIG. 4C illustrates the transmissions of both PRS 402 and PRS 412 (e.g., by a Tx UE) in two different sets of symbols of two PRBs (that cover each other in the time domain) having a total of 84 PRS transmissions. As shown in the figure, the PRSs (e.g., from different SL BWPs) are multiplexed in time and frequency across a subframe. In such a configuration, each SL BWP may be configured for a different carrier bandwidth and each carrier bandwidth may be configured with a different SCS configuration in some implementations.

As shown in FIG. 4C, the transmissions of PRS 412 in a set of symbols 428 has been scheduled, such that each PRS 412 is placed in both first half 424 and second half 426 of symbols 428. With such a configuration, there may not be an enough gap (e.g., in the time domain) between the transmissions of PRS 402 and the transmissions of PRS 412. In some implementations, a Tx UE may inquire about the Rx UE's capabilities. In some such implementations, if the information received from the Rx UE indicate that the Rx UE is capable enough (e.g., when the processing unit(s) of the Rx UE performs above a threshold and/or the reception unit(s) of the Rx UE performs above a threshold), the Tx UE may not change the transmission pattern (or scheduling) of PRS 412 (or PRC 402). Therefore, the transmission pattern shown in FIG. 4C may be applied to PRS 402 and PRS 412. That is, each PRS 412 may be carried in a symbol (e.g., each half of the symbol) immediately after the symbol that carries PRS 402.

In the examples of FIGS. 4A-4C, the duration of the symbol that is used to transmit a PRS, that is less than the duration of $Sym^n_{max}$, may be known as $Sym^m$ and may be defined by the SCS configuration factor m, where m>n, and where the duration of the $Sym^m$ may be expressed as $2^{-m}$ ms. In some implementations, the transmission(s) of the symbol of duration $Sym^m$ that carries a PRS may align in time (and not frequency) with any one of the fractional parts of a symbol of duration $Sym^n_{max}$, where a symbol of duration $Sym^n_{max}$ may not also carry a PRS. In some implementations, the fractional part of a symbol of duration $Sym^n_{max}$ may be expressed as $1/(2^{(m-n)})$. In this example, the fraction of the symbol of duration $Sym^n_{max}$ in which a first symbol of duration $Sym^m$ is transmitted is the first fractional part of the symbol of duration $Sym^n_{max}$ in time and the fraction of the symbol of duration $Sym^n_{max}$ in which a second symbol of duration $Sym^m$ is transmitted is the second fractional part of the symbol of duration $Sym^n_{max}$ in time.

In the examples shown in FIGS. 4A-4C, only two SCS are configured such that n=0, thus symbols of type $Sym^n_{max}$,=1.0 ms, and m=1, thus symbols of type $Sym^m$ 0.5 ms. In some implementations, a PRS may be transmitted by the Tx UE for the intended reception by an Rx UE. A PRS may be transmitted using a symbol of duration $Sym^n_{max}$ when the NR carrier used for transporting the symbol of duration $Sym^n_{max}$ is configured by the SCS configuration factor n. A first PRS may be transmitted using a first symbol of duration $Sym^m$ when the NR carrier used for transporting the symbol of duration $Sym^m$ is configured by the SCS configuration factor m, where m>n. Additionally, a second PRS may be transmitted using a second symbol of duration Sym$^m$ when the NR carrier used for transporting the symbol of duration Sym$^m$ is configured by the SCS configuration factor m, where m>n.

The start of a transmission of a first symbol of duration Sym$^m$ may align in time with a transmission of a symbol of duration Sym$^n_{max}$. In some implementations, the start of the transmission of the symbol of duration Sym$^m$ may be offset in time from the start of the transmission of the symbol of duration Sym$^n_{max}$, where the offset may be expressed as a multiple the fraction $1/(2^{(m-n)})$ of the duration of the Sym$^n_{max}$ symbol period, where the multiple is a member of the set $[0$ to $(2^{(m-n)}-1)]$.

In some implementations, the start of a transmission of a second symbol of duration Sym$^m$ may align in time with a transmission of a symbol of duration Sym$^n_{max}$, where the start of the transmission of the symbol of duration Sym$^m$ may be offset in time from the start of the transmission of the symbol of duration Sym$^n_{max}$, where the offset may be expressed as a multiple the fraction $1/(2^{(m-n)})$ of the duration of the Sym$^n_{max}$ symbol period, and where the multiple is a member of the set $[0$ to $(2^{(m-n)}-1)]$.

In some implementations, the start of the transmission of a first symbol of duration Sym$^m$ and the start of the transmission of a second symbol of duration Sym$^n_{max}$ may not align in time. In some implementations, the transmission of a symbol of duration Sym$^n_{max}$ that may align in time with a transmission of a symbol of duration Sym$^m$ that is carrying a PRS intended for reception by an Rx UE, may not also transmit a PRS that is intended for the same Rx UE, as transmitted by the symbol of duration Sym$^m$.

In the above discussed examples (e.g., as shown in FIGS. 2A-4C), a PRS carried by a symbol of duration Sym$^m$ may be scheduled to align in time with either the first fraction part of a symbol of duration Sym$^n_{max}$, or the second fractional part, or in both fractional parts. However, given that a (low-cost) UE may not have the capability to retune from a carrier transmitting symbols of duration Sym$^n_{max}$ to a carrier transmitting symbols of duration Sym$^m$ in time to receive a symbol of duration Sym$^m$ when a symbol of duration Sym$^n_{max}$ and symbols of duration Sym$^m$ are transmitted sequentially in time, some implementations may provide a scheduling process that considers the relationship (e.g., in the time domain) between the transmission of a first symbol of duration Sym$^n_{max}$ carrying a PRS on a first SL BWP and a subsequent symbol of duration Sym$^m$ carrying a PRS on a second SL BWP.

For example, given the configuration of examples described with reference to FIGS. 4A-4C, a symbol of duration Sym$^m$ may occur in both the first fractional part of a symbol of duration Sym$^n_{max}$, and the second fractional part of a symbol of duration Sym$^n_{max}$. Thus, for this example, the scheduling process (e.g., of a low-capacity Rx UE) may have no opportunity to consider the placement of a subsequent symbol of duration Sym$^m$ in either the first or the second fractional part of a symbol of duration Sym$^n_{max}$ as symbols of duration Sym$^m$ are scheduled to occur in both fractional parts of Sym$^n_{max}$.

However, given the configurations described above with reference to FIGS. 2A-2C and FIGS. 3A-3C, one of these configurations may provide a better opportunity for a (low-cost) Rx UE to receive a subsequent symbol of duration Sym$^m$ and as such, when an opportunity exists, a scheduling process of some implementations may take into consideration in which fractional part of a symbol of duration Sym$^n_{max}$ a subsequent symbol of duration Sym$^m$ may be optimally scheduled to align with.

In the example of FIGS. 2A-2C, a subsequent symbol of duration Sym$^m$ was placed in the second fractional part of a symbol of duration Sym$^n_{max}$ which may provide for a time period (a duration of one Sym$^m$) during which no PRS may be transmitted. Such a time period (or gap) may be sufficient for a (low-cost) UE to retune from a carrier transmitting symbols of duration Sym$^n_{max}$ to a carrier transmitting symbols of duration Sym$^m$. Additionally, as the CP of Sym$^n_{max}$ may be longer than the CP of Sym$^n_{max}$, the CP of Sym$^n_{max}$ may provide the UE with sufficient time to retune from a carrier transmitting symbols of duration Sym$^m$ to a carrier transmitting symbols of duration Sym$^n_{max}$, such that the UE may not miss receiving and decoding the first symbol following the CP of Sym$^n_{max}$.

Figure 5A:
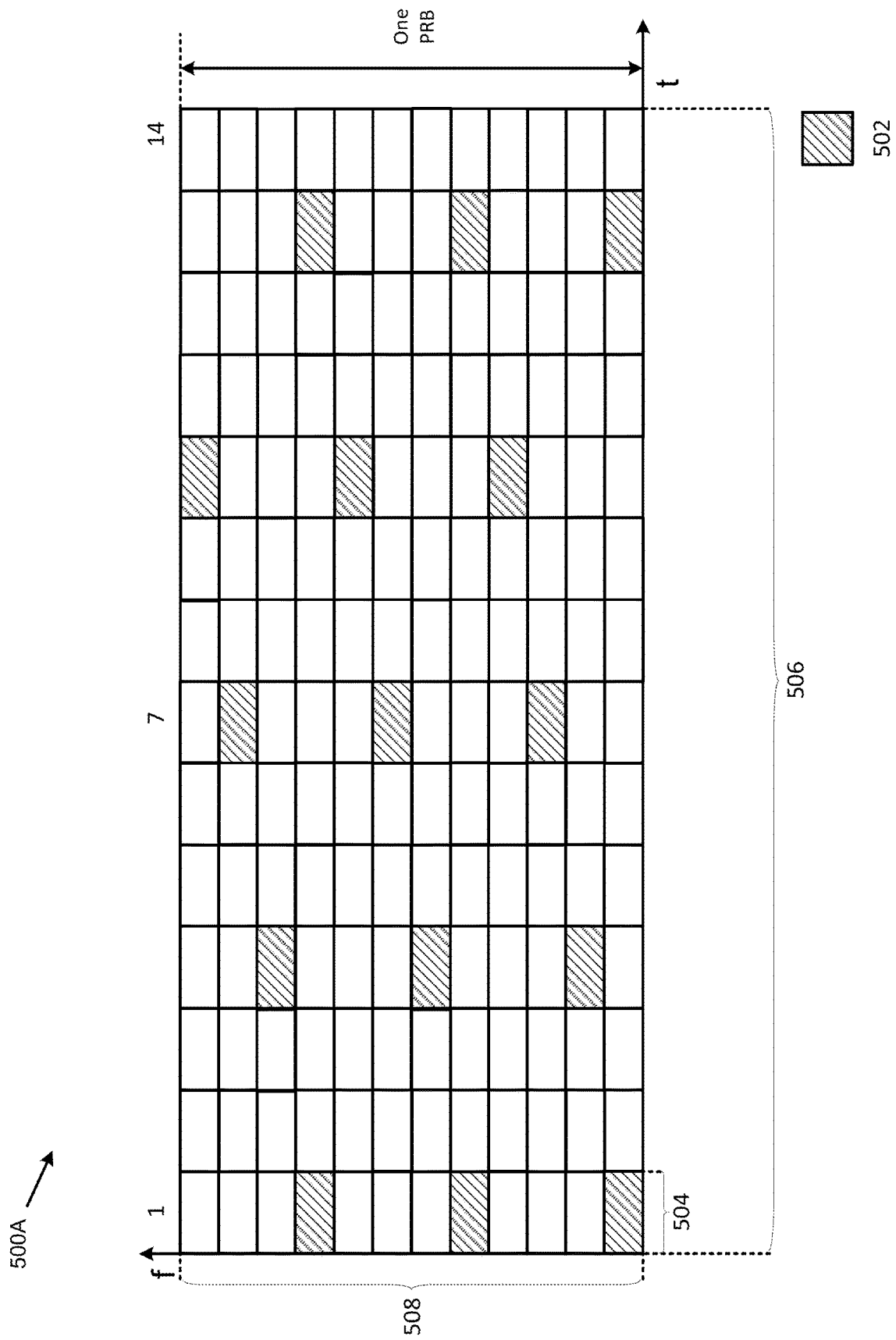
FIGS. 5A-5D are four block diagrams that illustrate example PRS transmissions patterns when the PRSs are scheduled to be spread among three different SCSs, according to an example implementation of the present disclosure.

FIGS. 5A-5D are four block diagrams 500A, 500B, 500C, and 500D, that illustrate example PRS transmissions patterns when the PRSs are scheduled to be spread among three different SCSs, according to an example implementation of the present disclosure. Specifically, FIG. 5A illustrates a 15 kHz subframe 506 having symbols 504 (at 15 kHz). Additionally, as shown in the figure, subframe 506 has 12 subcarriers 508 and has a 15 kHz (e.g., in FR1) SCS. The size of one subframe (at 15 kHz) is equal to one slot including a total of 14 symbols in a time duration of 1.0 ms. Also shown in FIG. 5A are the transmissions of PRS 502 (e.g., SL transmissions by a Tx UE) in a set of symbols in each subcarrier of one PRB with a total of 15 PRS transmissions per subframe.

Figure 5B:
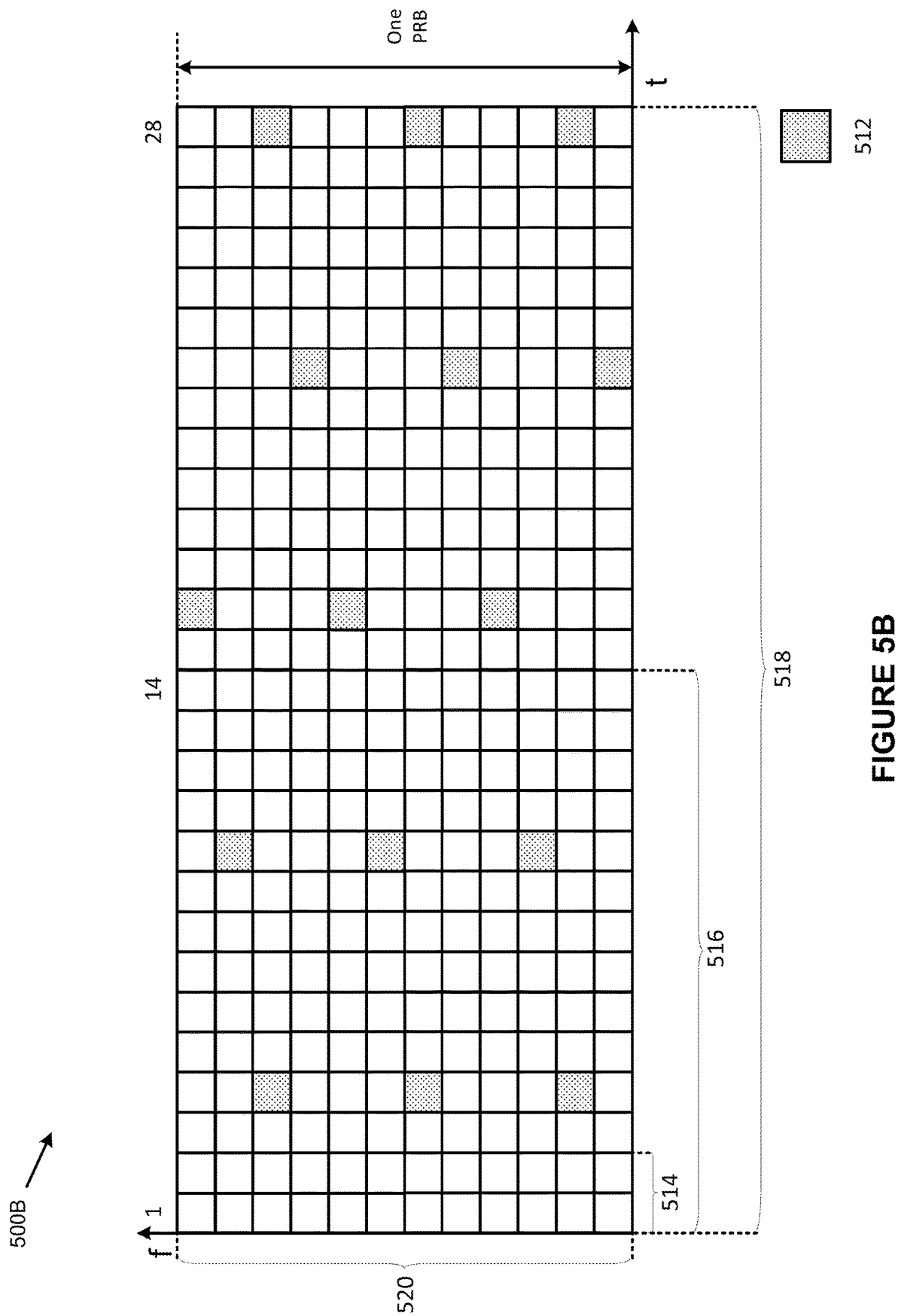

FIG. 5B illustrates a 30 kHz subframe 518 having two symbols 514 (at 30 kHz). Additionally, as shown in the figure, subframe 518 has 12 subcarriers 520 with a 30 kHz (e.g., in FR1) SCS. The size of one subframe (at 30 kHz) is equal to two slots including a total of 28 symbols in a time duration of 1.0 ms. Consequently, each slot 516 may include 14 symbols in a time duration of 0.5 ms. Also shown in FIG. 5B are the transmissions of PRS 512 (e.g., by the Tx UE) in a fraction of each of a second set of symbols in each sub-carrier of one PRB with a total of 15 PRS transmissions per subframe.

Figure 5C:
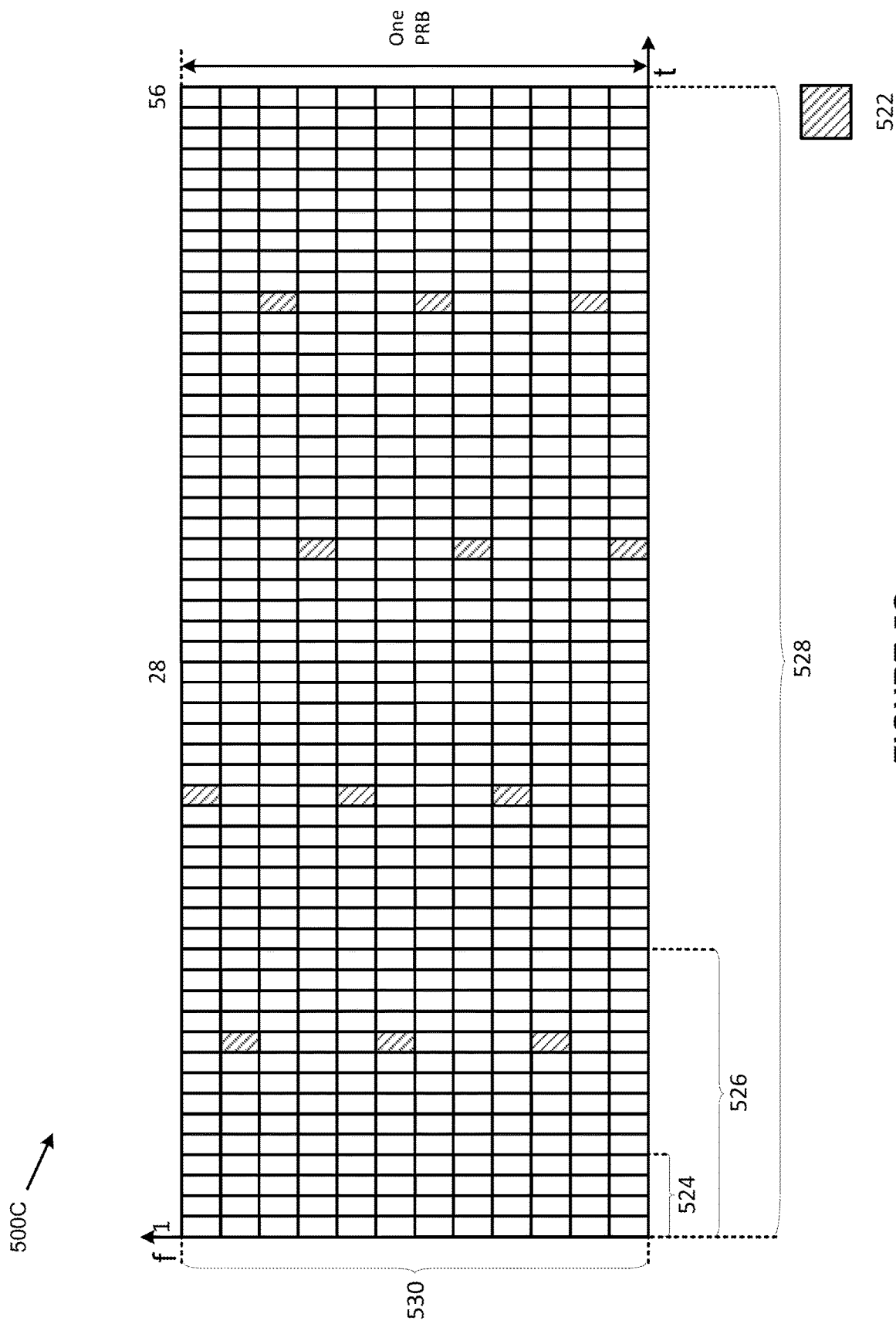

FIG. 5C illustrates a 60 kHz subframe 528 having four symbols 524 (at 60 kHz). Additionally, as shown in the figure, subframe 528 has 12 subcarriers 530 with a 60 kHz (e.g., in FR2) SCS. The size of one subframe (at 60 kHz) is equal to four slots including a total of 56 symbols in a time duration of 1.0 ms. Consequently, each slot 526 may include 14 symbols in a time duration of 0.25 ms. Also shown in FIG. 5C are the transmissions of PRS 522 (e.g., by the Tx UE) in a fraction of each of a third set of symbols in each sub-carrier of one PRB with a total of 12 PRS transmissions per subframe.

Figure 5D:
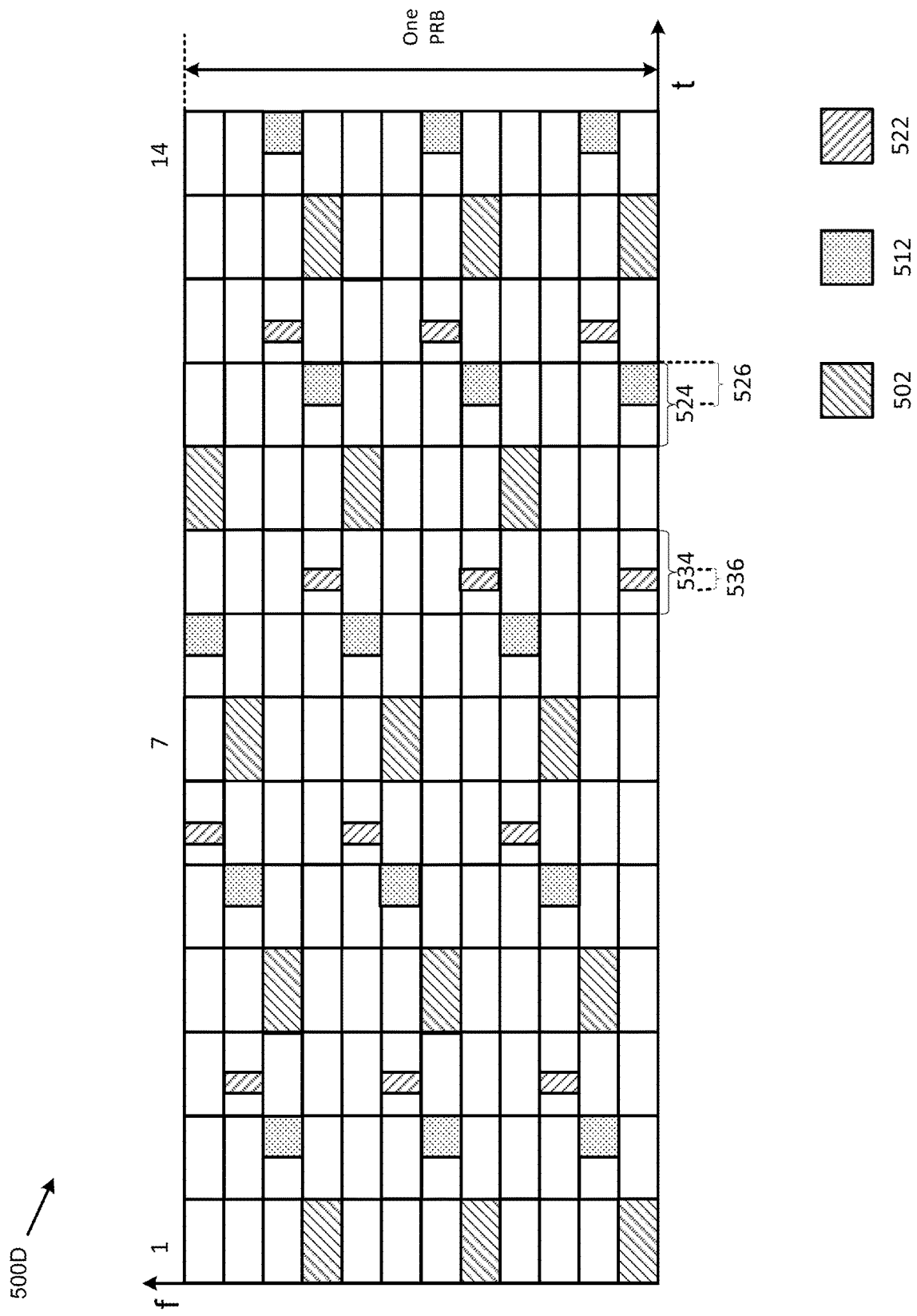

FIG. 5D illustrates the transmissions of three PRSs 502, 512, and 512 (e.g., by a Tx UE) in three different sets of symbols of three PRBs (that overlap each other in the time domain) having a total of 42 PRS transmissions. As shown in the figure, the PRSs (e.g., from different SL BWPs) are multiplexed in time and frequency across a subframe. In such a configuration, each SL BWP may be configured for a different carrier bandwidth and each carrier bandwidth may be configured with a different SCS configuration in some implementations.

As shown in FIG. 5D, the Tx UE has scheduled (or modified the original scheduling of) the transmissions of PRS 512 in a set of symbols 524, such that each PRS 512 is placed in a second half 526 of symbol 524, hence creating a minimal gap between the transmissions of PRS 502 and the transmissions of PRS 512 in the time domain. This way, the Rx UE (e.g., that is otherwise not capable of receiving and decoding the two PRSs in a timely manner) may gain enough time to switch from receiving PRS 502, receive PRS 512, and decode PRS 512 in time (successfully).

Additionally, as shown in FIG. 5D, the Tx UE has also scheduled (or modified the original scheduling of) the transmissions of PRS 522 in a set of symbols 534, such that each PRS 522 is placed in a fraction 536 of symbol 534, hence creating a minimal gap between the transmissions of PRS 502 and the transmissions of PRS 512 in the time domain, as well as creating another minimal gap between the transmissions of PRS 512 and the transmissions of PRS 522 in the time domain. This way, the Rx UE (e.g., that is otherwise not capable of receiving and decoding the three PRSs in a timely manner) may gain enough time to switch from receiving PRS 502 or PRS 512, receive PRS 522, and decode PRS 522 in time (successfully).

In the examples of FIGS. 5A-5D, the duration of the symbols that are used to transmit PRSs that are less than the duration of $Sym^n_{max}$ may be known as $Sym^m$ and $Sym^l$ and may be defined by the SCS configuration factors m and l, where l>m>n, and where the duration of the $Sym^m$ may be expressed as $2^{-m}$ms, and the duration of the $Sym^l$ may be expressed as $2^{-l}$ ms. In this example, the transmission(s) of the symbols of duration $Sym^m$ and $Sym^l$ that carries a PRS that may align in time (not frequency) with any one of the fractional parts of a symbol of duration $Sym^n_{max}$, where a symbol of duration $Sym^m$ may not also carry a PRS, and where the fractional part of a symbol of duration $Sym^n_{max}$ may be expressed as $1/(2^{(m-n)})$ when aligned with a symbol of duration $Sym^m$. In some implementations, the fractional part of a symbol of duration $Sym^n_{max}$ may be expressed as $1/(2^{(l-n)})$ when aligned with a symbol of duration $Sym^l$.

In some such implementations, the fraction of the symbol of duration $Sym^n_{max}$ in which a symbol of duration $Sym^m$ is transmitted may be the second fractional part of the symbol of duration $Sym^n_{max}$ in time. In some implementations, the fraction of the symbol of duration $Sym^n_{max}$ in which a symbol of duration $Sym^n_{max}$ is transmitted may be the second fractional part of the symbol of duration $Sym^n_{max}$ in time. In the examples described in FIGS. 5A-5D, only three SCSs are configured such that n=0, thus symbols of type $Sym^n_{max}$=1.0 ms, and m=1, thus symbols of type $Sym^m$=0.5 ms, and l=2, thus symbols of type $Sym^l$=0.25 ms.

In some implementations, a PRS may be transmitted by the Tx UE for the intended reception by an Rx UE. In some implementations, a PRS may be transmitted using a symbol of duration $Sym^n_{max}$ when the NR carrier used for transporting the symbol of duration $Sym^n_{max}$ is configured by the SCS configuration factor n. In some implementations, a PRS may be transmitted using a symbol of duration $Sym^m$ when the NR carrier used for transporting the symbol of duration $Sym^m$ is configured by the SCS configuration factor m, where m>n. Additionally, a PRS may be transmitted using a symbol of duration $Sym^l$ when the NR carrier used for transporting the symbol of duration $Sym^l$ is configured by the SCS configuration factor l, where l>m.

In some implementations, the start of a transmission of a symbol of duration $Sym^m$ may align in time with a transmission of a symbol of duration $Sym^n_{max}$, where the start of the transmission of the symbol of duration $Sym^m$ may be offset in time from the start of the transmission of the symbol of duration $Sym^n_{max}$ where the offset may be expressed as a multiple the fraction $1/(2^{(m-n)})$ of the duration of the $Sym^n_{max}$ symbol period, and where the multiple is a member of the set [0 to $(2^{(m-n)}-1)$].

In some implementations, the start of a transmission of a symbol of duration $Sym^l$ may align in time with a transmission of a symbol of duration $Sym^n_{max}$, where the start of the transmission of the symbol of duration $Sym^l$ may be offset in time from the start of the transmission of the symbol of duration $Sym^n_{max}$, where the offset may be expressed as a multiple the fraction $1/(2^{(l-n)})$ of the duration of the $Sym^n_{max}$ symbol period, and where the multiple is a member of the set [0 to $(2^{(l-n)}-1)$].

In some implementations, the transmission of a symbol of duration $Sym^n_{max}$ that may align in time with a transmission of a symbol of duration $Sym^m$ that is carrying a PRS intended for reception by an Rx UE may not also transmit a PRS that is intended for the same Rx UE, as transmitted by the symbol of duration $Sym^m$. Additionally, in some implementations, the transmission of a symbol of duration $Sym^n_{max}$ that may align in time with a transmission of a symbol of duration $Sym^l$ that is carrying a PRS intended for reception by an Rx UE may not also transmit a PRS that is intended for the same Rx UE, as transmitted by the symbol of duration $Sym^l$.

Figure 6A:
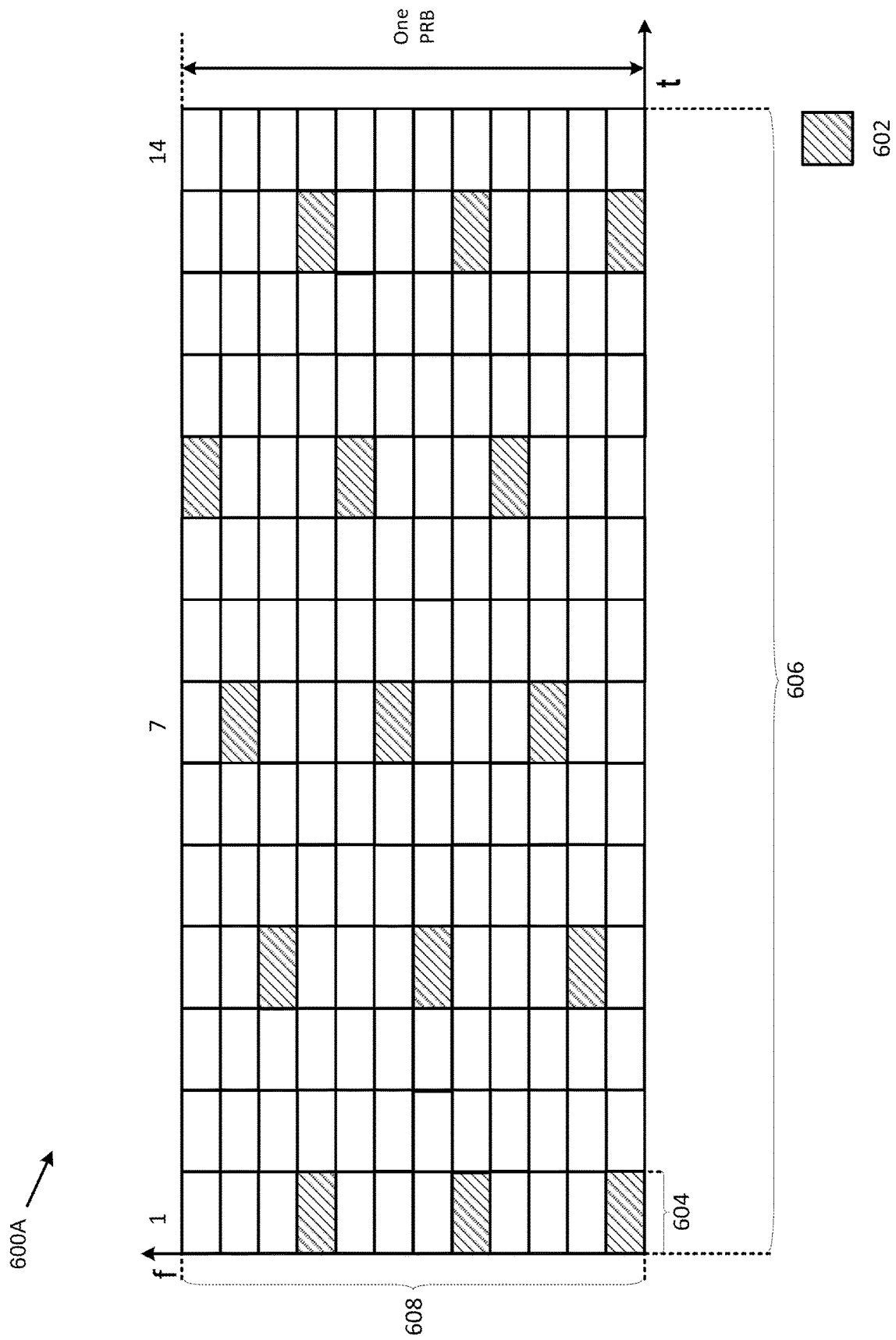
FIGS. 6A-6D are four block diagrams that illustrate another example PRS transmissions patterns, according to an example implementation of the present disclosure.

FIGS. 6A-6D are four block diagrams 600A, 600B, 600C, and 600D, that illustrate another example PRS transmissions patterns, according to an example implementation of the present disclosure. Specifically, FIG. 6A illustrates a 15 kHz subframe 606 having symbols 604 (at 15 kHz). Additionally, as shown in the figure, subframe 606 has 12 subcarriers 608 and has a 15 kHz (e.g., in FR1) SCS. The size of one subframe (at 15 kHz) is equal to one slot including a total of 14 symbols in a time duration of 1.0 ms. Also shown in FIG. 6A are the transmissions of PRS 602 (e.g., SL transmissions by a Tx UE) in a set of symbols in each subcarrier of one PRB with a total of 15 PRS transmissions per subframe.

Figure 6B:
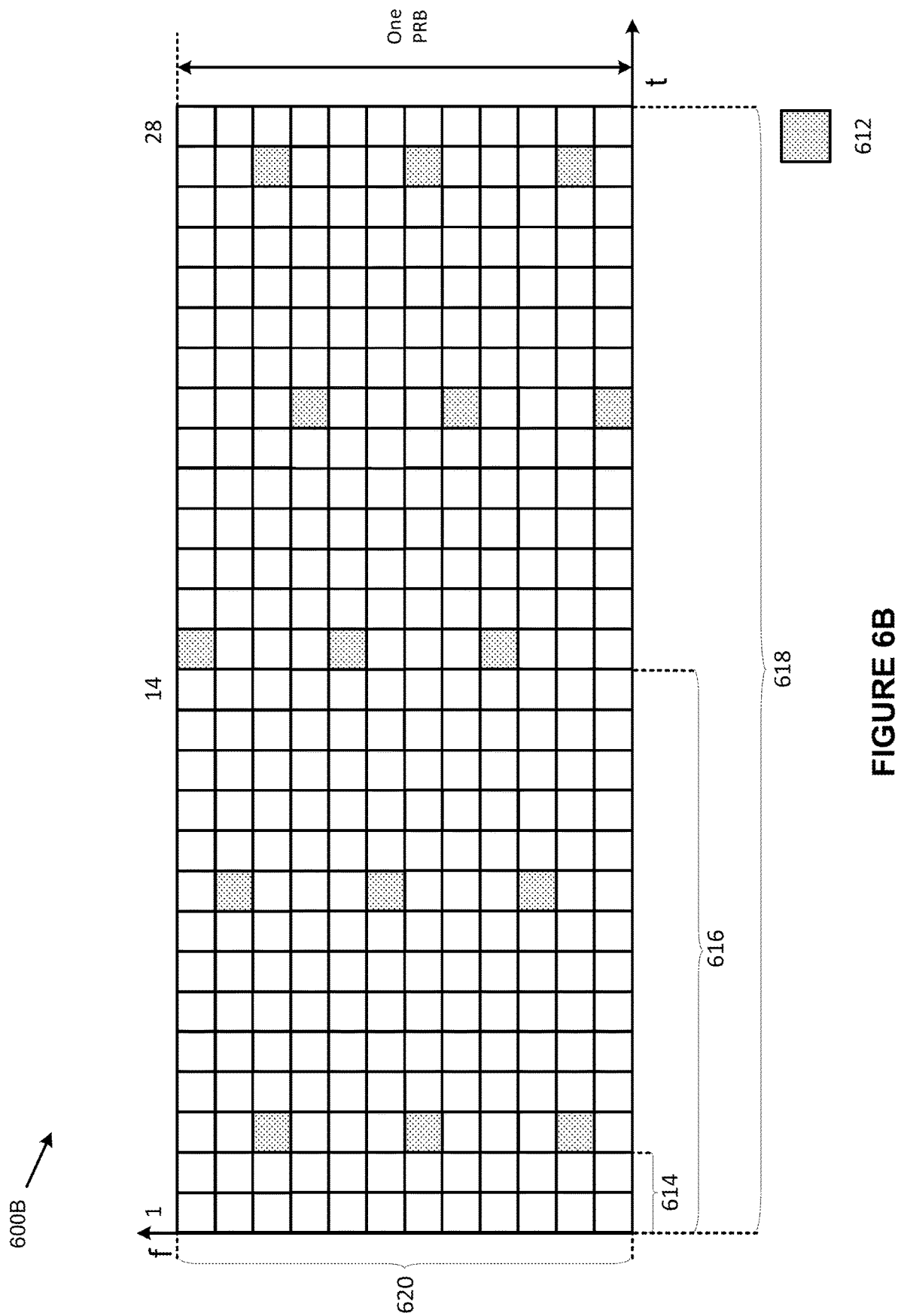

FIG. 6B illustrates a 30 kHz subframe 618 having two symbols 614 (at 30 kHz). Additionally, as shown in the figure, subframe 618 has 12 subcarriers 620 with a 30 kHz (e.g., in FR1) SCS. The size of one subframe (at 30 kHz) is equal to two slots including a total of 28 symbols in a time duration of 1.0 ms. Consequently, each slot 616 may include 14 symbols in a time duration of 0.5 ms. Also shown in FIG. 6B are the transmissions of PRS 612 (e.g., by the Tx UE) in a fraction of each of a second set of symbols in each sub-carrier of one PRB with a total of 15 PRS transmissions per subframe.

Figure 6C:
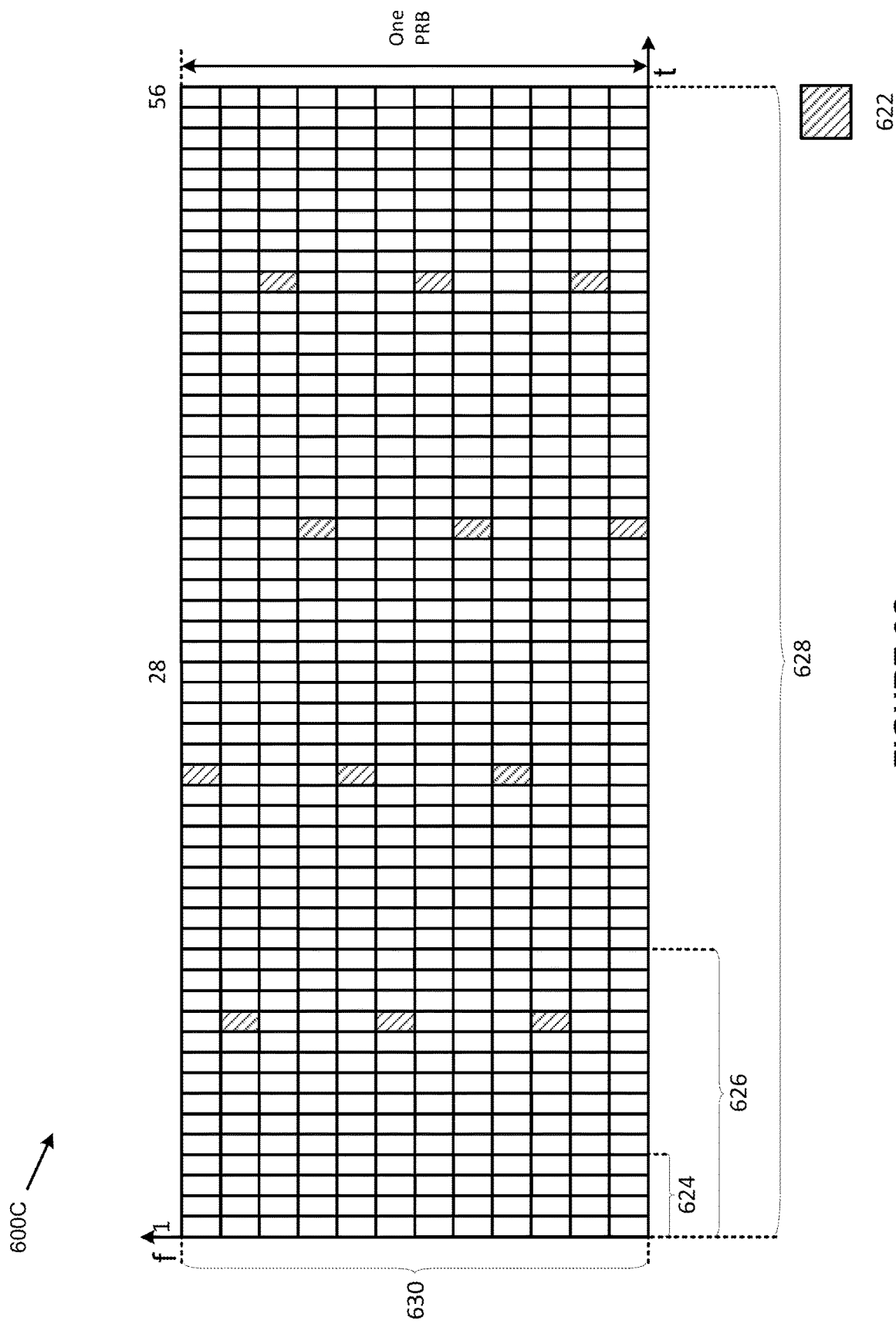

FIG. 6C illustrates a 60 kHz subframe 628 having four symbols 624 (at 60 kHz). Additionally, as shown in the figure, subframe 628 has 12 subcarriers 630 with a 60 kHz (e.g., in FR2) SCS. The size of one subframe (at 60 kHz) is equal to four slots including a total of 56 symbols in a time duration of 1.0 ms. Consequently, each slot 626 may include 14 symbols in a time duration of 0.25 ms. Also shown in FIG. 6C are the transmissions of PRS 622 (e.g., by the Tx UE) in a fraction of each of a third set of symbols in each sub-carrier of one PRB with a total of 12 PRS transmissions per subframe.

Figure 6D:
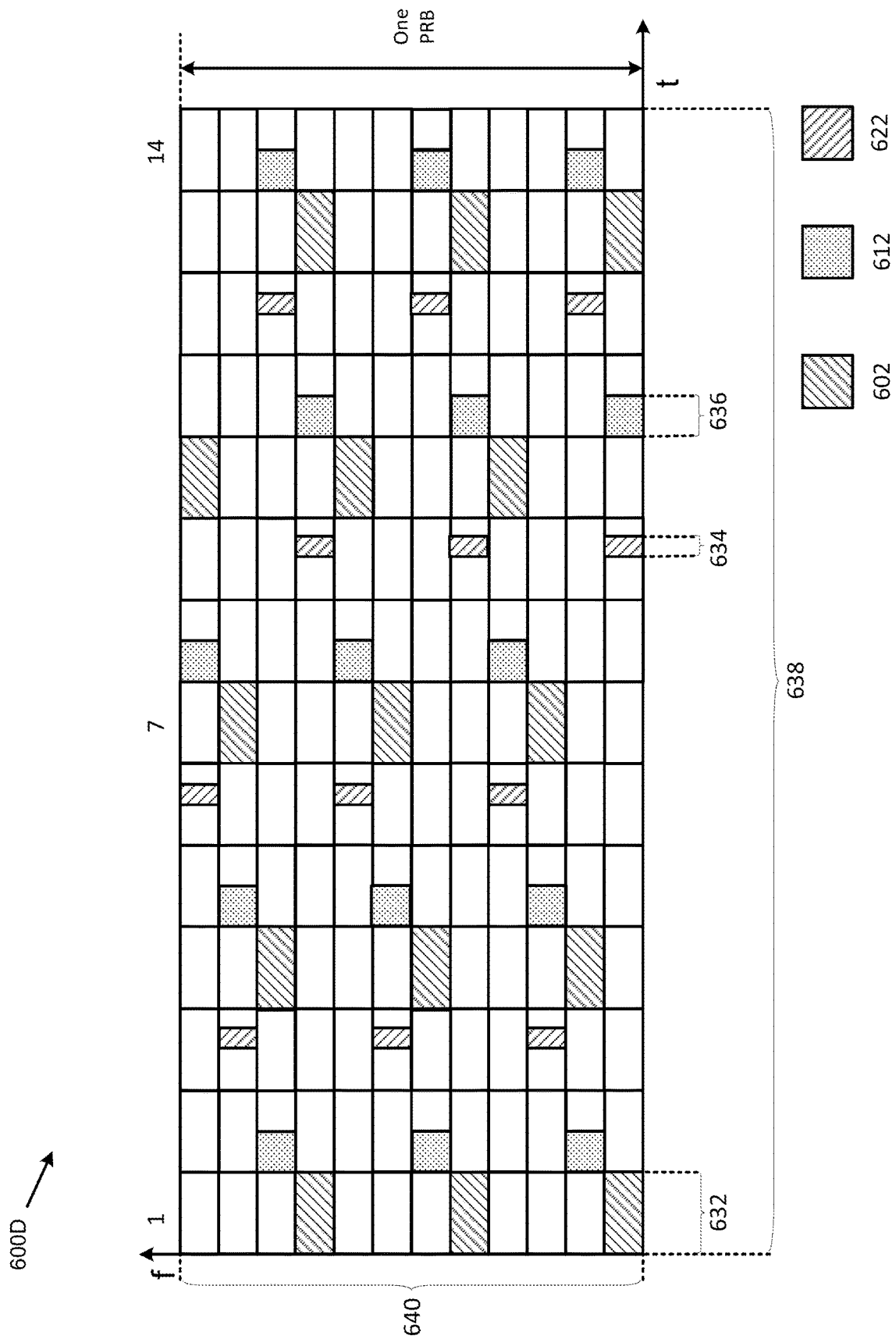

FIG. 6D illustrates the transmissions of three PRSs 602, 612, and 612 (e.g., by a Tx UE) in three different sets of symbols of three PRBs (that overlap each other in the time domain) having a total of 42 PRS transmissions. As shown in the figure, the PRSs (e.g., from different SL BWPs) are multiplexed in time and frequency across a subframe. In such a configuration, each SL BWP may be configured for a different carrier bandwidth and each carrier bandwidth may be configured with a different SCS configuration in some implementations.

As shown in FIG. 6D, the Tx UE has scheduled (or modified the original scheduling of) the transmissions of PRS 622 in a first set of symbols, such that each PRS 622 is placed in a fraction 634 of each symbol of the first set, hence creating a minimal gap between the transmissions of PRS 612 and the transmissions of PRS 622 in the time domain. This way, the Rx UE (e.g., that is otherwise not capable of receiving and decoding the two PRSs in a timely manner) may gain enough time to switch from receiving PRS 612, receive PRS 622, and decode PRS 622 in time (successfully). Furthermore, the Tx UE has scheduled (or modified the original scheduling of) the transmissions of PRS 622 in the first set of symbols, such that there is a minimal gap between the transmissions of PRS 622 (e.g., in fraction 634 of the symbol) and the transmissions of the following PRS 602 in the time domain. This way, the Rx UE (e.g., that is otherwise not capable of receiving and decoding the two PRSs in a timely manner) may gain enough time to switch from receiving PRS 622, receive the following PRS 602, and decode the following PRS 602 in time (successfully).

Additionally, as shown in FIG. 6D, the original scheduling of the transmissions of PRS 612 in a second set of symbols is such that each PRS 612 is placed in a first half (or fraction) 636 of each symbol which may cause problems for a (low-cost) Rx UE to receive and decode PRS 612 (e.g., since it is placed immediately after PRS 602 in the time domain). As such, in some implementations, after the Tx UE determines that the Rx UE is incapable of receiving and decoding PRS 612, the Tx UE may modify the scheduling of PRS 612 to be, for example, placed in the second half of the symbols, hence creating a minimal gap between the transmissions of PRS 602 and the transmissions of PRS 612 in the time domain. This way, the Rx UE (e.g., that is otherwise not capable of receiving and decoding the three PRSs in a timely manner) may gain enough time to switch from receiving PRS 602 (e.g., or PRS 622), receive PRS 612, and decode PRS 612 in time (successfully).

In the examples of FIGS. 6A-6D, the duration of the symbols that are used to transmit PRSs that are less than the duration of $Sym^n_{max}$ may be known as $Sym^m$ and $Sym^l$ and may be defined by the SCS configuration factors m and l, where l>m>n, and where the duration of the $Sym^m$ may be expressed as $2^{-m}$ ms, and the duration of the $Sym^l$ may be expressed as $2^{-l}$ ms. In this example, the transmission(s) of the symbols of duration $Sym^m$ and $Sym^l$ that carries a PRS that may align in time (not frequency) with any one of the fractional parts of a symbol of duration $Sym^n_{max}$, where a symbol of duration $Sym^n_{max}$ may not also carry a PRS, and where the fractional part of a symbol of duration $Sym^n_{max}$ may be expressed as $1/(2^{(m-n)})$ when aligned with a symbol of duration $Sym^m$. In some implementations, the fractional part of a symbol of duration $Sym^n_{max}$ may be expressed as $1/(2^{(l-n)})$ when aligned with a symbol of duration $Sym^l$.

In some such implementations, the fraction of the symbol of duration $Sym^n_{max}$ in which a first symbol of duration $Sym^m$ is transmitted may be the first fractional part of the symbol of duration $Sym^n_{max}$ in time. In some implementations, the fraction of the symbol of duration $Sym^n_{max}$ in which a second symbol of duration $Sym^l$ is transmitted may be the third fractional part of the symbol of duration $Sym^n_{max}$ in time. In the examples described in FIGS. 6A-6D, only three SCSs are configured such that n=0, thus symbols of type $Sym^n_{max}$=1.0 ms, and m=1, thus symbols of type $Sym^m$=0.5 ms, and l=2, thus symbols of type $Sym^l$=0.25 ms.

In some implementations, a PRS may be transmitted by the Tx UE for the intended reception by an Rx UE. In some implementations, a PRS may be transmitted using a symbol of duration $Sym^n_{max}$ when the NR carrier used for transporting the symbol of duration $Sym^n_{max}$ is configured by the SCS configuration factor n. In some implementations, a PRS may be transmitted using a symbol of duration $Sym^m$ when the NR carrier used for transporting the symbol of duration $Sym^m$ is configured by the SCS configuration factor m, where m>n. Additionally, a PRS may be transmitted using a symbol of duration $Sym^l$, when the NR carrier used for transporting the symbol of duration $Sym^l$ is configured by SCS configuration factor l, where l>m.

In some implementations, the start of a transmission of a symbol of duration $Sym^m$ may align in time with a transmission of a symbol of duration $Sym^n_{max}$, where the start of the transmission of the symbol of duration $Sym^m$ may be offset in time from the start of the transmission of the symbol of duration $Sym^n_{max}$ where the offset may be expressed as a multiple the fraction $1/(2^{(m-n)})$ of the duration of the $Sym^n_{max}$ symbol period, and where the multiple is a member of the set [0 to $(2^{(m-n)}-1)$].

In some implementations, the start of a transmission of a symbol of duration $Sym^l$ may align in time with a transmission of a symbol of duration $Sym^n_{max}$, where the start of the transmission of the symbol of duration $Sym^l$ may be offset in time from the start of the transmission of the symbol of duration $Sym^n_{max}$, where the offset may be expressed as a multiple the fraction $1/(2^{(l-n)})$ of the duration of the $Sym^n_{max}$ symbol period, and where the multiple is a member of the set [0 to $(2^{(l-n)}-1)$].

In some implementations, the transmission of a symbol of duration $Sym^n_{max}$ that may align in time with a transmission of a symbol of duration $Sym^m$ that is carrying a PRS intended for reception by an Rx UE may not also transmit a PRS that is intended for the same Rx UE, as transmitted by the symbol of duration $Sym^m$. Additionally, in some implementations, the transmission of a symbol of duration $Sym^n_{max}$ that may align in time with a transmission of a symbol of duration $Sym^l$ that is carrying a PRS intended for reception by an Rx UE may not also transmit a PRS that is intended for the same Rx UE, as transmitted by the symbol of duration $Sym^l$.

Figure 7A:
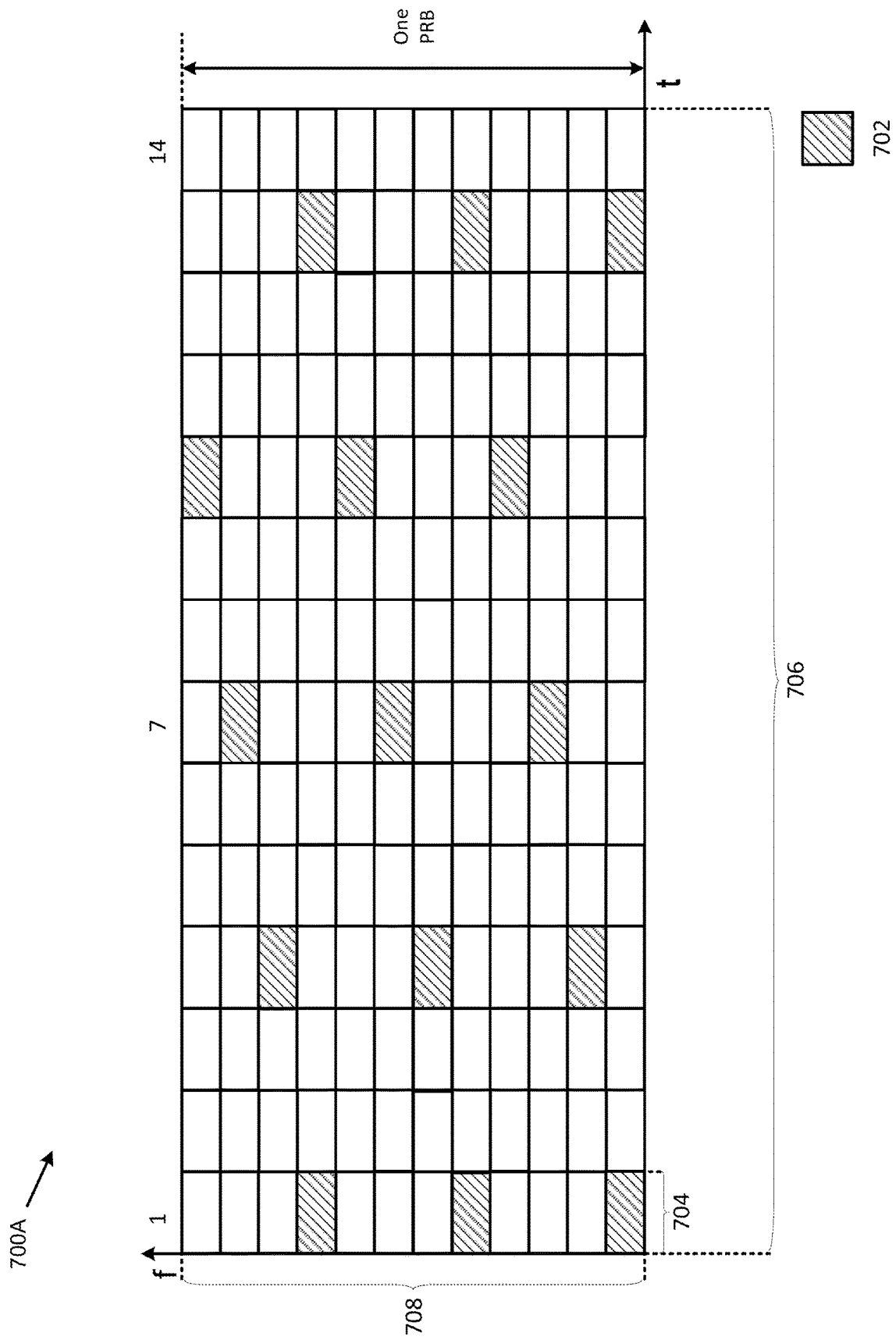
FIGS. 7A-7D are four block diagrams that illustrate another example PRS transmissions patterns, according to an example implementation of the present disclosure.

FIGS. 7A-7D are four block diagrams 700A, 700B, 700C, and 700D, that illustrate another example PRS transmissions patterns, according to an example implementation of the present disclosure. Specifically, FIG. 7A illustrates a 15 kHz subframe 706 having symbols 704 (at 15 kHz). Additionally, as shown in the figure, subframe 706 has 12 subcarriers 708 and has a 15 kHz (e.g., in FR1) SCS. The size of one subframe (at 15 kHz) is equal to one slot including a total of 14 symbols in a time duration of 1.0 ms. Also shown in FIG. 7A are the transmissions of PRS 702 (e.g., SL transmissions by a Tx UE) in a set of symbols in each subcarrier of one PRB with a total of 15 PRS transmissions per subframe.

Figure 7B:
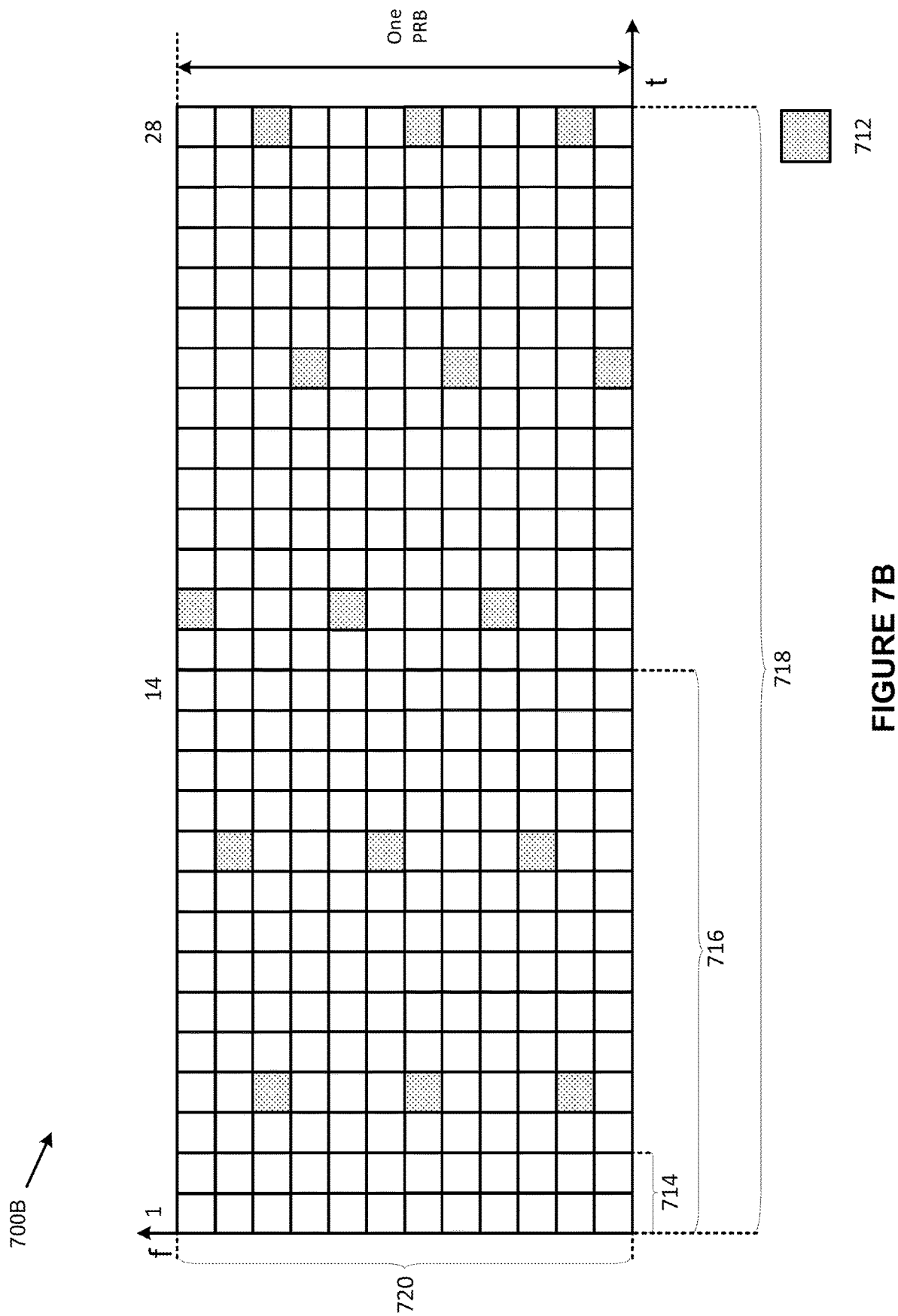

FIG. 7B illustrates a 30 kHz subframe 718 having two symbols 714 (at 30 kHz). Additionally, as shown in the figure, subframe 718 has 12 subcarriers 720 with a 30 kHz (e.g., in FR1) SCS. The size of one subframe (at 30 kHz) is equal to two slots including a total of 28 symbols in a time duration of 1.0 ms. Consequently, each slot 716 may include 14 symbols in a time duration of 0.5 ms. Also shown in FIG. 7B are the transmissions of PRS 712 (e.g., by the Tx UE) in a fraction of each of a second set of symbols in each sub-carrier of one PRB with a total of 15 PRS transmissions per subframe.

Figure 7C:
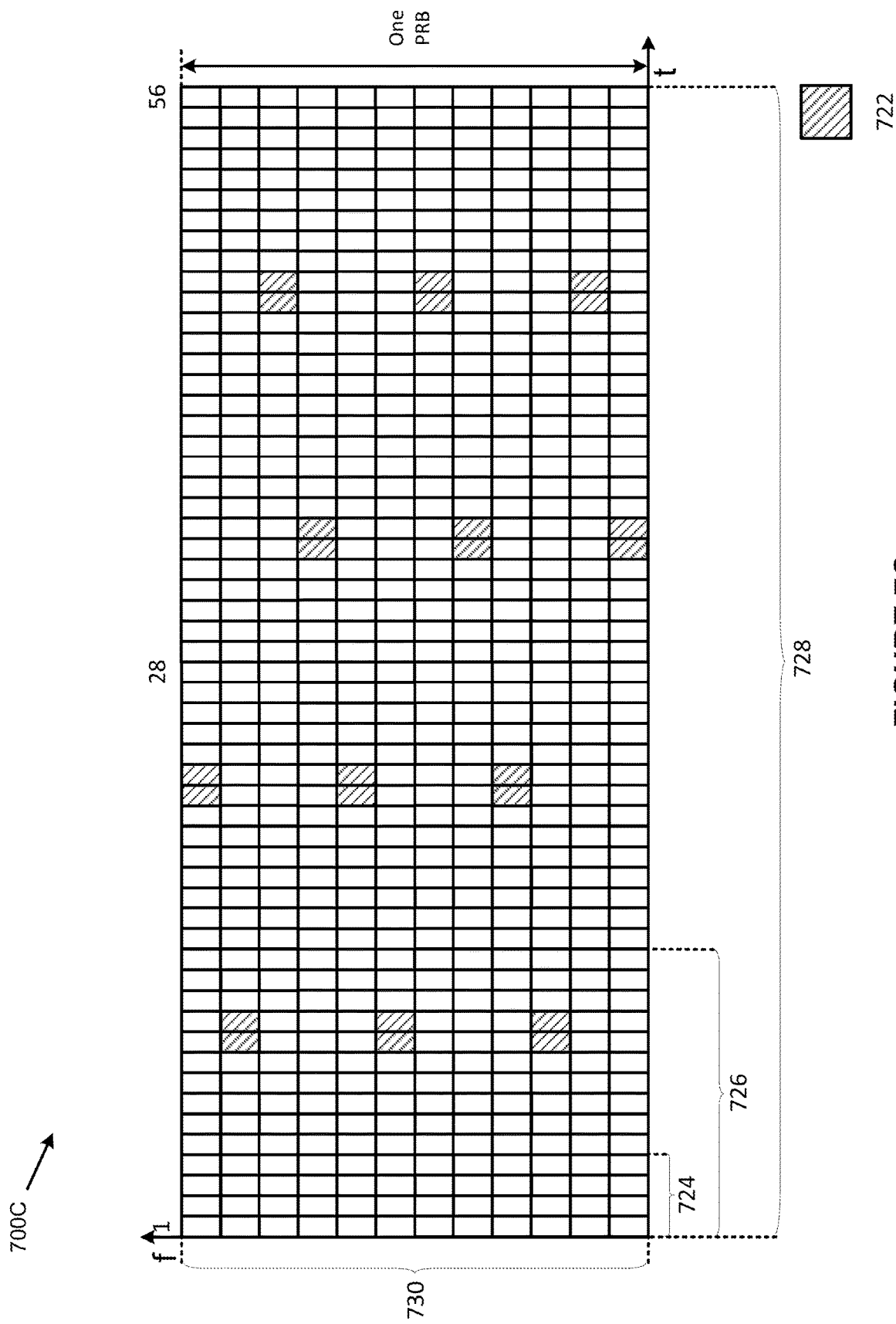

FIG. 7C illustrates a 60 kHz subframe 728 having four symbols 724 (at 60 kHz). Additionally, as shown in the figure, subframe 728 has 12 subcarriers 730 with a 60 kHz (e.g., in FR2) SCS. The size of one subframe (at 60 kHz) is equal to four slots including a total of 56 symbols in a time duration of 1.0 ms. Consequently, each slot 726 may include 14 symbols in a time duration of 0.25 ms. Also shown in FIG. 7C are the transmissions of PRS 722 (e.g., by the Tx UE) in two fractions of each of a third set of symbols in each sub-carrier of one PRB with a total of 24 PRS transmissions per subframe.

Figure 7D:
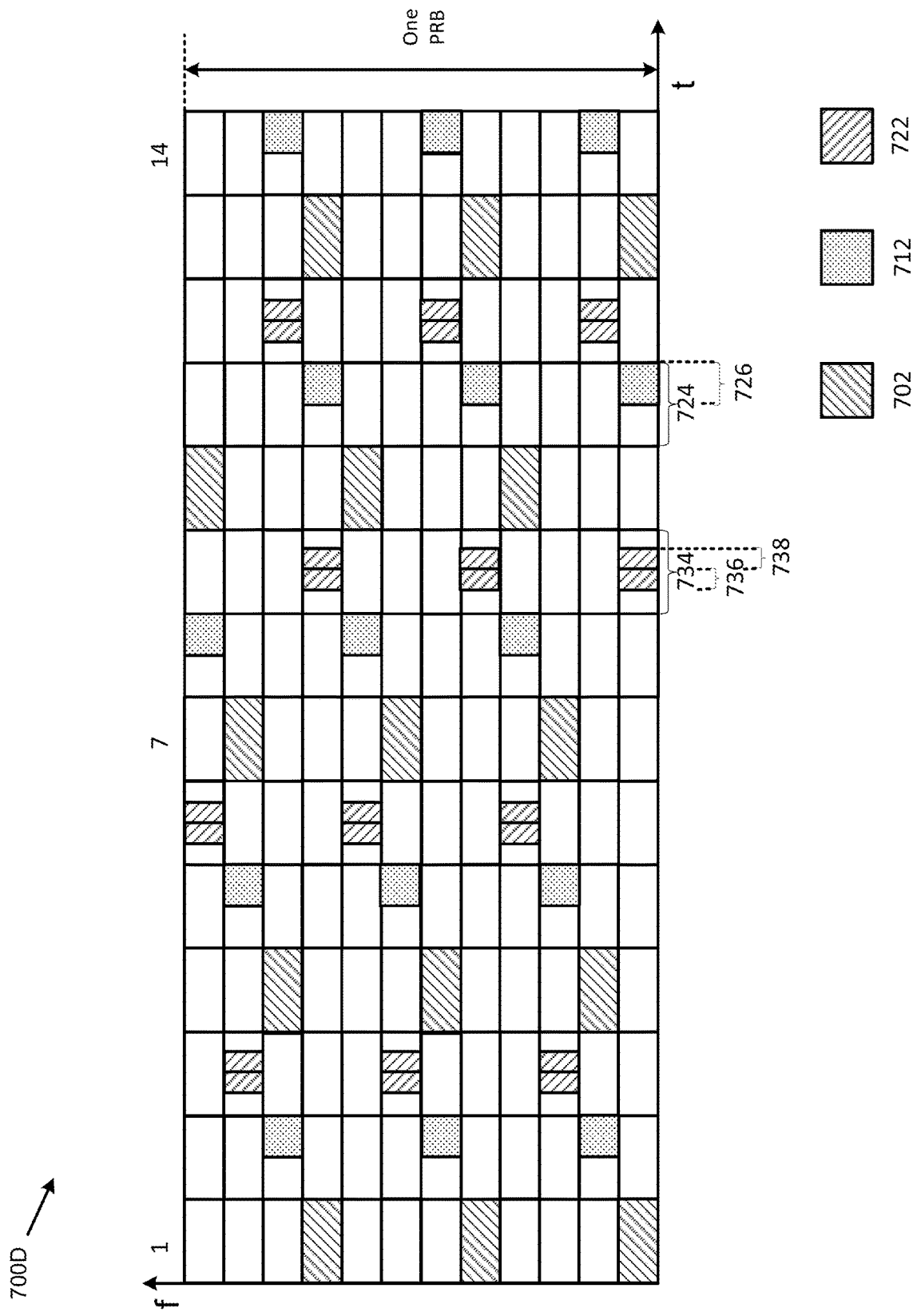

FIG. 7D illustrates the transmissions of three PRSs 702, 712, and 712 (e.g., by a Tx UE) in three different sets of symbols of three PRBs (that overlap each other in the time domain) having a total of 54 PRS transmissions. As shown in the figure, the PRSs (e.g., from different SL BWPs) are multiplexed in time and frequency across a subframe. In such a configuration, each SL BWP may be configured for a different carrier bandwidth and each carrier bandwidth may be configured with a different SCS configuration in some implementations.

As shown in FIG. 7D, the Tx UE has scheduled (or modified the original scheduling of) the transmissions of PRS 712 in a set of symbols 724, such that each PRS 712 is placed in a second half 726 of symbol 724, hence creating a minimal gap between the transmissions of PRS 702 and the transmissions of PRS 712 in the time domain. This way, the Rx UE (e.g., that is otherwise not capable of receiving and decoding the two PRSs in a timely manner) may gain enough time to switch from receiving PRS 702, receive PRS 712, and decode PRS 712 in time (successfully).

Additionally, as shown in FIG. 7D, the Tx UE has also scheduled (or modified the original scheduling of) the transmissions of PRS 722 in a set of symbols 734, such that each PRS 722 is placed in two fractions 736 and 738 of symbol 734, hence creating a minimal gap between the transmissions of PRS 712 and the transmissions of PRS 722 in the time domain, as well as creating another minimal gap between the transmissions of PRS 722 and the transmissions of the following PRS 702 in the time domain. This way, the Rx UE (e.g., that is otherwise not capable of receiving and decoding the three PRSs in a timely manner) may gain enough time to switch from receiving PRS 712 (or PRS 702, in case the ordering of PRS transmissions subsequently changes), receive PRS 722, and decode PRS 722 in time (successfully).

In the examples of FIGS. 7A-7D, the duration of the symbols that are used to transmit PRSs that are less than the duration of $Sym^n_{max}$ may be known as $Sym^m$ and $Sym^l$ and may be defined by the SCS configuration factors m and 1, where l>m>n, and where the duration of the $Sym^m$ may be expressed as $2^{-m}$ ms, and the duration of the $Sym^l$ may be expressed as $2^{-l}$ ms. In this example, the transmission(s) of the symbols of duration $Sym^m$ and $Sym^l$ that carries a PRS that may align in time (not frequency) with any one of the fractional parts of a symbol of duration $Sym^n_{max}$, where a symbol of duration $Sym^n_{max}$ may not also carry a PRS, and where the fractional part of a symbol of duration $Sym^n_{max}$ may be expressed as $1/(2^{(m-n)})$ when aligned with a symbol of duration $Sym^m$. In some implementations, the fractional part of a symbol of duration $Sym^n_{max}$ may be expressed as $1/(2^{(l-n)})$ when aligned with a symbol of duration $Sym^l$.

In some such implementations, the fraction of the symbol of duration $Sym^n_{max}$ in which a first symbol of duration $Sym^m$ is transmitted may be the second fractional part of the symbol of duration $Sym^n_{max}$ in time. In some implementations, the fraction of the symbol of duration $Sym^n_{max}$ in which a first and second symbol of duration $Sym^l$ is transmitted may be the second and third fractional part of the symbol of duration $Sym^n_{max}$ in time. In the examples described in FIGS. 7A-7D, only three SCSs are configured such that n=0, thus symbols of type $Sym^n_{max}$=1.0 ms, and m=1, thus symbols of type $Sym^m$=0.5 ms, and 1=2, thus symbols of type $Sym^l$=0.25 ms.

In some implementations, a PRS may be transmitted by the Tx UE for the intended reception by an Rx UE. In some implementations, a PRS may be transmitted using a symbol of duration $Sym^n_{max}$ when the NR carrier used for transporting the symbol of duration $Sym^n_{max}$ is configured by the SCS configuration factor n. In some implementations, a PRS may be transmitted using a symbol of duration $Sym^m$ when the NR carrier used for transporting the symbol of duration $Sym^m$ is configured by the SCS configuration factor m, where m>n. Additionally, a first PRS may be transmitted using a symbol of duration $Sym^l$ when the NR carrier used for transporting the symbol of duration $Sym^l$ is configured by the SCS configuration factor l, where l>m. Additionally, a second PRS may be transmitted using a second symbol of duration $Sym^l$ when the NR carrier used for transporting a symbol of duration $Sym^l$ is configured by the SCS configuration factor l>m.

In some implementations, the start of a transmission of a symbol of duration $Sym^m$ may align in time with a transmission of a symbol of duration $Sym^n_{max}$, where the start of the transmission of the symbol of duration $Sym^m$ may be offset in time from the start of the transmission of the symbol of duration $Sym^n_{max}$ where the offset may be expressed as a multiple the fraction $1/(2^{(m-n)})$ of the duration of the $Sym^n_{max}$ symbol period, and where the multiple is a member of the set [0 to $(2^{(m-n)}-1)$].

In some implementations, the start of a transmission of a first symbol of duration $Sym^l$ may align in time with a transmission of a symbol of duration $Sym^n_{max}$, where the start of the transmission of the symbol of duration $Sym^l$ may be offset in time from the start of the transmission of the symbol of duration $Sym^n_{max}$, where the offset may be expressed as a multiple the fraction $1/(2^{(l-n)})$ of the duration of the $Sym^n_{max}$ symbol period, and where the multiple is a member of the set [0 to $(2^{(l-n)}-1)$].

In some implementations, the start of a transmission of a second symbol of duration $Sym^l$ may align in time with a transmission of a symbol of duration $Sym^n_{max}$, where the start of the transmission of the symbol of duration $Sym^l$ may be offset in time from the start of the transmission of the symbol of duration $Sym^n_{max}$, where the offset may be expressed as a multiple the fraction $1/(2^{(l-n)})$ of the duration of the $Sym^n_{max}$ symbol period, and where the multiple is a member of the set [0 to $(2^{(l-n)}-1)$]. The start of the transmission of a first symbol of duration $Sym^l$ and the start of the transmission of a second symbol of duration $Sym^l$ may not align in time in some implementations.

In some implementations, the transmission of a symbol of duration $Sym^n_{max}$ that may align in time with a transmission of a symbol of duration $Sym^m$ that is carrying a PRS intended for reception by an Rx UE may not also transmit a PRS that is intended for the same Rx UE, as transmitted by the symbol of duration $Sym^m$. Additionally, in some implementations, the transmission of a symbol of duration $Sym^n_{max}$ that may align in time with a transmission of a symbol of duration $Sym^l$ that is carrying a PRS intended for reception by an Rx UE may not also transmit a PRS that is intended for the same Rx UE, as transmitted by the symbol of duration $Sym^l$.

Figure 8A:
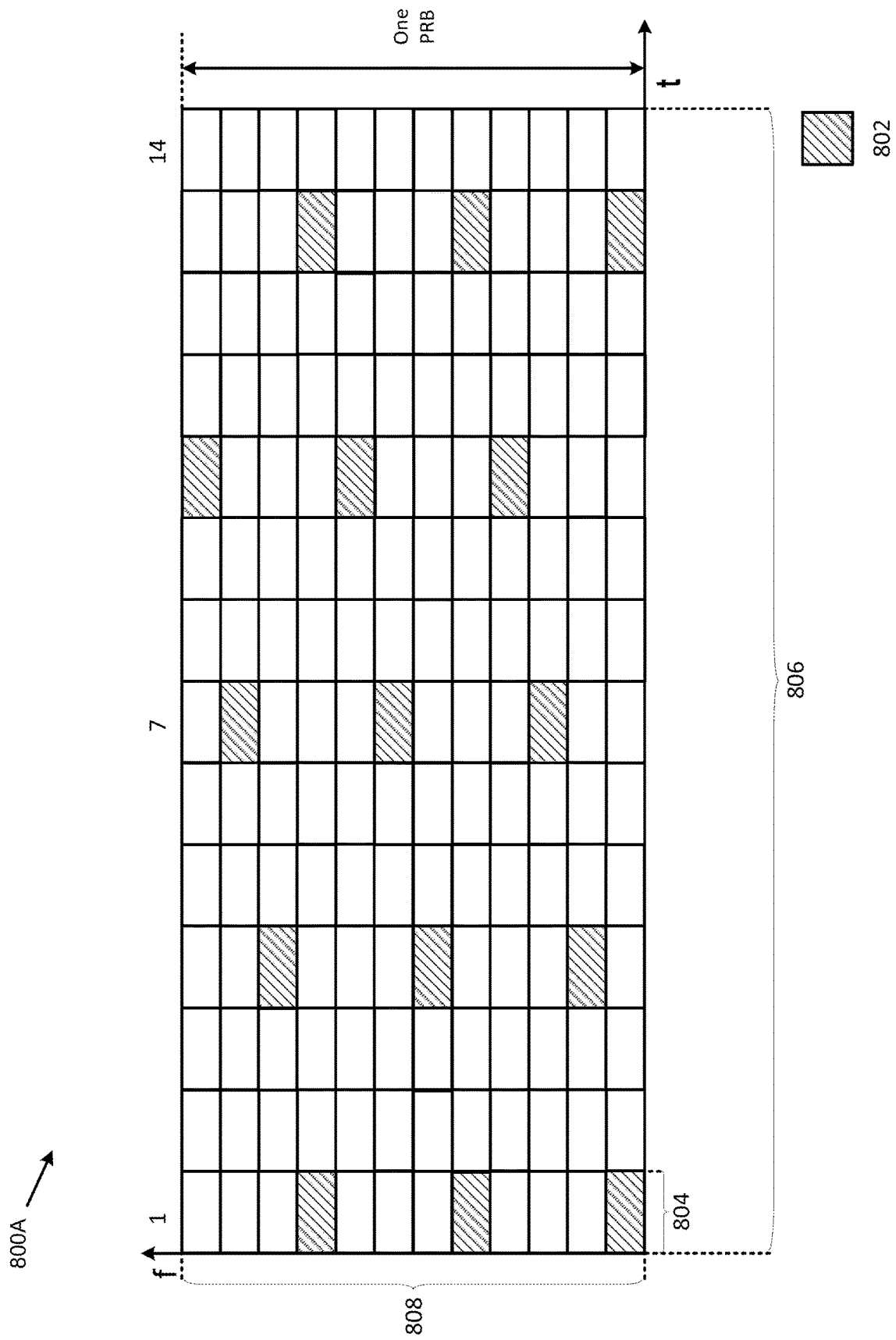
FIGS. 8A-8D are four block diagrams that illustrate another example PRS transmissions patterns, according to an example implementation of the present disclosure.

FIGS. 8A-8D are four block diagrams 800A, 800B, 800C, and 800D, that illustrate another example PRS transmissions, according to an example implementation of the present disclosure. Specifically, FIG. 8A illustrates a 15 kHz subframe 806 having symbols 804 (at 15 kHz). Additionally, as shown in the figure, subframe 806 has 12 subcarriers 808 and has a 15 kHz (e.g., in FR1) SCS. The size of one subframe (at 15 kHz) is equal to one slot including a total of 14 symbols in a time duration of 1.0 ms. Also shown in FIG. 8A are the transmissions of PRS 802 (e.g., SL transmissions by a Tx UE) in a set of symbols in each subcarrier of one PRB with a total of 15 PRS transmissions per subframe.

Figure 8B:
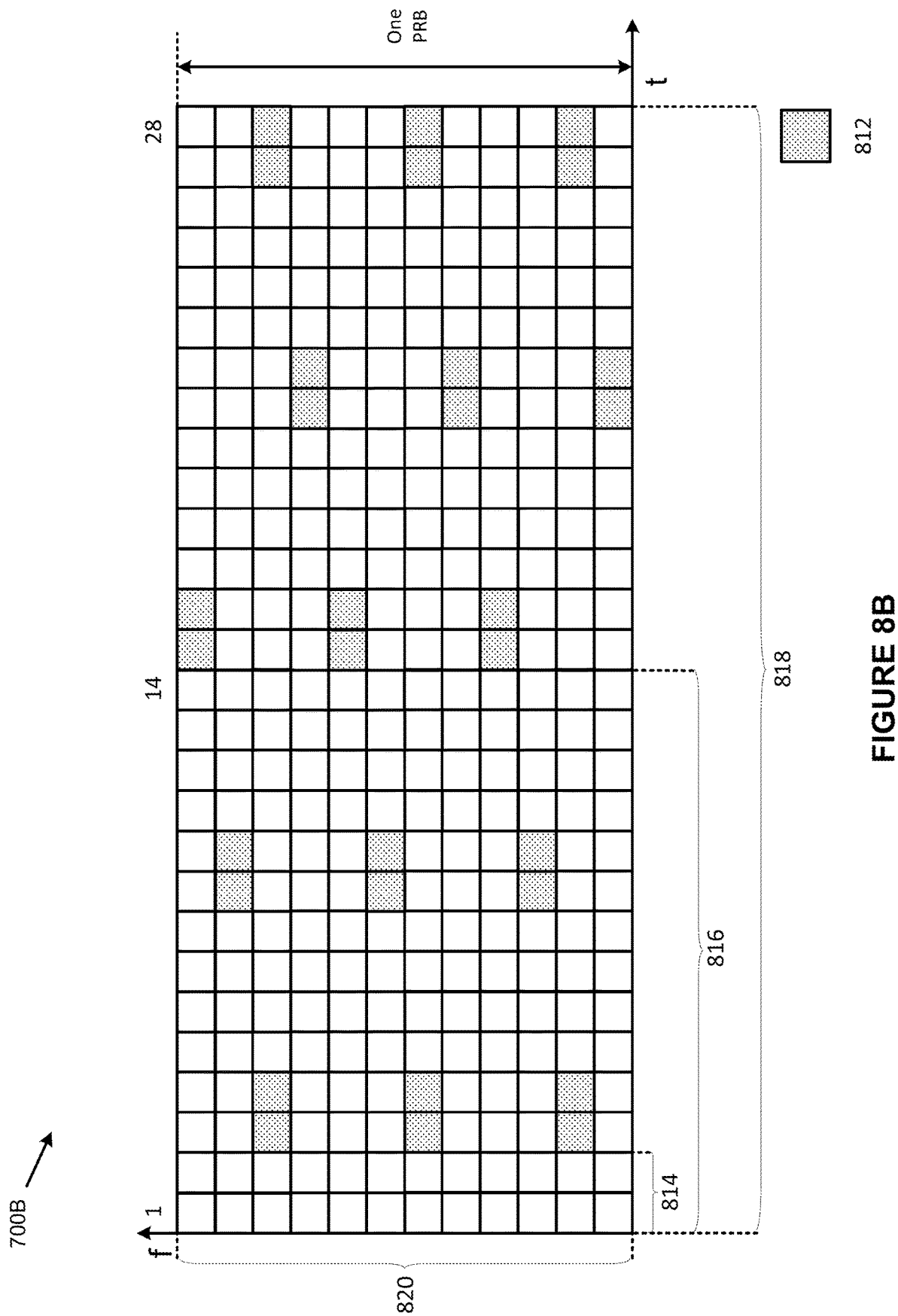

FIG. 8B illustrates a 30 kHz subframe 818 having two symbols 814 (at 30 kHz). Additionally, as shown in the figure, subframe 818 has 12 subcarriers 820 with a 30 kHz (e.g., in FR1) SCS. The size of one subframe (at 30 kHz) is equal to two slots including a total of 28 symbols in a time duration of 1.0 ms. Consequently, each slot 816 may include 14 symbols in a time duration of 0.5 ms. Also shown in FIG. 8B are the transmissions of PRS 812 (e.g., by the Tx UE) in two fractions (e.g., both halves) of each of a second set of symbols in each sub-carrier of one PRB with a total of 30 PRS transmissions per subframe.

Figure 8C:
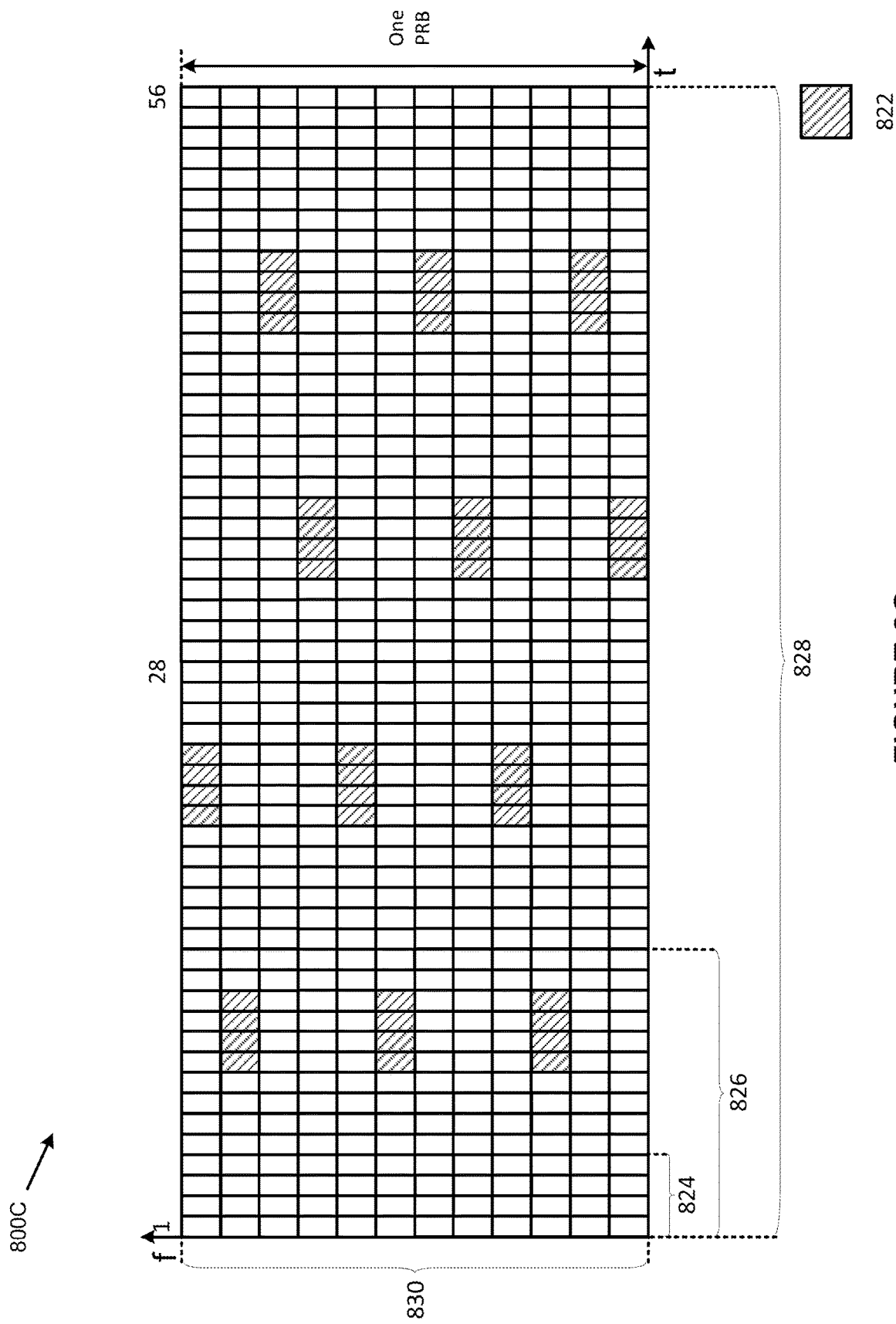

FIG. 8C illustrates a 60 kHz subframe 828 having four symbols 824 (at 60 kHz). Additionally, as shown in the figure, subframe 828 has 12 subcarriers 830 with a 60 kHz (e.g., in FR2) SCS. The size of one subframe (at 60 kHz) is equal to four slots including a total of 56 symbols in a time duration of 1.0 ms. Consequently, each slot 826 may include 14 symbols in a time duration of 0.25 ms. Also shown in FIG. 8C are the transmissions of PRS 822 (e.g., by the Tx UE) in four fractions (e.g., all four quarters) of each of a third set of symbols in each sub-carrier of one PRB with a total of 48 PRS transmissions per subframe.

Figure 8D:
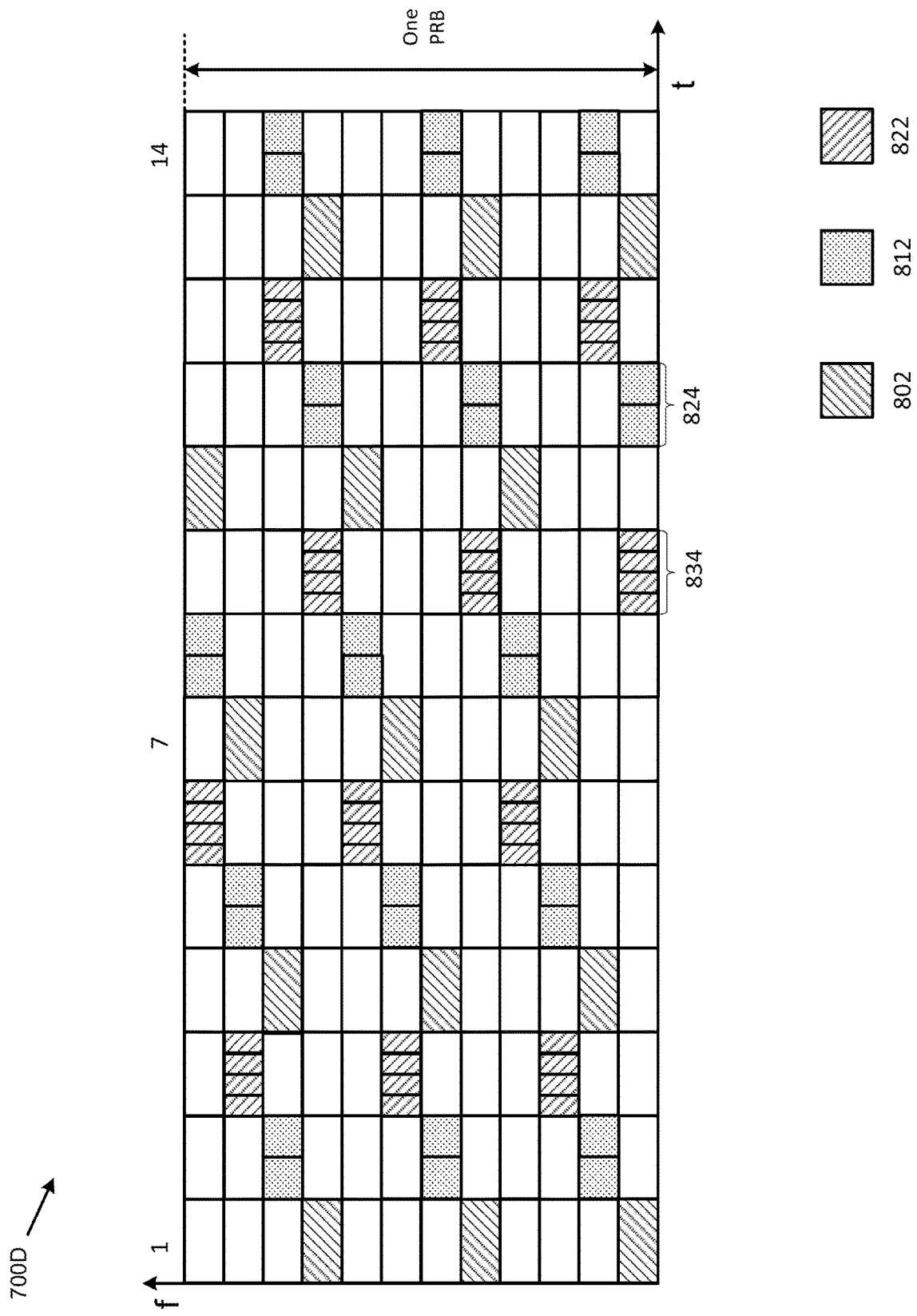

FIG. 8D illustrates the transmissions of three PRSs 802, 812, and 812 (e.g., by a Tx UE) in three different sets of symbols of three PRB s (that overlap each other in the time domain) having a total of 93 PRS transmissions. As shown in the figure, the PRSs (e.g., from different SL BWPs) are multiplexed in time and frequency across a subframe. In such a configuration, each SL BWP may be configured for a different carrier bandwidth and each carrier bandwidth may be configured with a different SCS configuration in some implementations.

As shown in FIG. 8D, the transmissions of PRS 812 in a set of symbols 824 has been scheduled, such that each set of two PRSs 812 is placed in one half of symbols 824. Additionally, the transmissions of PRS 822 in a set of symbols 834 has been scheduled, such that each set of four PRSs 822 is placed in one quarter of symbols 834. With such a configuration, there may not be an enough gap (e.g., in the time domain) between the transmissions of PRS 802 and the transmissions of PRS 812 or between the transmissions of PRS 812 and the transmissions of PRS 822. In some implementations, a Tx UE may inquire about the Rx UE's capabilities. In some such implementations, if the information received from the Rx UE indicate that the Rx UE is capable enough (e.g., when the processing unit(s) of the Rx UE performs above a threshold and/or the reception unit(s) of the Rx UE performs above a threshold), the Tx UE may not change the transmission pattern (or scheduling) of PRS 812 (or PRC 822). Therefore, the transmission pattern shown in FIG. 8D may be applied to PRSs 802, 812 and 822.

In the examples of FIGS. 8A-8D, the duration of the symbols that are used to transmit PRSs that are less than the duration of $Sym^n_{max}$ may be known as $Sym^m$ and $Sym^l$ and may be defined by the SCS configuration factors m and l, where l>m>n, and where the duration of the $Sym^m$ may be expressed as $2^{-m}$ ms, and the duration of the $Sym^l$ may be expressed as $2^{-l}$ ms. In this example, the transmission(s) of the symbols of duration $Sym^m$ and $Sym^l$ that carries a PRS that may align in time (not frequency) with any one of the fractional parts of a symbol of duration $Sym^n_{max}$, where a symbol of duration $Sym^n_{max}$ may not also carry a PRS, and where the fractional part of a symbol of duration $Sym^n_{max}$ may be expressed as $1/(2^{(m-n)})$ when aligned with a symbol of duration $Sym^m$. In some implementations, the fractional part of a symbol of duration $Sym^n_{max}$ may be expressed as $1/(2^{(l-n)})$ when aligned with a symbol of duration $Sym^l$.

In some such implementations, the fraction of the symbol of duration $Sym^n_{max}$ in which a symbol of duration $Sym^m$ is transmitted may be the first and second fractional part of the symbol of duration $Sym^n_{max}$ in time. In some implementations, the fraction of the symbol of duration $Sym^n_{max}$ in which a symbol of duration $Sym^l$ is transmitted may be the first, second, third, and fourth fractional part of the symbol of duration $Sym^n_{max}$ in time. In the examples described in FIGS. 8A-8D, only three SCSs are configured such that n=0, thus symbols of type $Sym^n_{max}$=1.0 ms, and m=1, thus symbols of type $Sym^m$=0.5 ms, and l=2, thus symbols of type $Sym^l$=0.25 ms.

In some implementations, a PRS may be transmitted by the Tx UE for the intended reception by an Rx UE. In some implementations, a PRS may be transmitted using a symbol of duration $Sym^n_{max}$ when the NR carrier used for transporting the symbol of duration $Sym^n_{max}$ is configured by the SCS configuration factor n. In some implementations, a first and second PRS may be transmitted using a symbol of duration $Sym^m$ when the NR carrier used for transporting the symbol of duration $Sym^m$ is configured by the SCS configuration factor m, where m>n. Additionally, a first, second, third, and fourth PRS may be transmitted using a symbol of duration $Sym^l$ when the NR carrier used for transporting the symbol of duration $Sym^l$ is configured by the SCS configuration factor l, where l>m.

In some implementations, the start of a transmission of a first and second symbol of duration $Sym^m$ may align in time with a transmission of a symbol of duration $Sym^n_{max}$, where the start of the transmission of the symbols of duration $Sym^m$ may be offset in time from the start of the transmission of the symbol of duration $Sym^n_{max}$, where the offset may be expressed as a multiple the fraction $1/(2^{(m-n)})$ of the duration of the $Sym^n_{max}$ symbol period, and where the multiple is a member of the set [0 to $(2^{(m-n)}-1)$].

In some implementations, the start of the transmission of a first symbol of duration $Sym^m$ and the start of the transmission of a second symbol of duration $Sym^m$ may not align in time. Additionally, the start of a transmission of a first, second, third and fourth symbol of duration $Sym^l$ may align in time with a transmission of a symbol of duration $Sym^n_{max}$, where the start of the transmission of the symbol of duration $Sym^l$ may be offset in time from the start of the transmission of the symbol of duration $Sym^n_{max}$, where the offset may be expressed as a multiple the fraction $1/(2^{(l-n)})$ of the duration of the $Sym^n_{max}$ symbol period, and where the multiple is a member of the set [0 to $(2^{(l-n)}-1)$].

In some implementations, the start of the transmission of any symbol of duration $Sym^l$ and the start of the transmission of any other symbol of duration $Sym^l$ may not align in time. In some such implementations, the transmission of a symbol of duration $Sym^n_{max}$ that is aligned in time with a transmission of a symbol of duration $Sym^m$ that is carrying a PRS intended for reception by an Rx UE may not also transmit a PRS that is intended for the same Rx UE, as transmitted by the symbol of duration $Sym^m$. Additionally, the transmission of a symbol of duration $Sym^n_{max}$ that is aligned in time with a transmission of a symbol of duration $Sym^l$ that is carrying a PRS intended for reception by an Rx UE may not also transmit a PRS that is intended for the same Rx UE, as transmitted by the symbol of duration $Sym^l$.

As described above, some implementations may provide a scheduling process (e.g., for a Tx UE) to optimize the placement of PRS in the time domain across multiple SL BWPs that have different SCS configurations factors. In some implementations, the scheduling process may determine a value 'q' that represents a number of enabled SL BWPs which may transmit a PRS. The process may then order each enabled SL BWP from the lowest Configuration Factor to the highest Configuration Factor, and index them from zero to 'q'−1. If two SL BWPs have the same Configuration Factor, the process of some implementations may assign one of the BWPs the next unused index (e.g., 'z') and the other one an index of ('z'+1).

In some implementations, the scheduling process may then determine, in the time domain, a set of symbols of a slot of a first SL BWP to be used to define a pattern of PRS symbols, where the first symbol of the set may be used for the transmissions of a PRS, and the other (q−1) symbols of the set that follow the PRS may not be used for the transmissions of the PRSs that may be received by the same device (e.g., UE) as the first PRS of the set, where n is the Configuration Factor of the first SL BWP. Such a pattern may be known as the PRS Time Pattern [0].

In some implementations, the scheduling process may schedule the transmission of the PRS Time Pattern [0] in the first SL BWP in the time domain, such that the pattern repeats across the symbols of a slot, and the slot(s) of a subframe, as necessary to transmit the desired number of PRSs in the time domain of the desired Sidelink Resource Pool. In some implementations, the process may schedule the transmissions of PRSs in the frequency domain in the first SL BWP by repeating the time domain pattern for the first SL BWP across a number of subchannels, as necessary to transmit the total desired number of PRSs of the desired Sidelink Resource Pool.

In some implementations, the scheduling process may then determine, in the time domain, a set of symbols of a slot of a second SL BWP to be used to define a pattern of symbols, where the start of the first symbol of the set may follow the end of the symbol from the first SL BWP that transports a PRS, where the number of symbols of the set may be equal to $2^{m-n}$, and where n is the configuration factor of the first SL BWP and m is the configuration factor of the second SL BWP. Such a pattern may be known as the PRS Time Pattern [1].

In some implementations, the scheduling process may then determine a number of PRSs 'r' that are to be transported per Time Pattern [1], where 'r' 'x'. The process may also determine the optimal arrangement of PRS into the symbols of the Time Pattern [1], taking into account (i) the capabilities of the UEs that are transmitting and receiving the PRSs, and (ii) that 'r' PRSs are to be scheduled into 'x' symbols of the second SL BWP.

Figure 9:
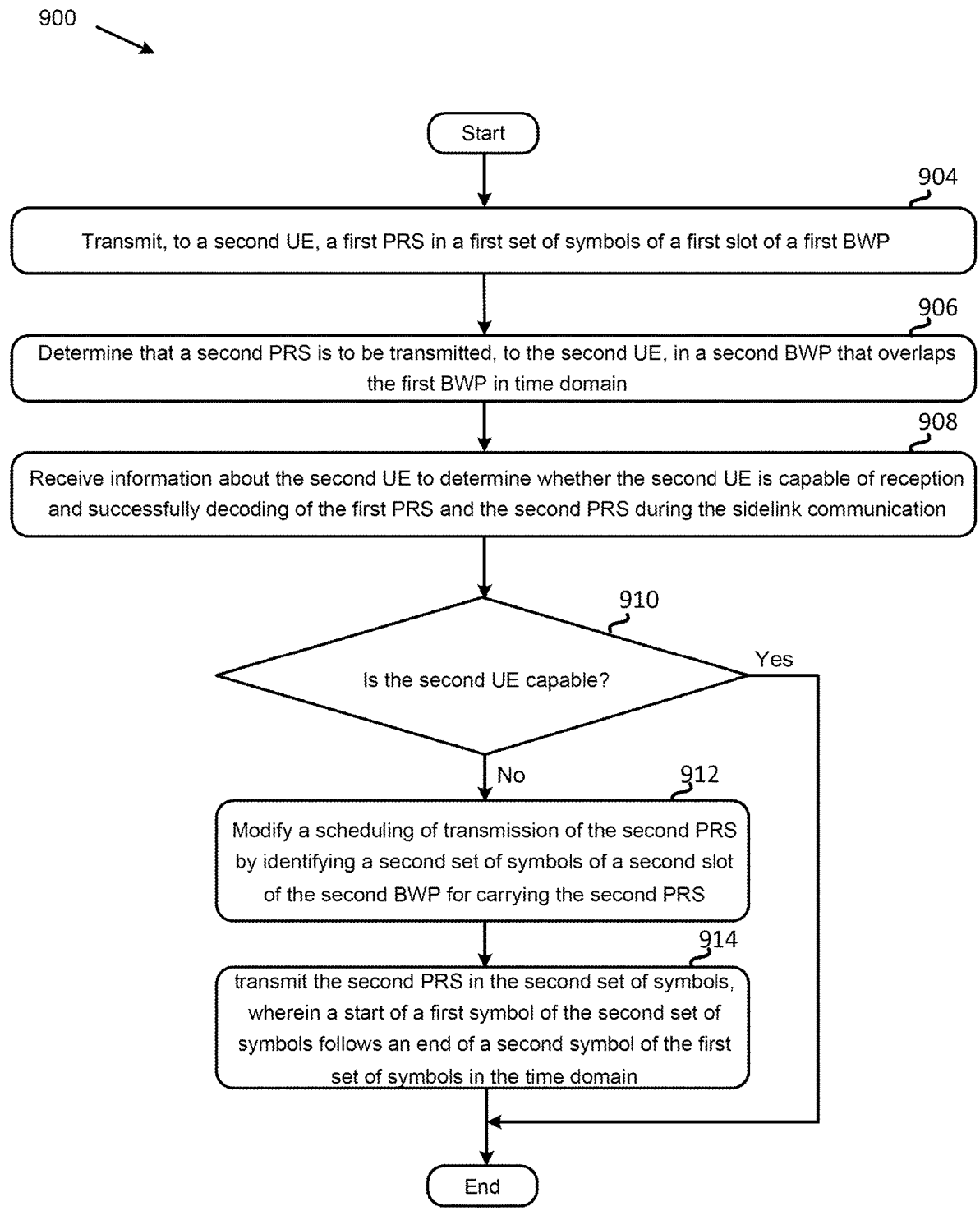
FIG. 9 is a flowchart illustrating a method (or process) performed by a first UE for scheduling a positioning reference signal (PRS) during a sidelink communication with a second UE, according to an example implementation of the present disclosure.

FIG. 9 is a flowchart illustrating a method (or process) 900 performed by a first UE for scheduling a positioning reference signal (PRS) during a sidelink communication with a second UE, according to an example implementation of the present disclosure. As shown in the figure, process 900 may start by transmitting, at 904, to the second UE, a first PRS in a first set of symbols of a first slot of a first bandwidth part (BWP).

Process 900 may then determine, at 906, that a second PRS should be transmitted, to the second UE, in a second BWP that overlaps the first BWP in the time domain. In some implementations, the first BWP may coincide with the second BWP in the time domain, such that the first set of symbols of the first slot of the first BWP may be aligned, in the time domain, with a second set of symbols of a second slot of the second BWP. Additionally, in some implementations, the first BWP may be associated with a first subcarrier spacing (SCS) while the second BWP may be associated with a second SCS that is different from the first SCS.

In some implementations, after determining that the second PRS should be transmitted to the second UE, process 900 may receive, at 908, information about the second UE to determine whether the second UE is capable of the reception and successfully decoding of the first PRS and the second PRS during the sidelink communication. In some implementations, to receive such information, the process may have previously sent a signal to the second UE and/or a serving cell of a base station to request the capability information about the second UE. In some other implementations, the second UE, or a base station, may send such information about the second UE to the first UE before any SL communication starts between the two UEs (e.g., when the BS transmits configuration information to the UEs).

The process may then determine, at 910, whether second UE is capable of successful decoding of the first PRS and the second PRS (e.g., in a timely manner) based on the received information about the second UE. In some implementations, the second UE may not be capable of successful decoding of the first PRS and the second PRS when the second UE does not have a receiver capable of successfully receiving multiple carrier bandwidths simultaneously, and/or the second UE does not have a processor quick enough to receive and successfully decode multiple carrier bandwidths simultaneously.

In some implementations, if process 900 determines, at 910, based on the received information about the second UE, that the second UE is capable of successful decoding of the first PRS and the second PRS (e.g., in a timely manner), the process may transmit the second PRS in a third set of symbols of the second slot of the second BWP without modifying the scheduling of the transmissions of the second PRS. The process may then end.

On the other hand, when the process determines (e.g., at 910) that the second UE is not capable of successful decoding of the first PRS and the second PRS, the process may modify, at 912, a scheduling of the transmissions of the second PRS by identifying the second set of symbols of the second slot of the second BWP for carrying the second PRS. After such an identification, process 900 may transmit, at 914, the second PRS in the second set of symbols, where a start of a first symbol of the second set of symbols may follow an end of a second symbol of the first set of symbols in the time domain. In some implementations, the second set of symbols of the second slot may coincide in the time domain with a third set of symbols of the first slot that do not carry the first PRS. In some implementations, after transmitting the second PRS in the second set of symbols, the process may end.

In some implementations, the start of the first symbol of the second set of symbols may follow the end of the second symbol of the first set of symbols, such that a gap in time exists in the time domain between the end of the second symbol and the start of the first symbol.

In some implementations, such a gap in time may be enough for the second UE to switch from the first BWP to the second BWP to receive and decode the second PRS. In some implementations, the gap in time may include a fraction of a symbol of the first set of symbols of the first slot. In some implementations, such a fraction may be equal to $1/(2^{(m-n)})$ of a duration of the symbol, where 'n' is a configuration factor of the first BWP and 'm' is a configuration factor of the second BWP.

Figure 10:
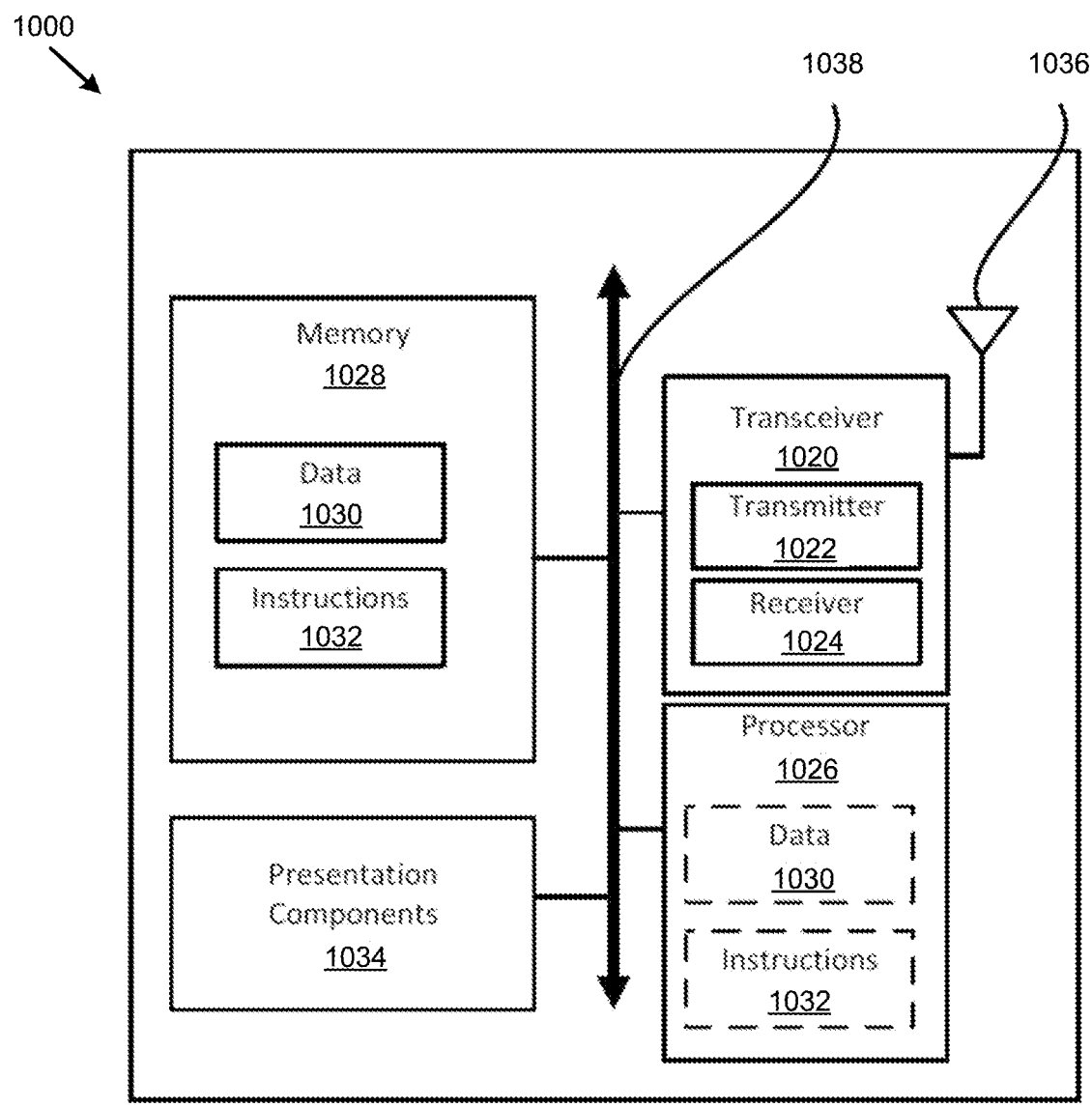
FIG. 10 illustrates a block diagram of a node for wireless communication, according to an example implementation of the present application.

FIG. 10 illustrates a block diagram of a node for wireless communication, according to one example implementation of the present application. As shown in FIG. 10, node 1000 may include transceiver 1020, processor 1026, memory 1028, one or more presentation components 1034, and at least one antenna 1036. Node 1000 may also include a Radio Frequency (RF) spectrum band module, a base station communications module, a network communications module, and a system communications management module, input/output (I/O) ports, I/O components, and power supply (not explicitly shown in FIG. 10). Each of these components may be in communication with each other, directly or indirectly, over one or more buses 1040.

Transceiver 1020 having transmitter 1022 and receiver 1024 may be configured to transmit and/or receive time and/or frequency resource partitioning information. In some implementations, transceiver 1020 may be configured to transmit in different types of subframes and slots including, but not limited to, usable, non-usable and flexibly usable subframes and slot formats. Transceiver 1020 may be configured to receive data and control signaling.

Node 1000 may include a variety of computer-readable media. Computer-readable media can be any available media that can be accessed by node 1000 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 1028 may include computer-storage media in the form of volatile and/or non-volatile memory. Memory 1028 may be removable, non-removable, or a combination thereof. Exemplary memory includes solid-state memory, hard drives, optical-disc drives, etc. As illustrated in FIG. 10, memory 1028 may store computer-readable, computer-executable instructions 1032 (e.g., software codes) that are configured to, when executed, cause processor 1026 to perform various functions described herein, for example, with reference to FIGS. 1 through 10. Alternatively, instructions 1032 may not be directly executable by processor 1026 but be configured to cause node 1000 (e.g., when compiled and executed) to perform various functions described herein.

Processor 1026 may include an intelligent hardware device, for example, a central processing unit (CPU), a microcontroller, an ASIC, etc. Processor 1026 may include memory. Processor 1026 may process data 1030 and instructions 1032 received from memory 1028, and information through transceiver 1020, the base band communications module, and/or the network communications module. Processor 1026 may also process information to be sent to transceiver 1020 for transmission through antenna 1036, to the network communications module for transmission to a core network.

One or more presentation components 1034 presents data indications to a person or other device. For example, one or more presentation components 1034 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

An example of an SL-ConfigDedicatedNR for scheduling and configuring the SL PRSs and its corresponding information element (e.g., IE SL-ConfigDedicatedNR) that specifies the dedicated configuration information for NR sidelink communication is illustrated in Table 2 below.

TABLE 2

| SL-ConfigDedicatedNR IE |
|---|
| -- ASN1START |
| -- TAG-SL-CONFIGDEDICATEDNR-START |
| SL-ConfigDedicatedNR-r16 ::=    SEQUENCE { |
|     sl-PHY-MAC-RLC-Config-r16          SL-PHY-MAC-RLC-Config-r16 |
| OPTIONAL,        -- Need M |
|     sl-RadioBearerToReleaseList-r16        SEQUENCE (SIZE (1..maxNrofSLRB-r16)) OF SLRB- |
| Uu-ConfigIndex-r16          OPTIONAL,    -- Need N |
|     sl-RadioBearerToAddModList-r16         SEQUENCE (SIZE (1..maxNrofSLRB-r16)) OF SL- |
| RadioBearerConfig-r16        OPTIONAL,    -- Need N |
|     sl-MeasConfigInfoToReleaseList-r16       SEQUENCE (SIZE (1..maxNrofSL-Dest-r16)) OF |
| SL-DestinationIndex-r16        OPTIONAL,    -- Need N |
|     sl-MeasConfigInfoToAddModList-r16       SEQUENCE (SIZE (1..maxNrofSL-Dest-r16)) OF |
| SL-MeasConfigInfo-r16        OPTIONAL,    -- Need N |
|     t400-r16                 ENUMERATED {ms100, ms200, ms300, ms400, |

TABLE 2-continued

| SL-ConfigDedicatedNR IE |
|---|
| ms600, ms1000, ms1500, ms2000} OPTIONAL, -- Need M |
| sl-PRS-FreqConfigToReleaseList-r17         SEQUENCE (SIZE (1..maxNrofFreqSL-r16)) OF SL-PRS-Freq-ID-r17       OPTIONAL,    -- Need N |
| sl-PRS-FreqConfigToAddModList-r17          SEQUENCE (SIZE (1..maxNrofFreqSL-r16)) OF SL-PRS-FreqConfig-r17       OPTIONAL,    -- Need N |
| ... |
| } |
| SL-DestinationIndex-r16    ::=    INTEGER (0..maxNrofSL-Dest-1-r16) |
| SL-PHY-MAC-RLC-Config-r16::=    SEQUENCE { |
|   sl-ScheduledConfig-r16              SetupRelease { SL-ScheduledConfig-r16 } OPTIONAL,    -- Need M |
|   sl-UE-SelectedConfig-r16            SetupRelease { SL-UE-SelectedConfig-r16 } OPTIONAL,    -- Need M |
|   sl-FreqInfoToReleaseList-r16        SEQUENCE (SIZE (1..maxNrofFreqSL-r16)) OF SL-Freq-Id-r16    OPTIONAL,    -- Need N |
|   sl-FreqInfoToAddModList-r16         SEQUENCE (SIZE (1..maxNrofFreqSL-r16)) OF SL-FreqConfig-r16    OPTIONAL,    -- Need N |
|   sl-RLC-BearerToReleaseList-r16      SEQUENCE (SIZE (1..maxSL-LCID-r16)) OF SL-RLC-BearerConfigIndex-r16    OPTIONAL,    -- Need N |
|   sl-RLC-BearerToAddModList-r16       SEQUENCE (SIZE (1..maxSL-LCID-r16)) OF SL-RLC-BearerConfig-r16    OPTIONAL,    -- Need N |
|   sl-MaxNumConsecutiveDTX-r16         ENUMERATED {n1, n2, n3, n4, n6, n8, n16, n32} OPTIONAL,    -- Need M |
|   sl-CSI-Acquisition-r16              ENUMERATED {enabled} OPTIONAL,    -- Need R |
|   sl-CSI-SchedulingRequestId-r16      SetupRelease {SchedulingRequestId} OPTIONAL,    -- Need M |
|   sl-SSB-PriorityNR-r16               INTEGER (1..8) OPTIONAL,    -- Need R |
|   networkControlledSyncTx-r16         ENUMERATED {on, off} OPTIONAL    -- Need M |
| } |
| -- TAG-SL-CONFIGDEDICATEDNR-STOP |
| -- ASN1STOP |

Table 3 below illustrates the IE SL-PRS-FreqConfig which specifies a PRS configuration for carrier frequency (ies) for NR sidelink.

TABLE 3

| SL-PRS-FreqConfig IE |
|---|
| -- ASN1START |
| -- TAG-SL-PRS-FREQCONFIG-START |
| SL-PRS-FreqConfig-r17 ::=    SEQUENCE { |
|   sl-PRS-Freq-ID-r17        SL-PRS-FREQ-ID-r17 |
|   sl-PRS-FreqConfigCommon   SL-PRS-FREQConfigCommon |
|   s1-PRS-FreqResourceSet    SL-PRS-FREQResourceSet |
| } |

TABLE 3-continued

| SL-PRS-FreqConfig IE |
|---|
| SL-PRS-FREQ-ID-r17 ::=    INTEGER (1..maxNrofFreqSL-r16) |
| -- TAG-SL-PRSFREQCONFIG-STOP |
| -- ASN1STOP |
| SL-PRS-FreqResourceSet field descriptions: |
| sl-PRS-Freq-ID |
| This field indicates the identity of the configuration information on the PRS resource set and associated carrier frequency for NR sidelink communication |

Table 4 below illustrates the IE SL-PRS-FreqConfigCommon which specifies the common PRS configuration information on one or more carrier frequencies for NR sidelink.

TABLE 4

| SL-PRS-FreqConfigCommon IE |
|---|
| -- ASN1START |
| -- TAG-SL-PRS-FREQCONFIGCOMMON-START |
| SL-PRS-FreqConfigCommon          SEQUENC { |
|   sl-PRS-FreqResourceRepetitionFactor        ENUMERATED {n2, n4, n6, n8, n16, n32, ...} |
|   nR-SL-PRS-FreqSFN.-Offset-r16,             NR-SL-PRS-FreqSFN0-Offset- |
| } |
| NR-SL-PRS-FreqSFN0-Offset-r16 ::= SEQUENCE { |
|   sfn-Offset-r16                    INTEGER (0..1023), |
|   integerSubframeOffset-r16         INTEGER (0..9), |
|   ...} |
| -- TAG-SL-PRS-FREQCONFIGCOMMON-STOP |
| -- ASN1STOP |
| SL-PRS-FreqConfigItem field descriptions: |
| sl-PRS-FreqResourceRepetitionFactor |
| This field specifies how many times each DL-PRS Resource is repeated for a single instance of the SL-PRS Resource Set. It is applied to all resources of the SL-PRS Resource Set. Enumerated values n2, n4, n6, n8, n16, n32 |

TABLE 4-continued

SL-PRS-FreqConfigCommon IE correspond to 2, 4, 6, 8, 16, 32 resource repetitions, respectively. If this field is absent, the value for SL-PRS-FreqResourceRepetitionFactor is 1 (i.e., no resource repetition).
nR-SL-DL-PRS-SFN0-Offset
NR-SL-DL-PRS-SFN0-Offset defines the time offset of the SFN0 slot 0 for the SL PRS resource set with respect to SFN0 slot 0 of the UE transmitting the PRS Table 5 below illustrates the IE SL-PRS-FreqResourceSet which specifies the PRS configuration information for carrier frequency for NR sidelink

TABLE 5

SL-PRS-FreqResourceSet IE

```
-- ASN1START
-- TAG-SL-PRS-FREQRESOURCESET-START
SL-PRS-FreqResourceSet       SEQUENC {
    sl-PRS-FreqConfigList    SEQUENC (SIZE
```

TABLE 5-continued

SL-PRS-FreqResourceSet IE

```
                  (1...maxSLPRSConfig)) of SL-PRS-FreqConfigItem
                  }
-- TAG-SL-PRS-FREQRESOURCESET-STOP
-- ASN1STOP
```

Table 6 below illustrates the IE SL-PRS-FreqConfigItem which specifies the PRS configuration information for a particular carrier frequency for NR sidelink.

TABLE 6

SL-PRS-FreqConfigItem IE

```
-- ASN1START
-- TAG-SL-PRS-FREQCONFIGITEM-START
SL-PRS-FreqConfigItem                           SEQUENCE {
    sl-FreqConfig-r16                           SL-FreqConfig-r16
    sl-PRS-FreqResourceTimeGap                  ENUMERATED {s1, s2, s4, s8, s16, s32, ...}
    sl-PRS-FreqStartPRB                         INTEGER (0..2176),
    sl-PRS-FreqResourceSlotOffset               INTEGER (0..nrMaxResourceOffsetValue-1-r16),
    sl-PRS-FreqResourceBandwidth                INTEGER (1..63),
    sl-PRS-FreqPeriodicity-and-sl-ResourceSet SlotOffset    NR-DL-PRS-Periodicity-and-
ResourceSetSlotOffset-r16,
    sl-PRS-FreqSF-Map                           SEQUENCE (SIZE (1..maxSCSs) of CHOICE{
        SCS15khz                                    BIT STRING (SIZE (14),
        SCS30khz                                    BIT STRING (SIZE (28),
        SCS60khz                                    BIT STRING (SIZE (56),
        SCS120khz                                   BIT STRING (SIZE (112,
        SCS240khz                                   BIT STRING (SIZE (224)
    }
    sl-PRS-FreqRB-Bitmap                        BIT STRING (SIZE (12)
)
-- TAG-SL-PRS-FREQCONFIGITEM-STOP
-- ASN1STOP
```
SL-PRS-FreqConfigItem field descriptions:
sl-PRS-FreqResourceTimeGap
sl-PRS-FreqResourceTimeGap defines the offset in number of slots between two repeated instances of a SL-PRS-FreqConfig.
sl-PRS-FreqStartPRB
sl-PRS-FreqStartPRB is the absolute frequency of the reference resource block (Common RB 0). Its lowest subcarrier is also known as Point A. SL-PRS-FreqStartPRB defines the starting PRB index of the SL PRS resource with respect to reference Point A, where reference Point A is given by the higher-layer parameter dl-PRS-PointA. The starting PRB index has a granularity of one PRB with a minimum value of 0 and a maximum value of 2176 PRBs. All SL PRS resource sets belonging to the same positioning frequency layer have the same value of SL-PRS-FreqStartPRB.
sl-PRS-FreqResourceSlotOffset
sl-PRS-FreqResourceSlotOffset determines the starting slot of the SL PRS resource with respect to corresponding SL PRS resource set slot offset.
sl-PRS-FreqSF-Map
Indicates the time domain positions of the transmitted PRS in the frame of a PRB of a SL-BWP. The first/leftmost bit corresponds to symbol 0, the second bit corresponds symbol 1, and so on. Value 0 in the bitmap indicates that the corresponding PRS not transmitted while value 1 indicates that the corresponding PRS is transmitted.
sl-PRS-FreqRB-Bitmap
Indicates the frequency domain positions of the transmitted PRS in the frame of a PRB of a SL-BWP. The first/leftmost bit corresponds to SCS 0, the second bit corresponds SCS1 1, and so on. Value 0 in the bitmap indicates that the corresponding PRS not transmitted while value 1 indicates that the corresponding PRS is transmitted.
sl-PRS-FreqResourceBandwidth
sl-PRS-FreqResourceBandwidth defines the number of resource blocks configured for SL PRS transmission. The parameter has a granularity of 4 PRBs with a minimum of 24 PRBs and a maximum of 272 PRBs. All SL PRS resources sets within a positioning frequency layer have the same value of sl-PRS-FreqResourceBandwidth.
NR-DL-PRS-Periodicity-and-ResourceSetSlotOffset
SL-PRS-FreqPeriodicity-and-sl-ResourceSetSlotOffset defines the DL PRS resource periodicity and takes values TABLE 6-continued SL-PRS-FreqConfigItem IE $T_{per}^{PRS} \in 2^\mu$ {4,5,8,10,16,20,32,40,64,80,160,320,640,1280,2560,5120,10240} slots, where $\mu$=0,1,2,3 for dl-PRS-SubcarrierSpacing=15, 30, 60 and 120 kHz respectively and the slot offset for DL PRS resource set with respect to SFN0 slot 0. All the DL PRS resources within one DL PRS resource set are configured with the same DL PRS resource periodicity.

An example of SIB-12 for scheduling and configuring the 10 SL PRSs and its corresponding information element IE SIB12 that contains NR sidelink communication configuration is illustrated in Table 7 below:

TABLE 7

SIB12 IE

```
-- ASN1START
-- TAG-SIB12-START
SIB12-r16 ::=              SEQUENCE {
   segmentNumber-r16          INTEGER (0..63),
   segmentType-r16            ENUMERATED {notLastSegment, lastSegment},
   segmentContainer-r16       OCTET STRING
}
SIB12-IEs-r16 ::=          SEQUENCE {
   sl-ConfigCommonNR-r16      SL-ConfigCommonNR-r16,
   lateNonCriticalExtension   OCTET STRING     OPTIONAL,
   ...
}
SL-ConfigCommonNR-r16 ::=   SEQUENCE {
   sl-FreqInfoList-r16                  SEQUENCE (SIZE (1..maxNrofFreqSL-r16)) OF SL-
FreqConfigCommon-r16   OPTIONAL,      -- Need R
   sl-PRSFreqInfoList-r17               SEQUENCE (SIZE (1..maxNrofFreqSL-r16)) OF SL-
PRS-FreqConfig-r17     OPTIONAL,      -- Need R
   sl-UE-SelectedConfig-r16             SL-UE-SelectedConfig-r16
OPTIONAL,       -- Need R
   sl-NR-AnchorCarrierFreqList-r16      SL-NR-AnchorCarrierFreqList-r16
OPTIONAL,       -- Need R
   sl-EUTRA-AnchorCarrierFreqList-r16   SL-EUTRA-AnchorCarrierFreqList-r16
OPTIONAL,       -- Need R
   sl-RadioBearerConfigList-r16         SEQUENCE (SIZE (1..maxNrofSLRB-r16)) OF SL-
RadioBearerConfig-r16   OPTIONAL,     -- Need R
   sl-RLC-BearerConfigList-r16          SEQUENCE (SIZE (1..maxSL-LCID-r16)) OF SL-
RLC-BearerConfig-r16    OPTIONAL,      -- Need R
   sl-MeasConfigCommon-r16              SL-MeasConfigCommon-r16
OPTIONAL,       -- Need R
   sl-CSI-Acquisition-r16               ENUMERATED {enabled}
OPTIONAL,       -- Need R
   sl-OffsetDFN-r16                     INTEGER (1..1000)
OPTIONAL,       -- Need R
   t400-r16                             ENUMERATED {ms100, ms200, ms300, ms400,
ms600, ms1000, ms1500, ms2000} OPTIONAL,   -- Need R
   sl-MaxNumConsecutiveDTX-r16          ENUMERATED {n1, n2, n3, n4, n6, n8, n16, n32}
OPTIONAL,       -- Need R
   sl-SSB-PriorityNR-r16                INTEGER (1..8)
OPTIONAL        -- Need R
}
SL-NR-AnchorCarrierFreqList-r16 ::= SEQUENCE (SIZE (1.. maxFreqSL-NR-r16)) OF ARFCN-
ValueNR
SL-EUTRA-AnchorCarrierFreqList-r16 ::= SEQUENCE (SIZE (1..maxFreqSL-EUTRA-r16)) OF
ARFCN-ValueEUTRA
-- TAG-SIB12-STOP
-- ASN1STOP
```

Table 8 below illustrates the IE SL-PreconfigurationNR which includes the sidelink pre-configured parameters used for NR sidelink communication.

TABLE 8

SL-PreconfigurationNR IE

```
-- ASN1START
-- TAG-SL-PRECONFIGURATIONNR-START
SL-PreconfigurationNR-r16 ::=          SEQUENCE {
```

TABLE 8-continued

| SL-PreconfigurationNR IE | |
|---|---|
| sidelinkPreconfigNR-r16 | SidelinkPreconfigNR-r16, |
| ... | |
| } | |
| SidelinkPreconfigNR-r16 ::= | SEQUENCE { |
| sl-PreconfigFreqInfoList-r16 | SEQUENCE (SIZE (1..maxNrofFreqSL-r16)) |
| OF SL-FreqConfigCommon-r16 OPTIONAL, | |
| sl-PRSFreqInfoList-r17 | SEQUENCE (SIZE (1..maxNrofFreqSL-r16)) |
| OF SL-PRS-FreqConfig-r17 OPTIONAL, | |
| sl-PreconfigNR-AnchorCarrierFreqList-r16 | SL-NR-AnchorCarrierFreqList-r16 |
| OPTIONAL, | |
| sl-PreconfigEUTRA-AnchorCarrierFreqList-r16 | SL-EUTRA-AnchorCarrierFreqList-r16 |
| OPTIONAL, | |
| sl-RadioBearerPreConfigList-r16 | SEQUENCE (SIZE (1..maxNrofSLRB-r16)) |
| OF SL-RadioBearerConfig-r16 OPTIONAL, | |
| sl-RLC-BearerPreConfigList-r16 | SEQUENCE (SIZE (1..maxSL-LCID-r16)) OF |
| SL-RLC-BearerConfig-r16 OPTIONAL, | |
| sl-MeasPreConfig-r16 | SL-MeasConfigCommon-r16 |
| OPTIONAL, | |
| sl-OffsetDFN-r16 | INTEGER (1..1000) |
| OPTIONAL, | |
| t400-r16 | ENUMERATED {ms100, ms200, ms300, ms400, |
| ms600, ms1000, ms1500, ms2000} OPTIONAL, | |
| sl-MaxNumConsecutiveDTX-r16 | ENUMERATED {n1, n2, n3, n4, n6, n8, |
| n16, n32} OPTIONAL, | |
| sl-SSB-PriorityNR-r16 | INTEGER (1..8) |
| OPTIONAL, | |
| sl-PreconfigGeneral-r16 | SL-PreconfigGeneral-r16 |
| OPTIONAL, | |
| sl-UE-SelectedPreConfig-r16 | SL-UE-SelectedConfig-r16 |
| OPTIONAL, | |
| sl-CSI-Acquisition-r16 | ENUMERATED {enabled} |
| OPTIONAL, | |
| sl-RoHC-Profiles-r16 | SL-RoHC-Profiles-r16 |
| OPTIONAL, | |
| sl-MaxCID-r16 | INTEGER (1..16383) |
| DEFAULT 15, | |
| ... | |
| } | |
| SL-PreconfigGeneral-r16 ::= | SEQUENCE { |
| sl-TDD-Configuration-r16 | TDD-UL-DL-ConfigCommon |
| OPTIONAL, | |
| reservedBits-r16 | BIT STRING (SIZE (2)) |
| OPTIONAL, | |
| ... | |
| } | |
| SL-RoHC-Profiles-r16 ::= | SEQUENCE { |
| profile0x0001-r16 | BOOLEAN, |
| profile0x0002-r16 | BOOLEAN, |
| profile0x0003-r16 | BOOLEAN, |
| profile0x0004-r16 | BOOLEAN, |
| profile0x0006-r16 | BOOLEAN, |
| profile0x0101-r16 | BOOLEAN, |
| profile0x0102-r16 | BOOLEAN, |
| profile0x0103-r16 | BOOLEAN, |
| profile0x0104-r16 | BOOLEAN |
| } | |
| -- TAG-SL-PRECONFIGURATIONNR-STOP | |
| -- ASN1STOP | |

The following Table 9 illustrates what the NR UE may do upon reception of a RRCReconfiguration Message with an sl-ConfigDedicatedNR message that includes a new IE SL-PRS-FreqConfig, as an addition to the existing text in TS38.331

TABLE 9

| 5.3.5.14 Sidelink dedicated configuration |
|---|
| Upon initiating the procedure, the UE shall:<br>1> if sl-FreqInfoToReleaseList is included in sl-ConfigDedicatedNR within RRCReconfiguration:<br>  2> for each entry included in the received sl-FreqInfoToReleaseList that is part of the current UE configuration:<br>    3> release the related configurations from the stored NR sidelink communication configurations;<br>1> if sl-FreqInfoToAddModList is included in sl-ConfigDedicatedNR within RRCReconfiguration: |

TABLE 9-continued 5.3.5.14 Sidelink dedicated configuration

```
    2>  if configured to receive NR sidelink communication:
        3>  use the resource pool(s) indicated by sl-RxPool for NR sidelink communication reception, as
            specified in 5.8.7;
    2>  if configured to transmit NR sidelink communication:
        3>  use the resource pool(s) indicated by sl-TxPoolSelectedNormal, sl-TxPoolScheduling or sl-
            TxPoolExceptional for NR sidelink communication transmission, as specified in 5.8.8;
    2>  perform CBR measurement on the transmission resource pool(s) indicated by sl-TxPoolSelectedNormal,
        sl-TxPoolScheduling or sl-TxPoolExceptional for NR sidelink communication transmission, as specified
        in 5.5.3;
    2>  use the synchronization configuration parameters for NR sidelink communication on frequencies
        included in sl-FreqInfoToAddModList, as specified in 5.8.5;
1>  if SL-PRS-FreqConfigToReleaseList is included in sl-ConfigDedicatedNR within RRCReconfiguration:
    2>  for each entry included in the received SL-PRS-FreqConfigToReleaseList that is part of the current UE
        configuration:
        3>  release the related configurations from the stored NR sidelink communication configurations;
1>  if SL-PRS-FreqConfigToAddList is included in sl-ConfigDedicatedNR within RRCReconfiguration:
    2>  if configured to receive NR sidelink communication:
        3>  use the resource pool(s) indicated by sl-RxPool for NR sidelink communication reception, as
            specified below
        3>  if the conditions for NR sidelink communication operation as defined in 5.8.2 are met:
            4>  if the frequency used for NR sidelink communication is included in SL-PRS-FreqConfigToAddList
                in RRCReconfiguration message or sl-PRSFreqInfoList-r17 included in SIB12:
                5>  if the UE is configured with sl-RxPool included in RRCReconfiguration message with
                    reconfigurationWithSync (i.e. handover):
                    6>  configure lower layers to monitor sidelink control information and the corresponding data
                        using the pool of resources indicated by sl-RxPool;
                5>  else if the cell chosen for NR sidelink communication provides SIB12:
                    6>  configure lower layers to monitor sidelink control information and the corresponding data
                        using the pool of resources indicated by sl-RxPool in SIB12;
            4>  else:
                5>  configure lower layers to monitor sidelink control information and the corresponding data
                    using the pool of resources that were preconfigured by sl-PRSFreqInfoList-r17in SL-
                    PreconfigurationNR, as defined in sub-clause 9.3;
    ..... Remaining text of 5.3.5.14 removed for brevity.
```

What is claimed is:

1. A first user equipment (UE) for scheduling a positioning reference signal (PRS) during a sidelink communication with a second UE, the first UE comprising:
one or more non-transitory computer-readable media storing a set of computer-executable instructions; and
at least one processor coupled to the one or more non-transitory computer-readable media and configured to execute the computer-executable instructions to:
transmit, to the second UE, a first PRS in a first set of symbols of a first slot of a first bandwidth part (BWP);
determine that a second PRS is to be transmitted, to the second UE, in a second BWP that overlaps the first BWP in time domain;
receive information about the second UE to determine whether the second UE is capable of reception and successfully decoding of the first PRS and the second PRS during the sidelink communication; and
when determining that the second UE is not capable of successful decoding of the first PRS and the second PRS:
modify a scheduling of transmission of the second PRS by identifying a second set of symbols of a second slot of the second BWP for carrying the second PRS, and
transmit the second PRS in the second set of symbols, wherein a start of a first symbol of the second set of symbols follows an end of a second symbol of the first set of symbols in the time domain.

2. The first UE of claim 1, wherein the at least one processor is further configured to execute the computer-executable instructions to:
transmit the second PRS in a third set of symbols of the second slot of the second BWP without modifying the scheduling of the transmission of the second PRS when determining that the second UE is capable of successful decoding of the first PRS and the second PRS.

3. The first UE of claim 1, wherein the start of the first symbol of the second set of symbols follows the end of the second symbol of the first set of symbols, such that a gap in time exists in the time domain between the end of the second symbol and the start of the first symbol.

4. The first UE of claim 3, wherein the gap in time is enough for the second UE to switch from the first BWP to the second BWP to receive and decode the second PRS.

5. The first UE of claim 3, wherein the gap in time comprises a fraction of a symbol of the first set of symbols of the first slot.

6. The first UE of claim 5, wherein the fraction is equal to $1/(2^{(m-n)})$ of a duration of the symbol, wherein n comprises a configuration factor of the first BWP and m comprises a configuration factor of the second BWP.

7. The first UE of claim 1, wherein the first BWP coincides with the second BWP in the time domain, such that the first set of symbols of the first slot of the first BWP is aligned in the time domain with the second set of symbols of the second slot of the second BWP.

8. The first UE of claim 1, wherein the first BWP is associated with a first subcarrier spacing (SCS) while the second BWP is associated with a second SCS different from the first SCS.

9. The first UE of claim 1, wherein the second set of symbols of the second slot coincides in the time domain with a third set of symbols of the first slot that do not carry the first PRS.

10. The first UE of claim 1, wherein the second UE is not capable of successful decoding of the first PRS and the second PRS when the second UE does not have a receiver capable of successfully receiving multiple carrier bandwidths simultaneously.

11. A non-transitory machine-readable storage medium of a first user equipment (UE) storing a program for scheduling a positioning reference signal (PRS), the computer program comprising sets of instructions for:
  transmitting, to a second UE, a first PRS in a first set of symbols of a first slot of a first bandwidth part (BWP);
  determining that a second PRS is to be transmitted, to the second UE, in a second BWP that overlaps the first BWP in time domain;
  receiving information about the second UE to determine whether the second UE is capable of reception and successfully decoding of the first PRS and the second PRS during the sidelink communication; and
  when determining that the second UE is not capable of successful decoding of the first PRS and the second PRS:
    modifying a scheduling of transmission of the second PRS by identifying a second set of symbols of a second slot of the second BWP for carrying the second PRS, and
    transmitting the second PRS in the second set of symbols, wherein a start of a first symbol of the second set of symbols follows an end of a second symbol of the first set of symbols in the time domain.

12. The non-transitory machine-readable storage medium of claim 11, wherein the start of the first symbol of the second set of symbols follows the end of the second symbol of the first set of symbols, such that a gap in time exists in the time domain between the end of the second symbol and the start of the first symbol.

13. The non-transitory machine-readable storage medium of claim 12, wherein the gap in time comprises a fraction of a symbol of the first set of symbols of the first slot.

14. The non-transitory machine-readable storage medium of claim 11, wherein the second set of symbols of the second slot coincides in the time domain with a third set of symbols of the first slot that do not carry the first PRS.

15. A method for a first user equipment (UE) for scheduling a positioning reference signal (PRS) during a sidelink communication with a second UE, the method comprising:
  transmitting, to the second UE, a first PRS in a first set of symbols of a first slot of a first bandwidth part (BWP);
  determining that a second PRS is to be transmitted, to the second UE, in a second BWP that overlaps the first BWP in time domain;
  receiving information about the second UE to determine whether the second UE is capable of reception and successfully decoding of the first PRS and the second PRS during the sidelink communication; and
  when determining that the second UE is not capable of successful decoding of the first PRS and the second PRS:
    modifying a scheduling of transmission of the second PRS by identifying a second set of symbols of a second slot of the second BWP for carrying the second PRS, and
    transmitting the second PRS in the second set of symbols, wherein a start of a first symbol of the second set of symbols follows an end of a second symbol of the first set of symbols in the time domain.

* * * * *